United States Patent
Lad et al.

(10) Patent No.: US 12,548,147 B2
(45) Date of Patent: Feb. 10, 2026

(54) SYSTEMS AND METHODS RELATED TO AGE-RELATED MACULAR DEGENERATION

(71) Applicant: DUKE UNIVERSITY, Durham, NC (US)

(72) Inventors: Eleonora Lad, Durham, NC (US); Lawrence Carin, Durham, NC (US); Ricardo Henao Giraldo, Durham, NC (US); Cynthia Toth, Durham, NC (US); Dong Wang, Durham, NC (US)

(73) Assignee: Duke University, Durham, NC (US)

( * ) Notice: Subject to any disclaimer, the term of this patent is extended or adjusted under 35 U.S.C. 154(b) by 845 days.

(21) Appl. No.: 17/699,052

(22) Filed: Mar. 18, 2022

(65) Prior Publication Data

US 2022/0351373 A1    Nov. 3, 2022

Related U.S. Application Data

(60) Provisional application No. 63/162,741, filed on Mar. 18, 2021.

(51) Int. Cl.
    *G06T 7/00*             (2017.01)
    *A61B 3/00*            (2006.01)
    (Continued)

(52) U.S. Cl.
    CPC .......... *G06T 7/0012* (2013.01); *A61B 3/0025* (2013.01); *A61B 3/102* (2013.01);
    (Continued)

(58) Field of Classification Search
    CPC ......... G06T 7/0012; G06T 2207/10101; G06T 2207/20076; G06T 2207/20081;
    (Continued)

(56) References Cited

U.S. PATENT DOCUMENTS

2012/0184845 A1\*   7/2012   Ishikawa ................ G06V 10/50
                                                                           600/425
2016/0174830 A1\*   6/2016   Rubin .................. G06T 7/0012
                                                                           351/246

(Continued)

FOREIGN PATENT DOCUMENTS

WO   WO-2019090159 A1 \*   5/2019   ........... A61N 5/0613
WO   WO-2020178773 A1 \*   9/2020   ............ G16H 30/00

OTHER PUBLICATIONS

Krizhevsky A., et al., "Imagenet Classification with Deep Convolutional Neural Networks," Communications of the ACM, 2017, vol. 60, No. 6, 9 pages.

(Continued)

*Primary Examiner* — Amandeep Saini
*Assistant Examiner* — Daniella M. DiGuglielmo
(74) *Attorney, Agent, or Firm* — POLSINELLI PC

(57) ABSTRACT

Provided herein are systems utilizing machine learning in detecting geographic atrophy. The system can include at least one processor, a memory, and a computing platform including the at least one processor and the memory. The computing platform can be configured to receive volumetric scan images, determine a position of each of the volumetric scan images, generate, using a trained detection algorithm, a probabilistic likelihood that each scan is informative of geographic atrophy or neovascular age-related macular degeneration, include high probability scans in a dataset, determine, using the included scans in the dataset, whether geographic atrophy or neovascular age-related macular degeneration is present or likely to occur, and output, by the detection algorithm, information indicating whether or not geographic atrophy or neovascular age-related macular degeneration is present or likely to occur.

18 Claims, 21 Drawing Sheets

(51) Int. Cl.
  A61B 3/10    (2006.01)
  A61B 3/12    (2006.01)
  G16H 30/40   (2018.01)
  G16H 50/20   (2018.01)
(52) U.S. Cl.
  CPC ........... *A61B 3/1225* (2013.01); *G16H 30/40* (2018.01); *G16H 50/20* (2018.01); *G06T 2207/10101* (2013.01); *G06T 2207/20076* (2013.01); *G06T 2207/20081* (2013.01); *G06T 2207/20084* (2013.01); *G06T 2207/30041* (2013.01)
(58) Field of Classification Search
  CPC . G06T 2207/30041; G06T 2207/20084; A61B 3/0025; A61B 3/102; A61B 3/1225; G16H 50/20; G16H 30/40
  See application file for complete search history.

(56) References Cited

U.S. PATENT DOCUMENTS

2019/0110753 A1* 4/2019 Zhang .................. A61B 3/0025
2020/0372632 A1* 11/2020 Chauhan .............. A61B 3/0025

OTHER PUBLICATIONS

Krizhevsky A., et al., "Learning Multiple Layers of Features from Tiny Images," Master's Thesis, University of Tront, 2009, 60 pages.
Langlotz C.P., et al., "A Roadmap for Foundational Research on Artificial Intelligence in Medical Imaging: From the 2018 NIH/RSNA/ACR/the Academy Workshop," Radiology, 2019, vol. 291, No. 3, pp. 781-791.
Leuschen J.N., et al., "Spectral-Domain Optical Coherence Tomography Characteristics of Intermediate Age-Related Macular Degeneration," Ophthalmology, 2013, vol. 120, No. 1, 20 pages.
Li K., et al., "Tell Me Where to Look: Guided Attention Inference Network," In Proceedings of the IEEE Conference on Computer Vision and Pattern Recognition, 2018, pp. 9215-9223.
Lindblad A.S., et al., "Change in Area of Geographic Atrophy in the Age-Related Eye Disease Study," AREDS Report Number 26, Arch Ophthalmol, 2009, vol. 127, No. 9, pp. 1168-1174.
Liu M., et al., "A Multi-Model Deep Convolutional Neural Network for Automatic Hippocampus Segmentation and Classification in Alzheimer's Disease," Neuroimage, 2020, vol. 208, No. 116459, 15 pages.
Mahendran A., et al., "Salient Deconvolutional Networks," European Conference on Computer Vision, 2016, pp. 120-135.
Montavon G., et al., "Layer-Wise Relevance Propagation: An Overview," Explainable AI: Interpreting, Explaining and Visualizing Deep Learning, 2019, pp. 193-209.
Montavon G., "Gradient-Based Vs. Propagation-Based Explanations: An Axiomatic Comparison," In Explainable AI: Interpreting, Explaining and Visualizing Deep Learning, 2019, pp. 253-265.
Mookiah M.R.K., et al., "Automated Diagnosis of Age-Related Macular Degeneration using Greyscale Features from Digital Fundus Images," Computers in Biology and Medicine, 2014, vol. 53, 27 pages.
Mookiah M.R.K., et al., "Decision Support System for Age-Related Macular Degeneration Using Discrete Wavelet Transform," Medical & Biological Engineering & Computing, 2014, vol. 52, No. 9, 26 pages.
O'Shaughnessy M., et al., "Generative Causal Explanations of Black-Box Classifiers," Advances in Neural Information Processing Systems 33, 2020, 15 pages.
Pearl J., "Models, Reasoning, and Inference," Causality, Cambridge University Press, 2009, 7 pages.
Petsiuk V., et al., "Rise: Randomized Input Sampling for Explanation of Black-Box Models," 2018, arXiv preprint arXiv: 1806.07421, 17 pages.
Phan T.V., et al., "Automatic Screening and Grading of Age-Related Macular Degeneration from Texture Analysis of Fundus Images," Journal of Ophthalmology, 2016, vol. 2016, No. 5893601, 11 pages.
Rebuffi S., et al., "There and Back Again: Revisiting Backpropagation Saliency Methods," Proceedings of the IEEE/CVF Conference on Computer Vision and Pattern Recognition, 2020, pp. 8839-8848.
Ribeiro M.T., et al., ""Why Should I Trust You?": Explaining the Predictions of Any Classifier," In Proceedings of the 22nd ACM SIGKDD International Conference on Knowledge Discovery and Data Mining, 2016, pp. 1135-1144.
Rudnicka A.R., et al., "Incidence of Late-Stage Age-Related Macular Degeneration in American Whites: Systematic Review and Meta-Analysis," American Journal of Ophthalmology, 2015, vol. 160, No. 1, pp. 85-93.
Sadda S.R., et al., "Clinical Endpoints for the Study of Geographic Atrophy Secondary to Age-Related Macular Degeneration," Retina, 2016, vol. 36, No. 10, pp. 1806-1822.
Saha S., et al., "Automated Detection and Classification of Early AMD Biomarkers Using Deep Learning," Scientific Reports, 2019, vol. 9, No. 1, 9 pages.
Sajda P., "Machine Learning for Detection and Diagnosis of Disease," Annual Review of Biomedical Engineering, 2006, vol. 8, pp. 537-565.
Samek W., et al., "Towards Explainable Artificial Intelligence," Springer Nature, 2019, vol. 11700, 19 pages.
Sarks J.P., et al., "Evolution of Geographic Atrophy of the Retinal Pigment Epithelium," Eye, 1988, vol. 2, pp. 552-577.
Schölkopf B., et al., "Causality for Machine Learning," arXiv preprint arXiv: 1911.10500, 2019, 20 pages.
Selvan R., et al., "Tensor Networks for Medical Image Classification," In Medical Imaging with Deep Learning, Proceedings of Machine Learning Research, 2020, vol. 121, pp. 721-732.
Selvaraju R.R., et al., "Grad-CAM: Visual Explanations from Deep Networks via Gradient-Based Localization," In Proceedings of the IEEE International Conference on Computer Vision, 2017, pp. 618-626.
Seo D., et al., "Regional Multi-Scale Approach for Visually Pleasing Explanations of Deep Neural Networks," IEEE Access, 2019, vol. 8, pp. 8572-8582.
Shrikumar A., et al., "Learning Important Features through Propagating Activation Differences," In International Conference on Machine Learning, Proceedings of Machine Learning Research, 2017, vol. 70, pp. 3145-3153.
Simonyan K., et al., "Deep inside Convolutional Networks: Visualising Image Classification Models and Saliency Maps," 2013, arXiv preprint arXiv:1312.6034, 8 pages.
Simonyan K., et al., "Very Deep Convolutional Networks for Large-Scale Image Recognition," 2014, arXiv preprint arXiv: 1409.1556, 14 pages.
Sleiman K., et al., "Optical Coherence Tomography Predictors of Risk for Progression to Non-Neovascular Atrophic Age-Related Macular Degeneration," Ophthalmology, 2017, vol. 124, No. 12, pp. 1764-1777.
Su H., et al., "Multi-View Convolutional Neural Networks for 3D Shape Recognition," In Proceedings of the IEEE International Conference on Computer Vision, 2015, pp. 945-953.
Sun C., et al., "Revisiting Unreasonable Effectiveness of Data in Deep Learning Era," Proceedings of the IEEE International Conference on Computer Vision, 2017, pp. 843-852.
Suter R., et al., "Robustly Disentangled Causal Mechanisms: Validating Deep Representations for Interventional Robustness," In International Conference on Machine Learning, Proceedings of Machine Learning Research, 2019, vol. 97, pp. 6056-6065.
Szegedy C., et al., "Rethinking the Inception Architecture for Computer Vision," In Proceedings of the IEEE Conference on Computer Vision and Pattern Recognition (CVPR), 2016, pp. 2818-2826.
Tian Y., et al., "Contrastive Multiview Coding," European Conference on Computer Vision, 2019, arXiv preprint arXiv:1906.05849, pp. 776-794.
Ting D.S.W., et al., "Artificial Intelligence and Deep Learning In Ophthalmology," British Journal of Ophthalmology, 2019, vol. 103, pp. 167-175.

(56) References Cited

OTHER PUBLICATIONS

Treder M., et al., "Deep Learning-Based Detection and Classification of Geographic Atrophy Using a Deep Convolutional Neural Network Classifier," Graefe's Archive for Clinical and Experimental Ophthalmology, 2018, vol. 256, No. 11, pp. 2053-2060.
Van Der Oord A., et al., "Representation Learning with Contrastive Predictive Coding," 2018, arXiv preprint arXiv:1807.03748, 13 pages.
Van Grinsven M.J.J.P., et al., "Automatic Drusen Quantification and Risk Assessment of Age-Related Macular Degeneration on Color Fundus Images," Investigative Ophthalmology & Visual Science, 2013, vol. 54, No. 4, pp. 3019-3027.
Veerappan M., et al., "Optical Coherence Tomography Reflective Drusen Substructures Predict Progression to Geographic Atrophy in Age-related Macular Degeneration," Ophthalmology, 2016, vol. 123, No. 12, pp. 2554-2570.
Wagner J., et al., "Interpretable and Fine-Grained Visual Explanations for Convolutional Neural Networks," In Proceedings of the IEEE Conference on Computer Vision and Pattern Recognition (CVPR), 2019, pp. 9097-9107.
Wah C., et al., "The Caltech-UCSD Birds-200-2011 Dataset," Technical Report CNS-TR-2011-001, California Institute of Technology, 2011, 8 pages.
Wang H., et al., "Learning Robust Representations by Projecting Superficial Statistics Out," In International Conference on Learning Representations, 2019, arXiv preprint arXiv:1903.06256.
Wang L., et al., "Sharpen Focus: Learning with Attention Separability and Consistency," In Proceedings of the IEEE International Conference on Computer Vision (ICCV), 2019, pp. 512-521.
Wang T., et al., "Visual Commonsense Representation Learning via Causal Inference," In Proceedings of the IEEE/ Cvf Conference on Computer Vision and Pattern Recognition (CVPR) Workshops, 2020, pp. 378-379.
Wong W.L., et al., "Global Prevalence of Age-Related Macular Degeneration and Disease Burden Projection for 2020 and 2040: A Systematic Review and Meta-Analysis," Lancet Global Health, 2014, vol. 2, No. 2, pp. e106-e116.
Wu Z., et al., "Optical Coherence Tomography-Defined Changes Preceding the Development of Drusen-Associated Atrophy in Age-Related Macular Degeneration," Ophthalmology, 2014, vol. 121, No. 12, pp. 2415-2422.
Youden W.J., "Index for Rating Diagnostic Tests," Cancer, 1950, vol. 3, No. 1, pp. 32-35.
Adebayo J., et al., "Sanity Checks for Saliency Maps,"Advances in Neural Information Processing Systems, 2018, pp. 9505-9515.
Arjovsky M., et al., "Invariant Risk Minimization," arXiv preprint arXiv:1907.02893, 2019, 31 pages.
Armato S.G. III., et al., "The Lung Image Database Consortium (LIDC) and Image Database Resource Initiative (IDRI): A Completed Reference Database of Lung Nodules on CT Scans," Medical physics, 2011, vol. 38, No. 2, pp. 915-931.
Bach S., et al., "On Pixel-Wise Explanations for Non-Linear Classifier Decisions by Layer-Wise Relevance Propagation," PloS one, 2015, vol. 10, No. 7, Article e0130140, 46 pages.
Basaia S., et al., "Automated Classification of Alzheimer's Disease and Mild Cognitive Impairment Using a Single MRI and Deep Neural Networks," Neuroimage Clinical, 2019, vol. 21, 101645, 8 pages.
Boyer D.S., et al., "The Pathophysiology of Geographic Atrophy Secondary to Age-Related Macular Degeneration and the Complement Pathway as a Therapeutic Target," Retina, Philadelphia, 2017, vol. 37, No. 5, pp. 819-835.
Burlina P., et al., "Automatic Screening of Age-Related Macular Degeneration and Retinal Abnormalities," Annual International Conference of the IEEE Engineering in Medicine and Biology Society, 2011, vol. 2011, pp. 3962-3966.
Burlina P.M., et al., "Automated Grading of Age-Related Macular Degeneration From Color Fundus Images Using Deep Convolutional Neural Networks," JAMA Ophthalmology, 2017, vol. 135, No. 11, pp. 1170-1176.

Chang C.H., et al., "Explaining Image Classifiers by Counterfactual Generation," In International Conference on Learning Representations, arXiv preprint arXiv:1807.08024, 2018.
Chattopadhay A., et al., "Grad-Cam++: Generalized Gradient-Based Visual Explanations for Deep Convolutional Networks," IEEE Winter Conference on Applications of Computer Vision (WACV), 2018, pp. 839-847.
Chen C., et al., "Deepdriving: Learning Affordance for Direct Perception in Autonomous Driving," In Proceedings of the IEEE International Conference on Computer Vision, 2015, pp. 2722-2730.
Chen T., et al., "A Simple Framework for Contrastive Learning of Visual Representations," arXiv preprint arXiv:2002.05709, 2020, 11 pages.
Chew E.Y., et al., "The Age-Related Eye Disease Study 2 (AREDS2): Study Design and Baseline Characteristics (AREDS2 Report No. 1)," Ophthalmology, 2012, vol. 119, No. 11, pp. 2282-2289.
Christenbury J.G., et al., "Progression of Intermediate Age-Related Macular Degeneration with Proliferation and Inner Retinal Migration of Hyperreflective Foci," Ophthalmology, 2017, vol. 120, No. 5, pp. 1038-1045.
Dabkowski P., et al., "Real Time Image Saliency for Black Box Classifiers," In Advances in Neural Information Processing Systems, 2017, pp. 6967-6976.
Deng J., et al., "Imagenet: A Large-Scale Hierarchical Image Database," IEEE Conference on Computer Vision and Pattern Recognition, 2009, pp. 248-255.
Deng L., "The MNIST Database of Handwritten Digit Images for Machine Learning Research [Best of the Web]," IEEE Signal Processing Magazine, 2012, vol. 29, No. 6, pp. 141-142.
Dhurandhar A., et al., "Explanations Based on the Missing: Towards Contrastive Explanations with Pertinent Negatives," In Advances in Neural Information Processing Systems, 2018, pp. 592-603.
Du M., et al., "Towards Explanation of DNN-Based Prediction with Guided Feature Inversion," In Proceedings of the 24th ACM SIGKDD International Conference on Knowledge Discovery & Data Mining, 2018, pp. 1358-1367.
Efthymiou S., et al., "Tensornetwork for Machine Learning," arXiv preprint arXiv:1906.06329, 2019, 9 pages.
Erhan D., et al., "Visualizing Higher-Layer Features of a Deep Network," University of Montreal, 2009, vol. 1341, No. 3, 1 page.
Farsiu S., et al., "Quantitative Classification of Eyes with and Without Intermediate Age-Related Macular Degeneration using Optical Coherence Tomography," Ophthalmology, 2014, vol. 121, No. 1, pp. 162-172.
Ferris F.L., et al., "A Simplified Severity Scale for Age-Related Macular Degeneration: AREDS Report No. 18," Archives of Ophthalmology, 2005, vol. 123, No. 11, pp. 1570-1574.
Fleckenstein M., et al., "Fundus Autofluorescence and Spectral-Domain Optical Coherence Tomography Characteristics in a Rapidly Progressing Form of Geographic Atrophy," Investigative Ophthalmology & Visual Science, 2011, vol. 52, No. 6, pp. 3761-3766.
Fleckenstein M., et al., "Tracking Progression with Spectral-Domain Optical Coherence Tomography in Geographic Atrophy Caused by Age-Related Macular Degeneration," Investigative Ophthalmology & Visual Science, 2010, vol. 51, No. 8, pp. 3846-3852.
Folgar F.A., et al., "Drusen Volume and Retinal Pigment Epithelium Abnormal Thinning Volume Predict 2-Year Progression of Age-Related Macular Degeneration," Ophthalmology, 2016, vol. 123, No. 1, pp. 39-50.
Folgar F.A., et al., "Spatial Correlation between Hyperpigmentary Changes on Color Fundus Photography and Hyperreflective Foci on SDOCT in Intermediate AMD," Investigative Ophthalmology & Visual Science, 2012, vol. 53, No. 8, pp. 4626-4633.
Fong R., et al., "Understanding Deep Networks via Extremal Perturbations and Smooth Masks," In Proceedings of the IEEE International Conference on Computer Vision, 2019, pp. 2950-2958.
Fong R.C., et al., "Interpretable Explanations of Black Boxes by Meaningful Perturbation," In Proceedings of the IEEE International Conference on Computer Vision, 2017, pp. 3429-3437.

(56) References Cited

OTHER PUBLICATIONS

Fukui H., et al., "Attention Branch Network: Learning of Attention Mechanism for Visual Explanation," In Proceedings of the IEEE Conference on Computer Vision and Pattern Recognition, 2019, pp. 10705-10714.
Ghassami A.E., et al., "Learning Causal Structures Using Regression Invariance," In Advances in Neural Information Processing Systems, 2017, pp. 3011-3021.
Girshick R., et al., "Rich Feature Hierarchies for Accurate Object Detection and Semantic Segmentation," In Proceedings of the IEEE Conference on Computer Vision and Pattern Recognition, 2014, pp. 580-587.
Goyal Y., et al., "Counterfactual Visual Explanations," In International Conference on Machine Learning, 2019, pp. 2376-2384.
Grassmann F., et al., "A Deep Learning Algorithm for Prediction of Age-Related Eye Disease Study Severity Scale for Age-Related Macular Degeneration from Color Fundus Photography," Ophthalmology, 2018, vol. 125, No. 9, pp. 1410-1420.
Grill J.B., et al., "Bootstrap Your Own Latent-A New Approach to Self-Supervised Learning," Advances in Neural Information Processing Systems, 2020, vol. 33, pp. 21271-21284.
Gutmann M., et al., "Noise-Contrastive Estimation: A New Estimation Principle for Unnormalized Statistical Models," In Proceedings of the Thirteenth International Conference on Artificial Intelligence and Statistics, 2010, pp. 297-304.
Hastie T., et al., "The Elements of Statistical Learning: Data Mining, Inference, and Prediction," 2008, 3 pages.
He K., et al., "Deep Residual Learning for Image Recognition," In Proceedings of the IEEE Conference on Computer Vision and Pattern Recognition, 2016, pp. 770-778.
He K., et al., "Momentum Contrast for Unsupervised Visual Representation Learning," In Proceedings of the IEEE/CVF Conference on Computer Vision and Pattern Recognition, 2020, pp. 9729-9738.
Holz F.G., et al., "Geographic Atrophy: Clinical Features and Potential Therapeutic Approaches," Ophthalmology, 2014, vol. 121, No. 5, pp. 1079-1091.
Holz F.G., et al., "Imaging Protocols in Clinical Studies in Advanced Age-Related Macular Degeneration: Recommendations from Classification of Atrophy Consensus Meetings," Ophthalmology, 2017, vol. 124, No. 4, pp. 464-478.
Hooker S., et al., "A Benchmark for Interpretability Methods in Deep Neural Networks," In Advances in Neural Information Processing Systems, 2019, pp. 9737-9748.
Huang G., et al., "Densely Connected Convolutional Networks," In Proceedings of the IEEE Conference on Computer Vision and Pattern Recognition, 2017, pp. 4700-4708.
Johansson F., et al., "Learning Representations for Counterfactual Inference," In International Conference on Machine Learning, 2016, pp. 3020-3029.
Kankanahalli S., et al., "Automated Classification of Severity of Age-Related Macular Degeneration from Fundus Photographs," Investigative Ophthalmology & Visual Science, 2013, vol. 54, No. 3, pp. 1789-1796.
Keenan T.D., et al., "A Deep Learning Approach for Automated Detection of Geographic Atrophy from Color Fundus Photographs," Ophthalmology, 2019, vol. 126, No. 11, 18 pages.
Kermany D.S., et al., "Identifying Medical Diagnoses and Treatable Diseases by Image-Based Deep Learning," Cell, 2018, vol. 172, No. 5, pp. 1122-1131.
Khosla P., et al., "Supervised Contrastive Learning," arXiv preprint arXiv:2004.11362, 2020, 13 pages.
Kingma D.P., et al., "Adam: A Method for Stochastic Optimization," arXiv preprint arXiv. 1412.6980, 2014.
Kohl S., et al., "A Probabilistic U-Net for Segmentation of Ambiguous Images," In Advances in Neural Information Processing Systems, 2018, 11 pages.
Zeiler M.D., et al., "Visualizing and Understanding Convolutional Networks," In European Conference on Computer Vision, 2014, pp. 818-833.
Zhang C., et al., "A Causal View on Robustness of Neural Networks," Advances in Neural Information Processing Systems 33, 2020, arXiv preprint arXiv:2005.01095.
Zhao Y., et al., "Uniqueness-Driven Saliency Analysis for Automated Lesion Detection with Applications to Retinal Diseases," International Conference on Medical Image Computing and Computer-Assisted Intervention, Springer, 2018, pp. 109-118.
Zheng Y., et al., "Automated "Disease/No Disease" Grading of Age-Related Macular Degeneration by an Image Mining Approach," Investigative Ophthalmology & Visual Science, 2012, vol. 53, No. 13, pp. 8310-8318.
Zhou B., et al., "Learning Deep Features for Discriminative Localization," In Proceedings of the IEEE conference on computer vision and pattern recognition (CVPR), 2016, pp. 2921-2929.

\* cited by examiner

FIG. 12

SYSTEMS AND METHODS RELATED TO AGE-RELATED MACULAR DEGENERATION

CROSS-REFERENCE TO RELATED APPLICATIONS

This application claim priority to U.S. Provisional Application No. 63/162,741 filed 18 Mar. 2021, which is incorporated herein in its entirety.

BACKGROUND OF THE INVENTION

Age-related macular degeneration (AMD) is the leading cause of blindness in the elderly. Advanced disease results in either irreversible loss of vision in the dry form of geographic atrophy (GA), or in retinal exudation in neovascular AMD (NVAMD). While vision loss in NVAMD is typically reversible with timely and frequent intravitreal injections of anti-vascular endothelial growth factors (VEGF) medications, there is currently no approved treatment to reverse or prevent GA. Additionally, conventional approaches typically cannot identify GA until after a patient begins reporting symptoms. Thus, there is still much to be learned about GA. With improved systems and methods for identifying and/or predicting the condition, it will be possible to more accurately target subjects for future clinical trials, with the ultimate goal of preventing onset of advanced disease. Moreover, these systems and methods can be applied to other conditions as well.

BRIEF SUMMARY OF THE INVENTION

Disclosed herein is a system using machine learning in detecting geographic atrophy (GA), the system comprising at least one processor; a memory; and a computing platform including the at least one processor and the memory, wherein the computing platform is configured for receiving, as input, a plurality of OCT volume scan images; generating, using a trained GA detection algorithm, a probabilistic likelihood that each scan is informative of GA and including high-probability scans in a dataset, and determining, using the included scans, whether GA is present or likely to occur, wherein the GA detection algorithm includes at least one machine learning algorithm and is trained using one or more datasets associated with related GA events; and outputting, by the GA detection algorithm, information indicating whether or not GA is present or likely to occur.

Disclosed herein is a method of detecting geographic atrophy (GA) comprising using a disclosed system.

Disclosed herein is a non-transitory computer readable medium comprising computer executable instructions that when executed by at least one processor of a computer cause the computer to perform steps according to a disclosed method and/or in a disclosed system.

Disclosed herein is a system using machine learning to detect a prescribed condition, the system comprising at least one processor; a memory; and a computing platform including the at least one processor and the memory, wherein the computing platform is configured for receiving, as input, a plurality of volumetric scan images; generating, using a trained detection algorithm, a probabilistic likelihood that each scan is informative of the prescribed condition and including high-probability scans in a dataset, and determining, using the included scans, whether the prescribed condition is present or likely to occur, wherein the detection algorithm includes at least one machine learning algorithm and is trained using one or more datasets associated with the prescribed condition; and outputting, by the detection algorithm, information indicating whether or not the prescribed condition is present or likely to occur.

Disclosed herein is a method for determining macular degeneration in a subject, the method comprising analyzing volumetric data; wherein features of geographic atrophy or neovascular age-related macular degeneration are identified; and the measure or level of said features is predictive of current geographic atrophy and vision loss.

Disclosed herein is a method for identifying SD-OCT features predictive for macular degeneration in a subject, the method comprising obtaining a plurality of volumetric scan images; analyzing said scans via longitudinal spectral-domain optical coherence tomography (SD-OCT); identifying features associated with geographic atrophy; generating a logarithm predictive of the presence or future development of geographic atrophy with two years time.

Disclosed herein are any and all methods, processes, devices, systems, kits, products, materials, compositions and/or uses shown and/or described expressly or by implication in the information provided herewith, including but not limited to features that may be apparent and/or understood by those of skill in the art The Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure provides all that is described and illustrated herein.

BRIEF DESCRIPTION OF THE SEVERAL VIEWS OF THE DRAWINGS

The accompanying Figures, Examples, and Appendices are provided by way of illustration and not by way of limitation. The foregoing aspects and other features of the disclosure are explained in the following description, taken in connection with the accompanying example figures (also "FIG.") relating to one or more embodiments.

FIG. 4A shows attention maps of eyes with current GA, FIG. 4B shows attention maps of intermediate AMD that will convert to GA in 1 year, and FIG. 4C shows attention maps of intermediate AMD patients that did not convert to GA during the time period studied. Images in rows 1 and 3 show the attention maps (features highlighted in red) and images in rows 2 and 4 their corresponding original OCT scans. GA probability of the scan and corresponding whole eyes are denoted as p and p'. Red dots high-light areas that the model identifies most related to GA or pre-GA. For intermediate AMD patients that did not convert to GA during the time-period studied, the red dots are usually decentralized, suggesting that the model does not find an area which can be classified as GA or pre-GA with high probability.

FIG. 12 shows saliency maps on GA dataset based on models trained with PPI and without PPI.

DETAILED DESCRIPTION OF THE INVENTION

Figure 1:
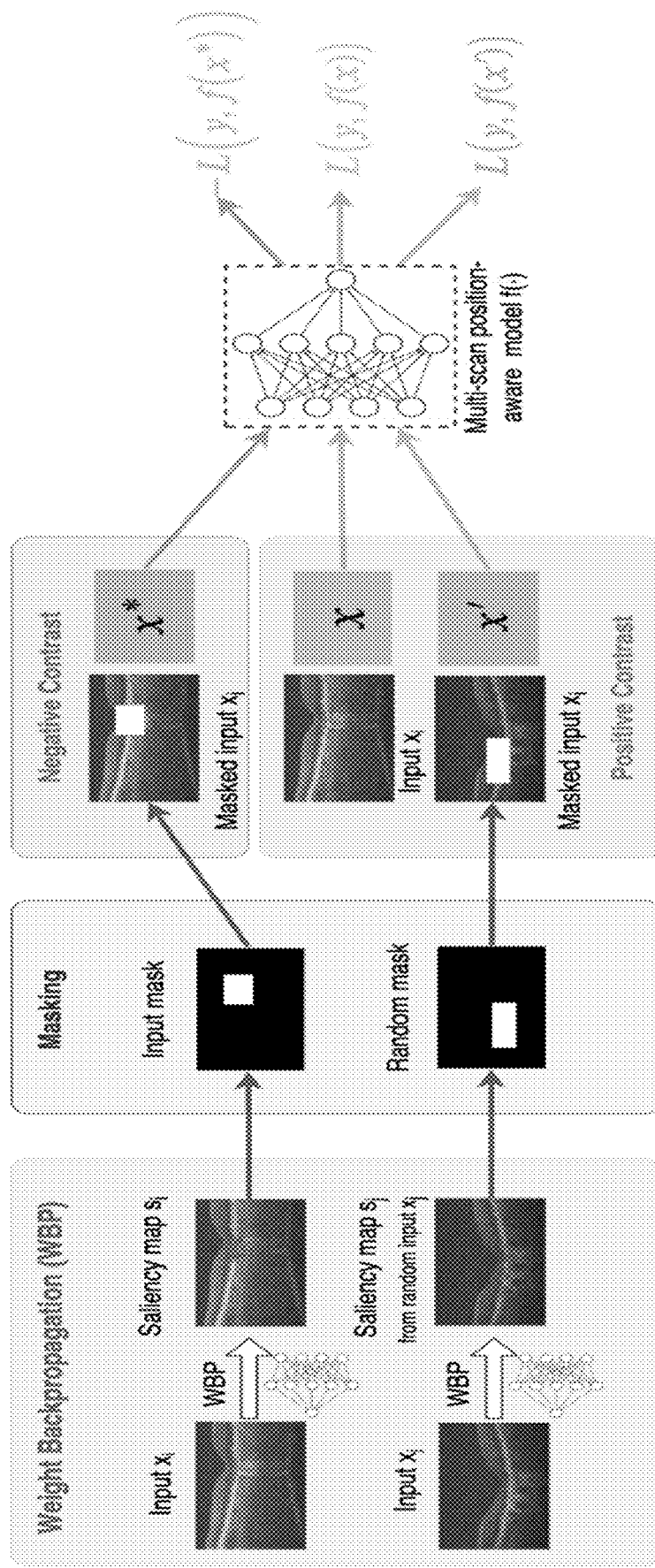
FIG. 1 shows learning with Proactive Pseudo Interventions. Saliency maps are obtained via WBP. Negative contrasts are constituted by masking out the saliency map from the input scans. Positive contrasts are constituted by either using the input scans without masking or by using a randomly selected mask. The multi-scan position-aware model makes predictions on both negative and positive contrasts.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like. In some embodiments, the subject comprises a human who is undergoing a treatment using a system or method as prescribed herein.

As used herein, the term "diagnosed" means having been subjected to an examination by a person of skill, for example, a physician, and found to have a condition that can be diagnosed or treated by one or more of the disclosed compositions and/or systems, or by one or more of the disclosed methods. For example, "diagnosed with macular degeneration" means having been subjected to an examination by a person of skill, for example, a physician, and found to have a condition that can be treated by one or more of the disclosed compositions and/or systems, or by one or more of the disclosed methods. For example, "suspected of having macular degeneration" can mean having been subjected to an examination by a person of skill, for example, a physician, and found to have a condition that can likely be treated by one or more of the disclosed compositions and/or systems, or by one or more of the disclosed methods. In an aspect, an examination can be physical, can involve various tests (e.g., blood tests, genotyping, biopsies, etc.) and assays (e.g., enzymatic assay), or a combination thereof.

As used herein, "inhibit," "inhibiting", and "inhibition" mean to diminish or decrease an activity, level, response, condition, severity, disease, or other biological parameter. This can include, but is not limited to, the complete ablation of the activity, level, response, condition, severity, disease, or other biological parameter. This can also include, for example, a 10% inhibition or reduction in the activity, level, response, condition, severity, disease, or other biological parameter as compared to the native or control level (e.g., a subject not having macular degeneration or age-related macular degeneration). Thus, in an aspect, the inhibition or reduction can be a 10%, 20%, 30%, 40%, 50%, 60%, 70%, 80%, 90%, 100%, or any amount of reduction in between as compared to native or control levels. In an aspect, the inhibition or reduction can be 10-20%, 20-30%, 30-40%, 40-50%, 50-60%, 60-70%, 70-80%, 80-90%, or 90-100% as compared to native or control levels. In an aspect, the inhibition or reduction can be 0-25%, 25-50%, 50-75%, or 75-100% as compared to native or control levels.

The words "treat" or "treating" or "treatment" include palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In an aspect, the terms cover any treatment of a subject, including a mammal (e.g., a human), and includes: (i) preventing the undesired physiological change, disease, pathological condition, or disorder from occurring in a subject that can be predisposed to the disease but has not yet been diagnosed as having it; (ii) inhibiting the physiological change, disease, pathological condition, or disorder, i.e., arresting its development; or (iii) relieving the physiological change, disease, pathological condition, or disorder, i.e., causing regression of the disease. For example, in an aspect, treating macular degeneration or age-related macular degeneration can reduce the severity of an established disease in a subject by 1%-100% as compared to a control (such as, for example, an individual not having macular degeneration or age-related macular degeneration). In an aspect, treating can refer to a 1%, 2%, 3%, 4%, 5%, 6%, 7%, 8%, 9%, 10%, 20%, 30%, 40%, 50%, 60%, 70%, 80%, 90%, or 100% reduction in the severity of macular degeneration or age-related macular degeneration. For example, treating macular degeneration or age-related macular degeneration can reduce one or more symptoms of the disease in a subject by 1%-100% as compared to a control (such as, for example, an individual not having macular degeneration or age-related macular degeneration). In an aspect, treating can refer to 1%, 2%, 3%, 4%, 5%, 6%, 7%, 8%, 9%, 10%, 20%, 30%, 40%, 50%, 60%, 70%, 80%, 90%, 100% reduction of one or more symptoms of an established macular degeneration or age-related macular degeneration. It is understood that treatment does not necessarily refer to a cure or complete ablation or eradication of macular degeneration or age-related macular degeneration. However, in an aspect, treatment can refer to a cure or complete ablation or eradication of macular degeneration or age-related macular degeneration.

As used herein, the phrase "identified to be in need of treatment for a disorder," or the like, refers to selection of a subject based upon need for treatment of the disorder. For example, a subject can be identified as having a need for treatment of a disorder (e.g., such as macular degeneration or age-related macular degeneration) based upon an earlier diagnosis by a person of skill and thereafter subjected to treatment for the disorder (e.g., such as macular degeneration or age-related macular degeneration). In an aspect, the identification can be performed by a person different from the person making the diagnosis. In an aspect, the administration can be performed by one who performed the diagnosis.

As used herein, the term "prevent" or "preventing" or "prevention" refers to precluding, averting, obviating, forestalling, stopping, or hindering something from happening, especially by advance action. It is understood that where reduce, inhibit, or prevent are used herein, unless specifically indicated otherwise, the use of the other two words is also expressly disclosed. In an aspect, preventing macular degeneration or age-related macular degeneration is intended. The words "prevent" and "preventing" and "prevention" also refer to prophylactic or preventative measures for protecting or precluding a subject (e.g., an individual) not having a macular degeneration- or age-related macular degeneration-related complication from progressing to that complication.

As used herein, the terms "administering" and "administration" refer to any method of providing one or more of the disclosed compositions thereof to a subject. Such methods are well-known to those skilled in the art and include, but are not limited to, the following: oral administration, transdermal administration, administration by inhalation, nasal administration, topical administration, in utero administration, intrahepatic administration, intravaginal administration, intracerebroventricular (ICV) administration, ophthalmic administration, intraaural administration, otic administration, intracerebral administration, rectal administration, sublingual administration, buccal administration, and parenteral administration, including injectable such as intravenous administration, intra-CSF administration, intra-cistern magna (ICM) administration, intra-arterial administration, intrathecal (ITH) administration, intramuscular administration, and subcutaneous administration. Administration can comprise administration directly into the CNS or the PNS. Administration can be continuous or intermittent. Administration can comprise a combination of one or more route. In an aspect, a disclosed combination can be concurrently and/or serially administered to a subject via multiple routes of administration. Various combinations of administration are known to the skilled person.

In an aspect, the skilled person can determine an efficacious dose, an efficacious schedule, and an efficacious route of administration for one or more of the disclosed isolated nucleic acid molecules, disclosed vectors, disclosed pharmaceutical formulations, or a combination thereof so as to treat or prevent macular degeneration or age-related macular degeneration. In an aspect, the skilled person can also alter, change, or modify an aspect of an administering step to improve efficacy of one or more of the disclosed compositions.

As used herein, "modifying the method" can comprise modifying or changing one or more features or aspects of one or more steps of a disclosed method. For example, in an aspect, a method can be altered by changing the amount of one or more of the disclosed compositions administered to a subject, or by changing the frequency of administration of one or more of the disclosed compositions to a subject, or by changing the duration of time one or more of the disclosed compositions are administered to a subject.

As used herein, "determining" can refer to measuring or ascertaining the presence and severity of macular degeneration or age-related macular degeneration. Methods and techniques used to determine the presence and/or severity macular degeneration or age-related macular degeneration are typically known to the medical arts. For example, the art is familiar with the ways to identify and/or diagnose the presence, severity, or both of macular degeneration or age-related macular degeneration.

As used herein, "effective amount" and "amount effective" can refer to an amount that is sufficient to achieve the desired result such as, for example, the treatment and/or prevention of macular degeneration or age-related macular degeneration or a suspected macular degeneration or age-related macular degeneration. As used herein, the terms "effective amount" and "amount effective" can refer to an amount that is sufficient to achieve the desired an effect on an undesired condition (e.g., macular degeneration or age-related macular degeneration). For example, a "therapeutically effective amount" refers to an amount that is sufficient to achieve the desired therapeutic result or to have an effect on undesired symptoms but is generally insufficient to cause adverse side effects. In an aspect, "therapeutically effective amount" means an amount of a disclosed isolated nucleic acid molecule, a disclosed vector, or a disclosed pharmaceutical formulation; that (i) treats the particular disease, condition, or (such as macular degeneration or age-related macular degeneration), (ii) attenuates, ameliorates, or eliminates one or more symptoms of the particular disease, condition, or disorder (e.g., macular degeneration or age-related macular degeneration), or (iii) delays the onset of one or more symptoms of the particular disease, condition, or disorder described herein (e.g., macular degeneration or age-related macular degeneration). The specific therapeutically effective dose level for any particular patient will depend upon a variety of factors including the disorder being treated and the severity of the disorder; the disclosed isolated nucleic acid molecules, disclosed vectors, disclosed pharmaceutical formulations employed; the disclosed methods employed; the age, body weight, general health, sex and diet of the patient; the time of administration; the route of administration; the rate of excretion of the disclosed compositions, disclosed isolated nucleic acid molecules, disclosed vectors, or disclosed pharmaceutical formulations employed; the duration of the treatment; drugs used in combination or coincidental with disclosed compositions, disclosed isolated nucleic acid molecules, disclosed vectors, or disclosed pharmaceutical formulations employed, and other like factors well-known in the medical arts. For example, it is well within the skill of the art to start doses of the disclosed compositions, disclosed isolated nucleic acid molecules, disclosed vectors, or disclosed pharmaceutical formulations at levels lower than those required to achieve the desired therapeutic effect and to gradually increase the dosage until the desired effect is achieved. If desired, then the effective daily dose can be divided into multiple doses for purposes of administration. Consequently, a single dose of the disclosed isolated nucleic acid molecules, disclosed vectors, or disclosed pharmaceutical formulations can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition, such as, for example, macular degeneration or age-related macular degeneration.

Unless otherwise defined, all technical terms used herein have the same meaning as commonly understood by one of ordinary skill in the art to which this disclosure belongs.

References in the specification and concluding claims to parts by weight of a particular element or component in a composition denotes the weight relationship between the element or component and any other elements or components in the composition or article for which a part by weight is expressed. Thus, in a compound containing 2 parts by weight component X and 5 parts by weight component Y, X and Y are present at a weight ratio of 2:5, and are present in such ratio regardless of whether additional components are contained in the compound.

As used herein, the terms "optional" or "optionally" means that the subsequently described event or circumstance can or cannot occur, and that the description includes instances where said event or circumstance occurs and instances where it does not. In an aspect, a disclosed method can optionally comprise one or more additional steps, such as, for example, repeating an administering step or altering an administering step.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted herein as tables, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Processors, memory, network interfaces, I/O interfaces, and displays noted above are, or includes, hardware devices (for example, electronic circuits or combinations of circuits) that are configured to perform various different functions for a computing device, such as computer.

In some embodiments, each or any of the processors is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors uses an instruction set architecture such as x86 or Advanced RISC Machine (ARM).

In some embodiments, each or any of the memory devices is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors). Memory devices are examples of non-volatile computer-readable storage media.

In some embodiments, each or any of the network interface devices includes one or more circuits (such as a baseband processor and/or a wired or wireless transceiver), and implements layer one, layer two, and/or higher layers for one or more wired communications technologies (such as Ethernet (IEEE 802.3) and/or wireless communications technologies (such as Bluetooth, WiFi (IEEE 802.11), GSM, CDMA2000, UMTS, LTE, LTE-Advanced (LTE-A), 5G, and/or other short-range, mid-range, and/or long-range wireless communications technologies). Transceivers may comprise circuitry for a transmitter and a receiver.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, storage area network (SAN) systems, and/or any other appropriate tangible computer readable storage medium. It also will be appreciated that the techniques described herein may be accomplished by having a processor execute instructions that may be tangibly stored on a computer readable storage medium.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), Bluetooth, and TCP/IP, CDMA, 5G, etc.; and/or (iv) encrypted to ensure privacy or prevent fraud in any of a variety of ways well known in the art.

One obstacle in the advancement of treatment for geographic atrophy (GA) secondary to age-related macular degeneration (AMD) is the ability to identify the condition in its early stages. Some attempted clinical trials have failed at least in part because it is difficult to predict which patients will develop GA, and particularly so within a given time period. This limits the opportunity to recruit an ideal study population and to follow patients from an earlier stage that precedes genesis of GA.

The present disclosure addresses these and other challenges by providing systems, methods, and algorithms for identifying and/or predicting the onset of GA. This is accomplished by extracting from a volumetric image set the images that have a higher likelihood of indicating GA and using these images to predict the progression of the condition.

Disclosed herein is a system using machine learning in detecting geographic atrophy (GA), the system comprising at least one processor; a memory; and a computing platform including the at least one processor and the memory, wherein the computing platform is configured for receiving, as input, a plurality of OCT volume scan images; generating, using a trained GA detection algorithm, a probabilistic likelihood that each scan is informative of GA and including high-probability scans in a dataset, and determining, using the included scans, whether GA is present or likely to occur, wherein the GA detection algorithm includes at least one machine learning algorithm and is trained using one or more datasets associated with related GA events; and outputting, by the GA detection algorithm, information indicating whether or not GA is present or likely to occur.

Disclosed herein is a method of detecting geographic atrophy (GA), comprising using a disclosed system. Disclosed herein is a method of detecting geographic atrophy (GA), comprising using a system comprising at least one processor; a memory; and a computing platform including the at least one processor and the memory, wherein the computing platform is configured for receiving, as input, a plurality of OCT volume scan images; generating, using a trained GA detection algorithm, a probabilistic likelihood that each scan is informative of GA and including high-probability scans in a dataset, and determining, using the included scans, whether GA is present or likely to occur, wherein the GA detection algorithm includes at least one machine learning algorithm and is trained using one or more datasets associated with related GA events; and outputting, by the GA detection algorithm, information indicating whether or not GA is present or likely to occur.

Disclosed herein is a non-transitory computer readable medium comprising computer executable instructions that when executed by at least one processor of a computer cause the computer to perform steps according to a disclosed method and/or performed by a disclosed system.

Disclosed herein is a non-transitory computer readable medium comprising computer executable instructions that when executed by at least one processor of a computer cause the computer to perform receiving, as input, a plurality of OCT volume scan images; generating, using a trained GA detection algorithm, a probabilistic likelihood that each scan is informative of GA and including high-probability scans in a dataset, and determining, using the included scans, whether GA is present or likely to occur, wherein the GA detection algorithm includes at least one machine learning algorithm and is trained using one or more datasets associated with related GA events; and outputting, by the GA detection algorithm, information indicating whether or not GA is present or likely to occur. As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Disclosed herein is a system using machine learning to detect a prescribed condition, the system comprising at least one processor; a memory; and a computing platform including the at least one processor and the memory, wherein the computing platform is configured for receiving, as input, a plurality of volumetric scan images; generating, using a trained detection algorithm, a probabilistic likelihood that each scan is informative of the prescribed condition and including high-probability scans in a dataset, and determining, using the included scans, whether the prescribed condition is present or likely to occur, wherein the detection algorithm includes at least one machine learning algorithm and is trained using one or more datasets associated with the prescribed condition; and outputting, by the detection algorithm, information indicating whether or not the prescribed condition is present or likely to occur.

Disclosed herein is a method for determining macular degeneration in a subject, the method comprising analyzing volumetric data; wherein features of geographic atrophy or neovascular age-related macular degeneration are identified; and the measure or level of said features is predictive of current geographic atrophy and vision loss. In an aspect, analyzing volumetric data can further comprise analyses of longitudinal spectral-domain optical coherence tomography (SD-OCT) volumetric data. In an aspect, a disclosed method can be predictive of one or 2-year progression of geographic atrophy.

Disclosed herein is a method for identifying SD-OCT features predictive for macular degeneration in a subject, the method comprising obtaining a plurality of volumetric scan images; analyzing said scans via longitudinal spectral-domain optical coherence tomography (SD-OCT); identifying features associated with geographic atrophy; generating a logarithm predictive of the presence or future development of geographic atrophy with two years time.

Disclosed herein are any and all methods, processes, devices, systems, kits, products, materials, compositions and/or uses shown and/or described expressly or by implication in the information provided herewith, including but not limited to features that may be apparent and/or understood by those of skill in the art.

It is further noted that the present disclosure is not limited to GA and can be adapted to broader applications outside of eye disease. Specifically, the disclosed systems, method, and algorithms can be applied to many types of volumetric imaging data in order to select useful images and predict a given condition. In a non-limiting example, the present disclosure can be applied to identifying lung lesions from CT scans.

One aspect of the present disclosure provides a model for predicting the presence or likelihood of GA in a subject. Inspired by the multi-view Convolutional Neural Network (CNN) architecture, and the observation that Spectral Domain Optical Coherence Tomography (SD-OCT) volumetric scans in different locations of the eye manifest preferential ability to identify GA, the present disclosure proposes an end-to-end location-aware scan-based volumetric image classification model.

Provided the M=100 scans of an SD-OCT volume, for the i-th scan, the model uses a shared CNN image feature extractor to obtain scan features $f_i$ that are then fed to a fully-connected (FC) layer with sigmoid activation function to obtain scan-wise pre-classification GA probabilities $p_i$. The CNN image feature extractor has the structure of the Inception V3 neural network, which was initialized with parameters from the Inception V3 architecture pre-trained on natural images from ImageNet. Attention maps are generated from the CNN feature extractor to mask out (probabilistically) regions of the scan that are not informative of GA, thus not contributing to $p_i$. Subsequently, pre-classification GA probabilities $p_i$ from different scans are aggregated, for which different approaches were considered, such as a simple average (i.e., mean pooling). However, some image scans seem to be more informative of GA than others, in terms of their $p_i$ values, indicating that scan position may be leveraged for improved GA identification. Thus, one embodiment proposes position-aware view pooling, where each scan is assigned a position identifier (Position_i) ranging from 1 to M. The model first uses a transformation layer to embed the position identifier into a 6-dimensional positional feature vector $e_i$. Then, feature vector $f_i$ and positional feature $e_i$ are concatenated and fed into a fully-connected layer to obtain $a_i=FC_2([f_i, e_i])$, which are converted to attention weights $w_i$ (e.g., $w_{11}$, $w_{12}$, $w_{21}$, $w_{22}$, $w_{31}$, and $w_{32}$) by feeding the $a_i$ into a softmax function, so $\Sigma_{i=1}^{M} w_i=1$. The final probability of GA for a given SD-OCT volume is the weighted summation of the attention weights $w_i$ and corresponding pre-classification probabilities $p_i$ for all scans, $p(GA)=\Sigma_{i=1}^{M} w_i p_i$.

The model is trained to maximize the weighted binary cross-entropy loss, i.e., the likelihood that scans from SD-OCT inputs are correctly assigned (prognosticated) to either the GA or control groups in the assessment of the upcoming year, while adversarially encouraging that regions masked-out by the attention maps are not informative of GA. Additionally, the model concurrently predicts (diagnoses) the probability of GA in the current year. The model is configured to learn p(GA) in the current and next year simultaneously to encourage it to achieve a more informative and robust feature extractor.

In an example embodiment, the model was coded in PyTorch and trained with the Adam Optimizer on a GPU TITAN Xp for 100 epochs with a learning rate of 0.0005 and a decay of 0.5 applied to the learning rate at every 10 epochs.

One example dataset available for model training consists of 44,520 512×1000 pixels SD-OCT scans corresponding to 1088 individuals, 20% of which (9640 scans) correspond to GA patients. A major concern associated with limited labeled data is over-fitting, meaning the model performs very well on the training data (over-fitting the observed data), but performs poorly on testing (unobserved or new data). Consequently, model performance was estimated via 5-fold cross-validation to maximize the data available for model training while still being able to properly estimate performance characteristics.

Figure 7:
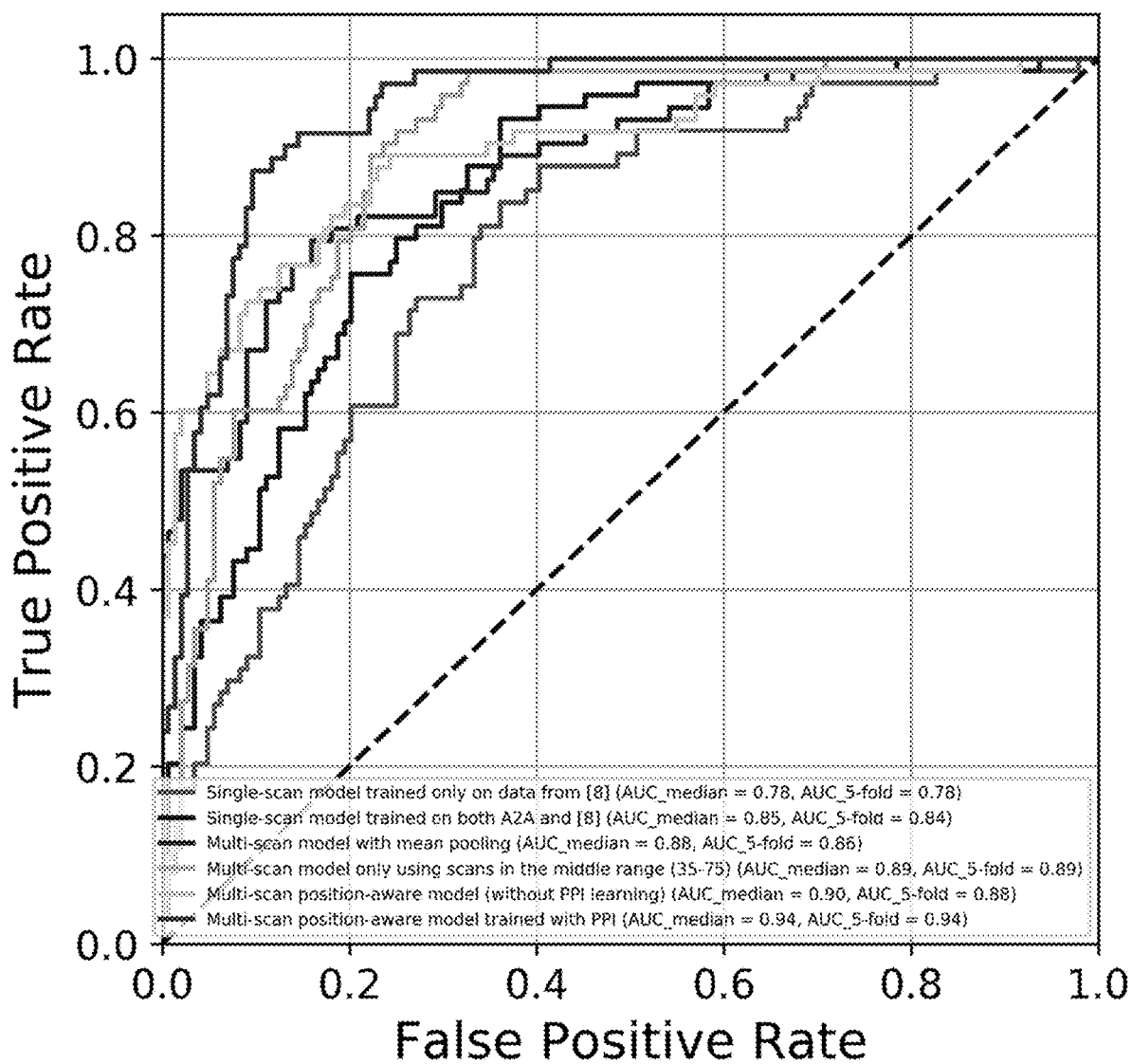
FIG. 7 shows a ROC curves for the proposed model for prediction of GA in the next year.

Specifically, Area under the Curve (AUC) of the Receiver Operating Characteristic (ROC) is reported, as well as Standard Deviation (SD) over the 5 folds to represent performance variability. See, e.g., FIG. 7. Further, confusion matrices and their summaries are presented (sensitivity, specificity, positive predictive value, negative predictive value and accuracy) obtained by thresholding the predictions, values, from the model with thresholds estimated via Youden's index.

Additional details of the disclosed model and example embodiments are described in the accompanying Appendices.

Another aspect of the present disclosure provides a method of determining the presence of, or likely onset of, prescribed condition using the disclosed algorithm.

Another aspect of the present disclosure provides a system for determining the presence of, or likely onset of, a prescribed condition. In some embodiments, the system comprises, a computer having a processor and a memory configured to execute the disclosed algorithm. The system can also comprise an optional volumetric imaging device.

Another aspect of the present disclosure provides all that is described and illustrated herein.

The systems and methods described herein can be implemented in hardware, software, firmware, or combinations of hardware, software and/or firmware. In some examples, the systems and methods described in this specification may be implemented using a non-transitory computer readable medium storing computer executable instructions that when executed by one or more processors of a computer cause the computer to perform operations. Computer readable media suitable for implementing the systems and methods described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a system or method described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

EXAMPLES

Age-related macular degeneration (AMD) is the leading cause of blindness in the elderly. Advanced disease results in either irreversible loss of vision in the dry form of geographic atrophy (GA), or in retinal exudation in neovascular AMD (NVAMD). To date, no treatments have been approved to reverse or prevent GA. Although the vision loss in NVAMD is typically reversible with timely and frequent intravitreal injections of anti-vascular endothelial growth factors (VEGF) medications, these treatments are associated with a high burden of care and significant medical costs. Patients with intermediate AMD (iAMD) are at increased risk for development of NVAMD or GA, and may be targeted in future clinical trials with the goal of preventing onset of advanced disease. Our long-term goal is to understand the mechanisms for progression to late stages of AMD and to develop predictive biomarkers that will facilitate clinical trials of iAMD and GA and timely standard of care treatment for NVAMD for improved clinical outcomes.

Recently, some promising retinal imaging biomarkers have been described on high resolution spectral domain optical coherence tomography (SD-OCT). Reticular pseudodrusen, hyperreflective foci, quantitative measurements of the RPE drusen complex volumes, RPE and outer retinal atrophy, and drusen area have been associated with progression to GA and NVAMD. A deep learning (DL) method employing these imaging biomarkers holds promise, as an unsupervised algorithm is not biased by our prior knowledge or gaps, therefore it has the potential to uncover valuable new information about AMD progression. This method also does not require labor-intensive human gradings, therefore the algorithms created can be used in numerous large datasets. The ultimate value of DL analyses in iAMD and GA is the ability to populate a clinical trial with a concentrated, high-risk phenotype of individuals to allow testing of a therapeutic intervention in a shorter timeframe (1-2 years). This DL algorithm will also help physicians decide which patients would be more likely to progress to either GA or NVAND and should be monitored closely to receive a timely intervention. Thirdly, AI can help identify candidate drug targets for future clinical trials if predictive features can be identified and linked to mechanisms of action. While a few DL models based on multimodal imaging have been developed with various degrees of success and performance characteristics, there is a need for very high-performance algorithms that can identify specific SD-OCT biomarkers of GA or NVAMD, essentially opening the "black box" of typical DL models.

To address this important unmet need, we used the longitudinal 7 year SD-OCT data from the Age-Related Eye Disease Study 2 (AREDS2) to develop a DL algorithm with high-performance characteristics to predict GA during the current visit (AUC 0.945) or the likelihood of progression from iAMD to GA in 1 year (AUC 0.937), without the need for human annotation (FIG. 1). In addition, the algorithm identified the specific types of SD-OCT features most predictive of conversion to GA. We hypothesize that 1) using the AREDS2 dataset and the proof of concept established in GA, a high performance DL algorithm can be created to predict conversion from iAMD to NVAMD, 2) that both algorithms can be validated in independent, larger standard of care datasets and 3) that both algorithms can be successfully implemented in a clinical setting, in which algorithm use will be associated with higher clinicians' performance in predicting progression to advanced AMD, with earlier disease treatment and care planning, and higher clinicians' satisfaction levels.

Example 1—Using longitudinal SD-OCT data from AREDS2, develop a DL algorithm with high performance characteristics to predict short-term (1 year) conversion to NVAMD from iAMD and identify SD-OCT features most predictive of NVAMD development.

Example 2—Accomplish clinical validation of the models developed for GA and NVAMD prediction by curating a standard of care validation dataset, and defining phenotypes and features associated with progression or lack of progression from iAMD to advanced AMD.

Example 3—Demonstrate controlled deployment of algorithms in clinic to guide future prospective, large-scale use in standard of care NVAMD treatment and as a potential recruitment tool for clinical trials of iAMD and GA.

The expected outcome is that the proposed project will yield new knowledge about imaging biomarkers of AMD progression. Importantly, this work has the potential to change the standard of care of advanced AMD and to aid in targeted patient recruitment for future clinical trials of nonexudative AMD.

Example 4—Geographic atrophy (GA) is a severe form of age-related macular degeneration (AMD), characterized by loss of photoreceptors, retinal pigment epithelium (RPE), and choriocapillaris. (Sarks J P, et al. (1988) Eye (Lond). 2(Pt. 5): 552-577; Holz F G, et al. (2014) Ophthalmology. 121(5):1079-1091). These changes result in irreversible, progressive loss of visual function initially in the perifoveal area, typically in a bilateral distribution, and later in the fovea with debilitating consequences for central vision. (Lindblad A S, et al. (2009) Arch Ophthalmol. 127(9):1168-1174). GA prevalence increases dramatically with age, and currently affects more than 5 million individuals worldwide. (Wong W L, et al. (2014) Lancet Glob Health. 2(2):e106-116; Rudnicka A R, et al. (2015) Am J Ophthalmol. 160(1): 85-93). To date, no treatments have been approved to reverse or prevent GA progression, as all clinical trials have failed due to the incomplete lack of understanding of the pathogenesis and progression of dry AMD, the best endpoints for clinical trials, and the most suitable subjects to be enrolled.

To address this important unmet need, we performed deep learning analyses of longitudinal spectral-domain optical coherence tomography (SD-OCT) volumetric data from the Age-Related Eye Disease Study 2 (AREDS2) Ancillary Spectral-Domain Optical Coherence Tomography (A2A) Study. This study, whose goal was to identify specific SD-OCT patterns that predict vision loss and disease progression, provided the most comprehensive longitudinal dataset of patients with the intermediate stage of dry AMD to date. (Leuschen J N, et al. (2013) Ophthalmology. 120 (1):140-150).

Using human gradings of SD-OCT images from the rich A2A dataset, Toth and collaborators previously showed that specific SD-OCT characteristics such as OCT drusen substructures, (Veerappan M, et al. (2016) Ophthalmology. 123(12):2554-2570) hyper-reflective foci, (Folgar F A, et al. (2012) Invest Ophthalmol Vis Sci. 53(8):4626-4633; Christenbury J G, et al. (2013) Ophthalmology. 120(5):1038-1045) as well as quantitative SD-OCT measurements of the RPE drusen complex volumes and RPE layer atrophy or absence (Farsiu S, et al. (2014) Ophthalmology. 121(1):162-172; Folgar F A, et al. (2016) Ophthalmology. 123(1):39-50) were independent pre-atrophic markers that predicted the 2-year progression to GA as defined on color photography. However, the definition of GA has been recently updated to be determined by SD-OCT criteria rather than via color photography criteria. (Wu Z, et al. (2014) Ophthalmology. 121(12):2415-2422; Sadda S R, et al. (2016) Retina. 36(10): 1806-1822; Holz F G, et al. (2017) Ophthalmology. 124(4): 464-478). The objective of this study was the development of a deep learning algorithm with the ability to provide a high-performance classifier to predict either the presence of GA during the current visit or the likelihood of progression from intermediate AMD to OCT-determined GA in 1 year based on SD-OCT retinal images alone, without the need for human grader annotation. In addition, the algorithm identified the specific types of SD-OCT features that can collectively increase the probability of new progression from intermediate AMD to the severe stage of nonexudative AMD.

Study Design. The A2A SD-OCT Study (ClinicalTrials.gov identifier NCT00734487) was an ancillary observational prospective study of a subset of eyes from the AREDS2 conducted at four sites (National Eye Institute, Duke Eye Center, Emory Eye Center, and Devers Eye Institute). (Leuschen J N, et al. (2013) Ophthalmology. 120(1):140-150). AREDS2 (NCT00345176) was a multi-center, prospective randomized trial performed to test the effect of oral nutritional supplements on AMD progression. (Chew E Y, et al. (2012) Ophthalmology. 119(11):2282-2289). The goal of the A2A study was to determine whether specific patterns on SD-OCT can predict progression of intermediate AMD. The A2A study was approved at each of the four clinical sites by the Institutional Review Board. Informed research consent was obtained from each participant before study procedures were undertaken. The protocol followed tenets of human research as presented in the Declaration of Helsinki.

The A2A study enrolled individuals deemed to be at high risk of progression to advanced AMD with (1) bilateral large drusen>125 μm or noncentral GA or (2) large drusen or noncentral GA in one eye and advanced AMD (neovascularization or central GA) in the fellow eye. (Chew E Y, et al. (2012) Ophthalmology. 119(11):2282-2289). The study eye was required to lack advanced AMD, either neovascularization or central GA. (Chew E Y, et al. (2012) Ophthalmology. 119(11):2282-2289; Ferris F L, et al. (2005) Arch Ophthalmol. 123(11):1570-1574). 316 participants with at least 1 eligible eye without advanced AMD were recruited in the A2A study and were followed over 1499 yearly visits during a total 7.4 years of data capture. The mean follow-up for each participant was 4.3 years. In patients in which both eyes were eligible, the right eye was arbitrarily chosen as the study eye. In addition, subjects included in this manuscript needed to have at least 1 follow-up visit SD-OCT volumes of acceptable quality for outcome assessment. In addition, data captured included demographics and results of the annual examination, systemic and eye health data (smoking, use statin, cataract surgery status, weight, diet report, AMD treatment and supplement use etc.), as well as multimodal retinal imaging (multiple types of SD-OCT volumetric scans, color fundus photos, and autofluorescence images). Thus, the A2A study provided the most comprehensive longitudinal dataset of patients with the intermediate stage of dry AMD to date. (Leuschen J N, et al. (2013) Ophthalmology. 120(1):140-150).

In the current analysis, the structural outcome of interest was the endpoint of OCT-GA. In concordance with recent definitions by other groups, (Wu Z, et al. (2014) Ophthalmology. 121(12):2415-2422; Sadda S R, et al. (2016)

Retina. 36(10):1806-1822; Holz F G, et al. (2017) Ophthalmology. 124(4):464-478; Fleckenstein M, et al. (2010) Invest Ophthalmol Vis Sci. 51(8):3846-3852; Fleckenstein M, et al. (2011) Invest Ophthalmol Vis Sci. 52(6):3761-3766). OCT-GA was defined as the presence of all the following three criteria: (1) RPE atrophy or absence, (2) Choroid enhancement, and (3) OPL dipping towards the RPE, together over an area that is at least 175 μm wide in at least 1 direction. Each of the three criteria was previously detailed by prior work (Leuschen J N, et al. (2013) Ophthalmology. 120(1):140-150; Veerappan M, et al. (2016) Ophthalmology. 123(12):2554-2570; Sleiman K, et al. (2017) Ophthalmology. 124(12):1764-1777). Among the 3 types of SD-OCT volumes acquired in the A2A study (6.7×6.7 mm, 5×5 mm and 3×3 mm), we chose the volumes containing the largest amount of information on retinal anatomical features, specifically the dense 100-line 6.7×6.7 mm scans, for algorithm development and outcome assessment.

The model was inspired by the multi-view Convolutional Neural Network (CNN) architecture (Hang S, et al. (2014) Proceedings of the IEEE International Conference on Computer Vision, pp. 945-953), and the observation that SD-OCT volumetric scans in different locations of the eye manifest preferential ability to identify GA, we propose an end-to-end multi-scan position-aware volumetric image classification model. An illustration of the model structure is presented in FIG. 2.

Figure 2:
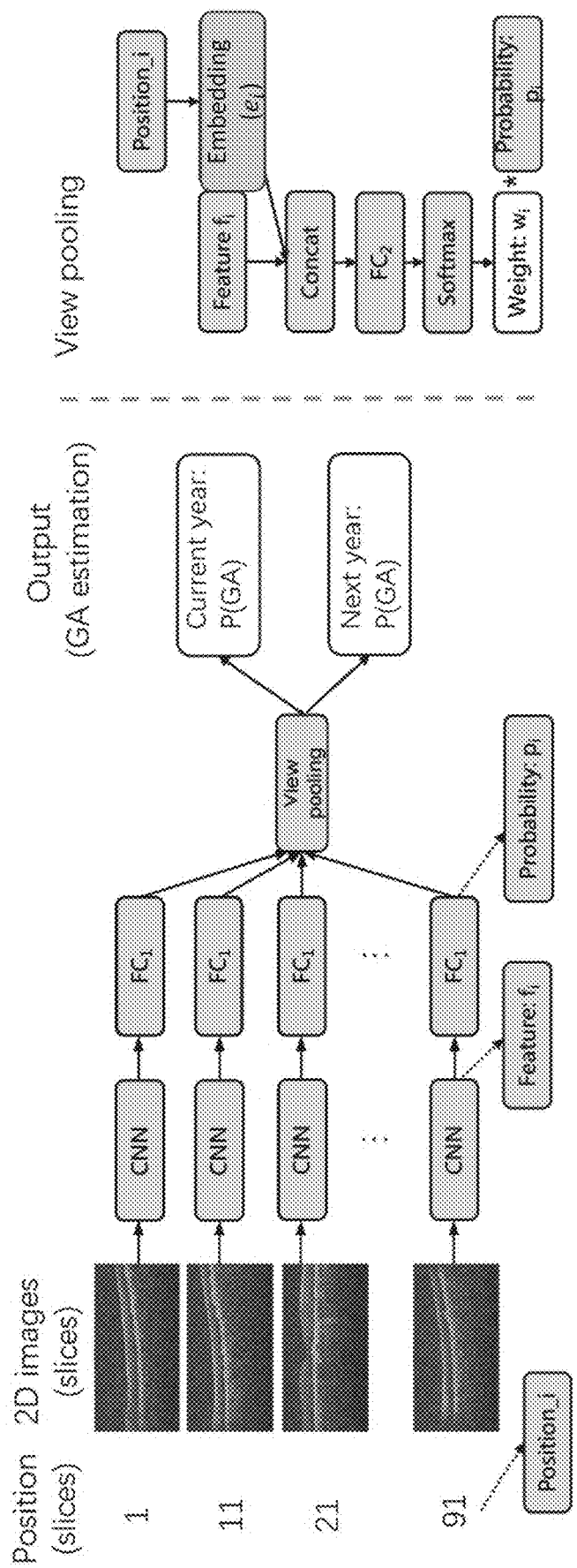
FIG. 2 shows the model architecture of the proposed multi-scan position-aware model for GA pre-diction, simultaneously for diagnosis (current year) and prognosis (next year). The detail in the right-hand-side shows the building blocks of the position-aware module used for view pooling.
Figure 3:
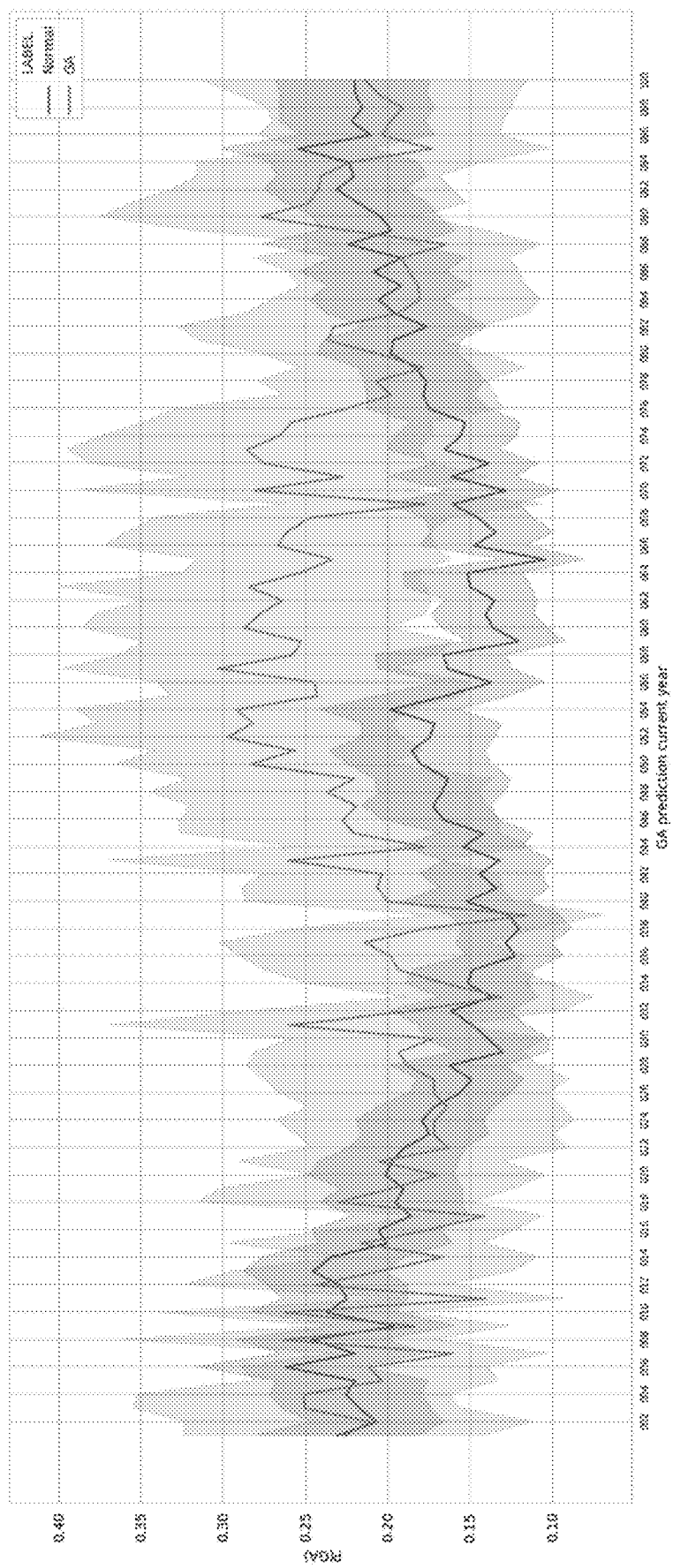
FIG. 3 shows predicted pre-classification values (y-axis) grouped by scans (x-axis) and GA status; orange designates the GA group and blue designates the control group. Lines and shaded areas represent mean and standard deviations for cross-validated predictions obtained from the proposed model.

Provided the M=100 scans of an SD-OCT volume, for the i-th scan, the model used a shared CNN image feature extractor to obtain scan features $f_i$ that were then fed to a fully connected (FC) layer (Basaia S, et al. (2019) Neuroimage Clin. 21:101645; Liu M, et al. (2020) Neuroimage. 208:116459) with sigmoid activation function (Hastie T, et al. (2008) The Elements of Statistical Learning: Data Mining, Inference, and Prediction) to obtain scan-wise pre-classification GA probabilities $p_i$. The CNN image feature extractor has the structure of the Inception V3 neural network, which was initialized with parameters from the Inception V3 architecture (Szegedy C, et al. (2016) Proceedings of the IEEE Conference on Computer Vision and Pattern Recognition) pre-trained on natural images from ImageNet. (Deng J D W, et al. (2009) IEEE Conference on Computer Vision and Pattern Recognition). In order to provide a mechanism to visually interpret model predictions, the model generates attention maps via weight backpropagation (WBP), which probabilistically masks out regions of the scan that do not contribute to the ability of the model for predicting GA, thus not contributing to the estimation of $p_i$. Subsequently, pre-classification GA probabilities $p_i$ from different scans were aggregated, for which we considered different approaches, for instance, a simple average (i.e., mean pooling). However, as shown in FIG. 3, some image scans were more informative of GA than others, in terms of their $p_i$ values when examining the differences in distribution of the GA group relative to the controls, indicating that scan position may be leveraged for improved GA identification. Thus, we proposed the position-aware view pooling, which is illustrated in the right panel of FIG. 2, where each scan is assigned a position identifier ranging from 1 to M. The model first used a transformation layer to embed the position identifier into a 6-dimensional positional feature vector $e_i$. Then, feature vector $f_i$ and positional feature $e_i$ were concatenated and fed into a fully-connected layer to obtain $a_i=FC_2([f_i, e_i])$, which were converted to attention weights $w_i$ by feeding the $a_i$ into a softmax function, so $\Sigma_{i=1}^{M} w_i = 1$. The final probability of GA for a given SD-OCT volume was the weighted summation of the attention weights $w_i$ and corresponding pre-classification probabilities $p_i$ for all scans, $p(GA)=\Sigma_{i=1}^{M} w_i p_i$.

The model was trained in a contrastive learning manner as shown in FIG. 1, to maximize the weighted binary cross-entropy loss, i.e., $L(y, f(x))$, the likelihood that scans from SD-OCT inputs, x, were correctly assigned (prognosticated) to either the GA or control groups, y, in the assessment of the upcoming year, while encouraging that i) regions masked-out by the saliency maps ($S_i$, $S_j$), x*, which we call negative contrasts, were not informative of GA, and ii) unmasked input scans, x, and regions masked-out by a randomly assigned saliency map, x', did not affect the model's ability to predict GA. This strategy is called Proactive Pseudo Intervention (PPI) learning. Additionally, the model concurrently predicted (diagnoses) the probability of GA in the current year, as shown in FIG. 2. We allowed the model to learn p(GA) in the current and next year simultaneously to encourage it to achieve a more informative and robust feature extractor.

The small sample-size of the available dataset placed limitations on the model to be trained. One way to improve model performance is by leveraging additional data. (Sun C, et al. (2017) Proceedings of the IEEE international conference on computer vision, pp. 843-852). We employed a second OCT dataset that was made publicly available by Kermany and colleagues, (Kermany D S, et al. (2018) Cell. 172(5):1122-1131) consisting of 108,312 individual OCT B-scans (not full SD-OCT volumes) from 4,686 individuals. These additional OCT images were labeled for a different classification endpoint, i.e., the identification of choroidal neovascularization (CNV), diabetic macular edema (DME), drusen, and control. Further, the single-scan B-scan images were higher resolution than those from the 100 scan OCT volumes acquired in the A2A SD-OCT Study. To leverage this dataset to improve the model performance on our GA prediction task, we jointly trained our model with our GA cohort and the additional OCT data (Kermany D S, et al. (2018) Cell. 172(5):1122-1131) in a multi-task fashion by sharing the CNN image feature extractor but using separate FC layers for different tasks, i.e., one for GA (current and next year) and the other for CNV, DME, drusen and control prediction.

The model was coded in PyTorch and trained with the Adam Optimizer (Kingma D P, et al. (2014) arXiv preprint arXiv.1412.6980) on a GPU TITAN Xp for 100 epochs with a learning rate of 0.0005 and a decay of 0.5 applied to the learning rate at every 10 epochs. The dataset available for model training consisted of 44,520 512×1000 pixels SD-OCT scans corresponding to 1088 individuals, 20% of which (9640 scans) correspond to GA patients. A major concern associated with limited labeled data was over-fitting, meaning the model performed very well on the training data (over-fitting the observed data), but performed poorly on testing (unobserved or new data). Consequently, we estimated model performance via 5-fold cross-validation to maximize the data available for model training while still being able to properly estimate performance characteristics. Specifically, we reported Area under the Curve (AUC) of the Receiver Operating Characteristic (ROC), as well as Standard Deviation (SD) over the 5 folds to represent performance variability. Further, we presented confusion matrices and their summaries (sensitivity, specificity, positive predictive value, negative predictive value, and accuracy) obtained by thresholding the predictions, values, from the model with thresholds estimated via Youden's index.

FIG. 3 shows that the proposed model roughly identified scans from the range 35-75 of 100 as the most discriminative of GA prediction. Specifically, we present mean (solid lines) and SD (shaded areas) of cross-validated pre-classification p(GA) values stratified into GA and non-GA groups, from which it is apparent that average p(GA) in the range 35-75 is substantially higher in the GA group than that of the controls. Moreover, that scans out of this range (1-34 and 76-100) are much less informative of GA status, as demonstrated by low predicted pre-classification p(GA) values generally lower than 0.25 (FIG. 3).

Table 1 presents AUC (SD) results for the proposed multi-scan position-aware model trained with PPI, along with a variety of related models with simplifying assumptions to show the contributions of individual components of the proposed approach. Specifically, we also show results for: 1) a multi-scan position-aware model (without PPI learning); 2) a multi-scan model only using scans in the middle range (35-75) that seem to be more informative according to FIG. 3) a multi-scan model with mean pooling (without position-aware pooling); 4) a single-scan model trained both on A2A and [8] SD-OCT data that predicts GA based on single scans (without position-aware or mean pooling); 5) a single-scan model trained only on OCT data from the publication of Kermany and colleagues (Kermany D S, et al. (2018) Cell. 172(5):1122-1131); and 6) single-scan model trained on ImageNet. Further, we also present results from a decision tree model on qualitative and quantitative measurements of A2A SD-OCT volumes performed by human graders.

TABLE 1

Performance Characteristics of the Proposed Model (in bold) for Prediction of GA in the Next Year.

| Model | AUC (SD) |
|---|---|
| Multi-scan position-aware model trained with PPI | 0.937 (0.017) |
| Multi-scan position-aware model (without PPI learning) | 0.877 (0.040) |
| Multi-scan model only using scans in the middle range (35-75) | 0.890 (0.047) |
| Multi-scan model with mean pooling | 0.862 (0.030) |
| Single-scan model trained on both A2A and [8] | 0.840 (0.030) |
| Single-scan model trained only on data from [8] | 0.781 (0.026) |
| Single-scan model trained on ImageNet | 0.650 (0.024) |
| Decision tree on quantitative measurements | 0.800 (OOB) |

Figures for current year predictions can be found infra. The results in Table 1 indicate that single-scan models trained on natural images (ImageNet) or public SD-OCT scans (Kermany D S, et al. (2018) Cell. 172(5):1122-1131) do not outperform the random forest model trained on quantitative measurements from A2A SD-OCT data and get substantially outperformed by the single-scan model trained on both A2A SD-OCT volumes and SD-OCT line scans. (Kermany D S, et al. (2018) Cell. 172(5):1122-1131). This demonstrates the importance of using the actual SD-OCT images, and not only quantitative measurements derived from them from SD-OCT volumes specifically acquired to study GA. Position-aware pooling was superior at leveraging the signal from informative scans than the mean-pooling model, however, its performance was not as good as the model that purposefully used scans that were deemed most informative, i.e., in the 35-75 range (FIG. 3). Note that results for the 35-75 range represent the idealized scenario in which the most informative range of scans, which in most practical settings is unknown but in our case was empirically obtained from the results of the proposed model. The most informative range of scans was obtained from the results of the proposed model and was illustrated in FIG. 3. Table 1 shows that the proposed multi-scan position-aware model trained with PPI outperforms the next best model, the multi-scan position-aware model (without PPI learning), by a margin of 0.06 AUC points.

To achieve a deeper understanding of the performance characteristics of the proposed model (multi-scan position-aware model trained with PPI from Table 1), the cross-validated confusion matrices for GA diagnosis (current year) and prognosis (next year) were calculated and shown in Table 2. For the current year prediction of GA, we obtained the following summaries: 93.3% (std 0.052) sensitivity, 85.3% (std 0.059) specificity, 71.4% (std 0.073) positive predictive value, 97.1% (std 0.020) negative predictive value and 87.7% (std 0.039) accuracy. For the prediction of GA in 1 years, we similarly report: 88.4% (std 0.059) sensitivity, 89.5% (std 0.057) specificity, 82.0% (std 0.075) positive predictive value, 94.1% (std 0.075) negative predictive value and 89.1% (std 0.026) accuracy. Classification thresholds for the assignments in Table 2 were obtained via Youden's index, (Youden W J. (1950) Cancer. 3(1):32-35) however, thresholds can be modified accordingly to better suit the clinical use.

TABLE 2

Confusion Matrices for GA Diagnosis (Current Year) and Prognosis (Next Year).

| | | Predictions | | |
|---|---|---|---|---|
| | | Control | GA | Total |
| Current Year-Truth | Control | 667 | 114 | 781 |
| | GA | 20 | 284 | 304 |
| | Total | 687 | 398 | 1085 |
| Next Year-Truth | Control | 645 | 76 | 721 |
| | GA | 42 | 322 | 364 |
| | Total | 687 | 398 | 1085 |

In Table 2, rows represent the ground truth assignments and columns the predictions from the proposed models. Assignments were obtained by thresholding predicted GA probabilities with thresholds chosen by Youden's index in each fold for current and next year, respectively.

Figure 4A:
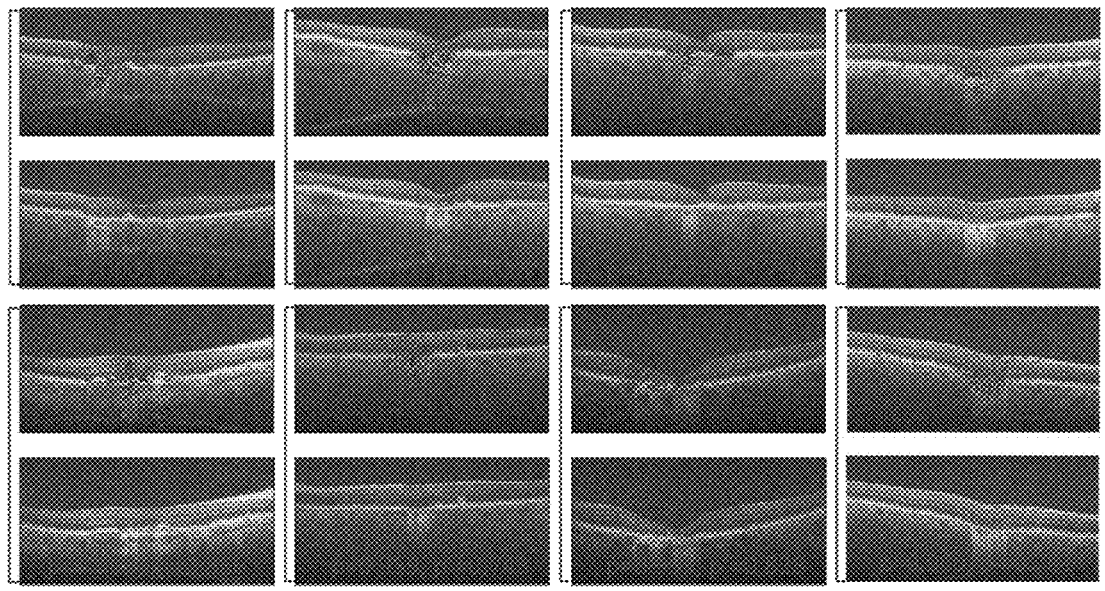
FIG. 4A-FIG. 4C shows attention maps.
Figure 4B:
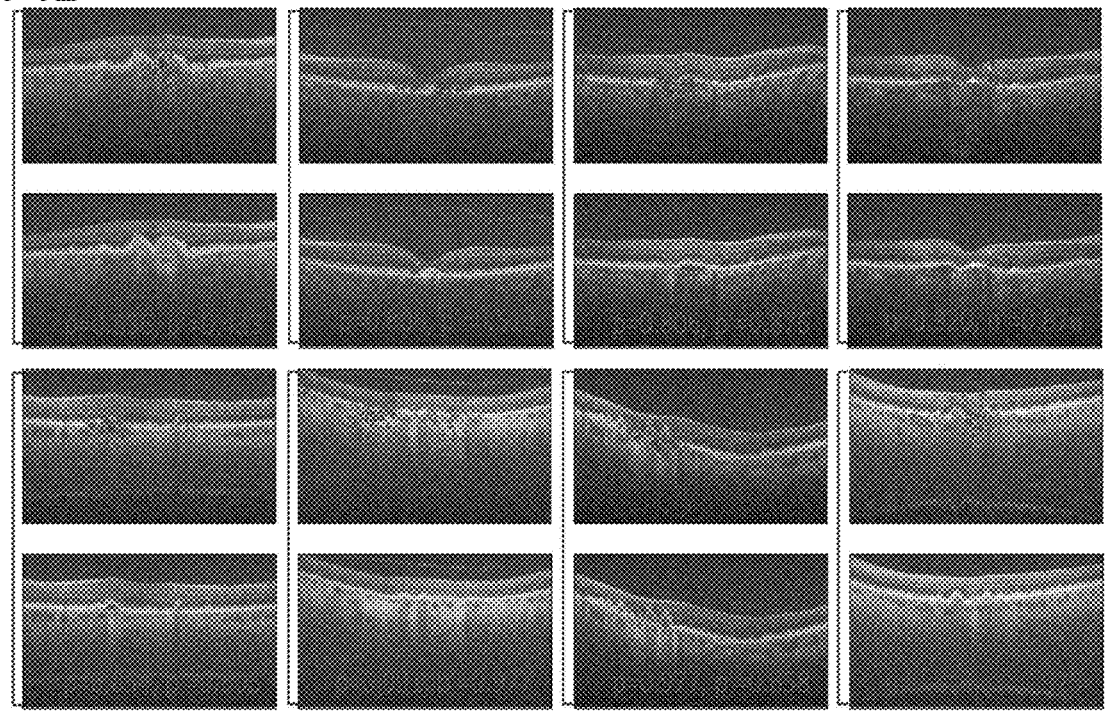
Figure 4C:
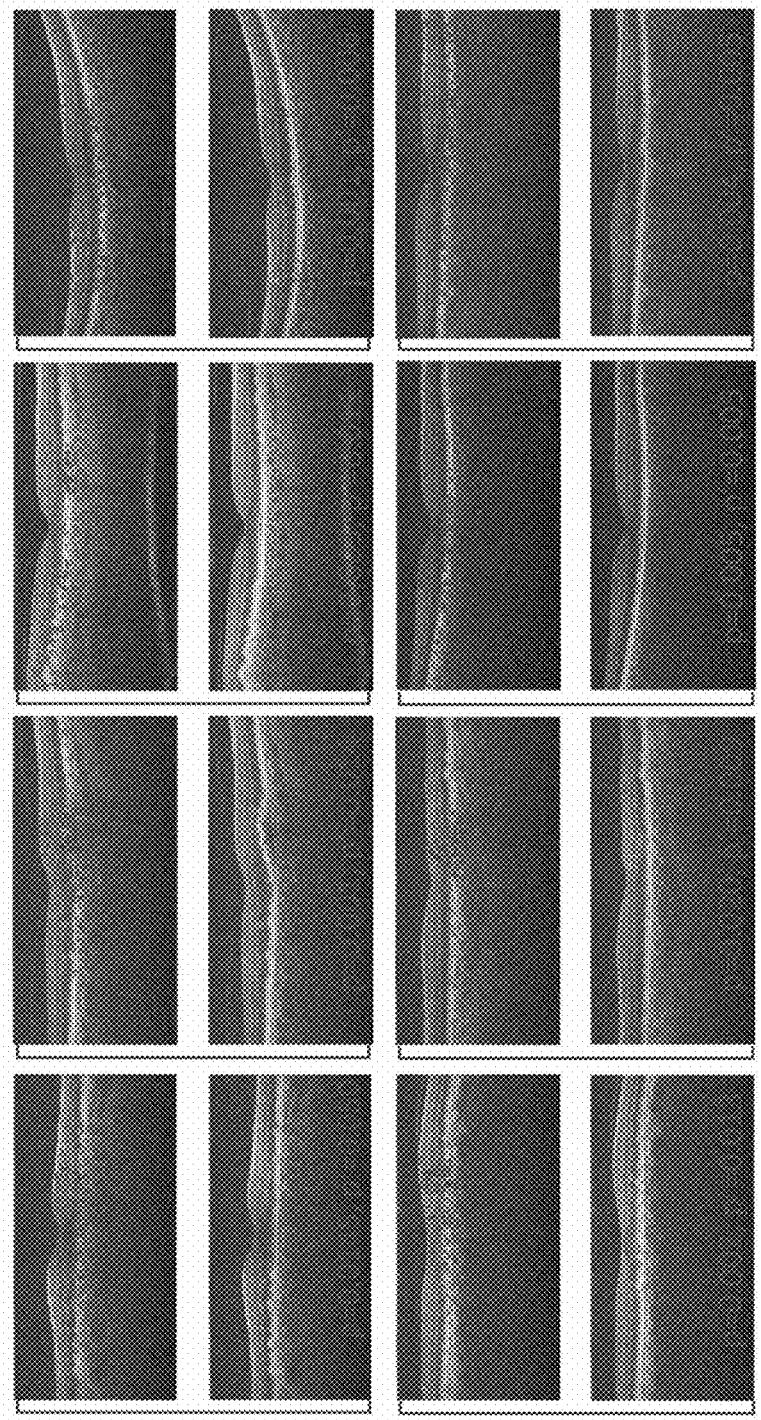

The algorithm generated attention maps for SD-OCT volumes from eyes with current GA (FIG. 4A), eyes with intermediate AMD that will ultimately convert to GA in 1 year (FIG. 4B) and intermediate AMD eyes that will not convert to GA during the time period studied (FIG. 4C). We determined the probability of each SD-OCT volumetric scan and corresponding whole eyes to lead to GA in 1 year. This was denoted as p and p', respectively (FIG. 4A-FIG. 4C). Red dots highlight areas that the model identifies most related to GA or pre-GA. In eyes with current GA, the red dots were primarily concentrated in the GA lesion area along Bruch's membrane, underlying choriocapillaris and choroid, and often in the neurosensory retina over the GA lesion in a vertical distribution through the nerve fiber layer, as well as in the drusen adjacent to GA (FIG. 4A).

Figure 5:
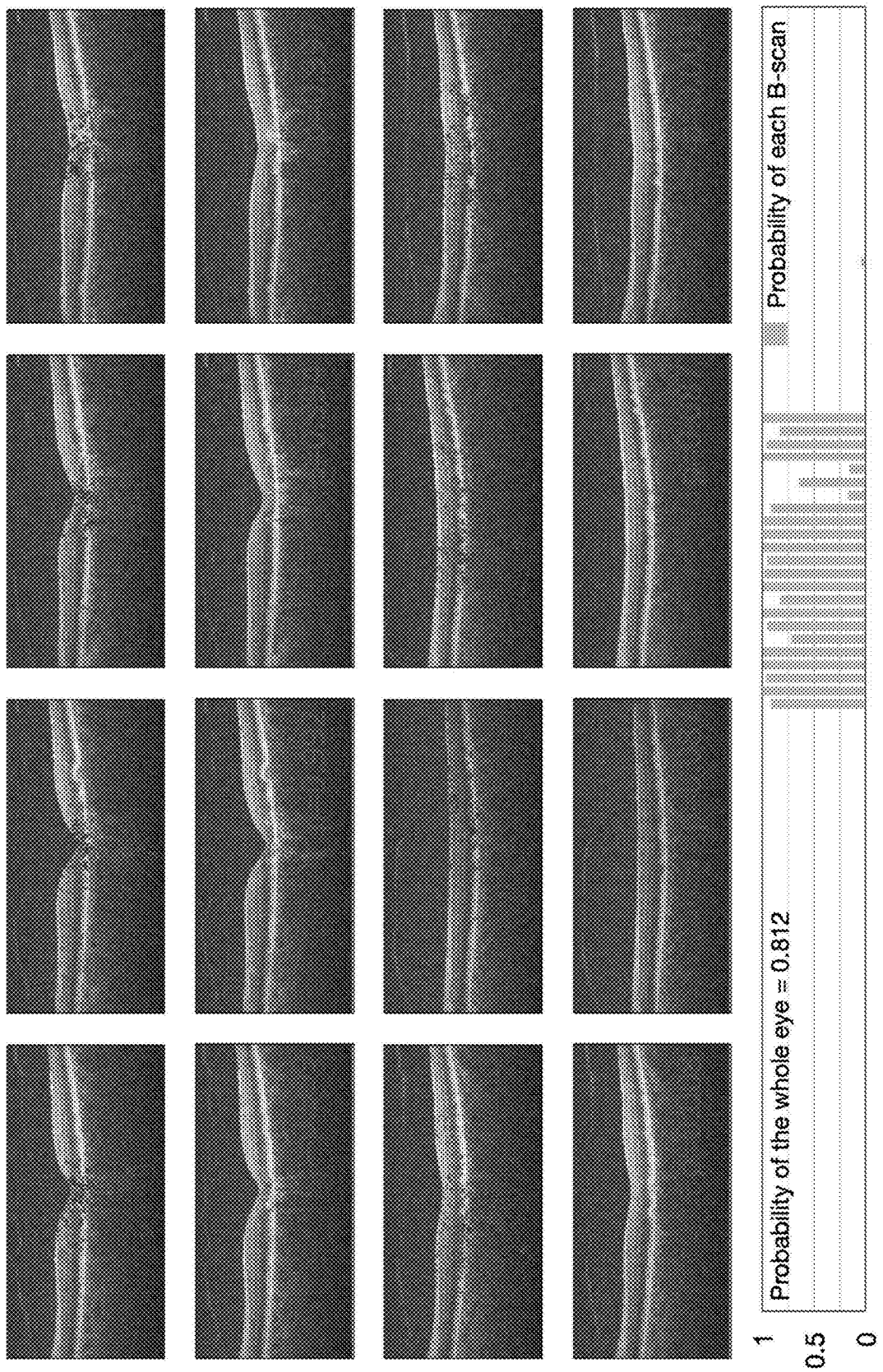
FIG. 5 shows a case study of patient with GA. Rows 2 and 4 are OCT scans of the same eye with GA. Images in rows 1 and 3 are their corresponding attention maps. GA probability of the scan is denoted as p. Histogram of p values for all 100 scans can be found in the bottom of the figure.
Figure 6:
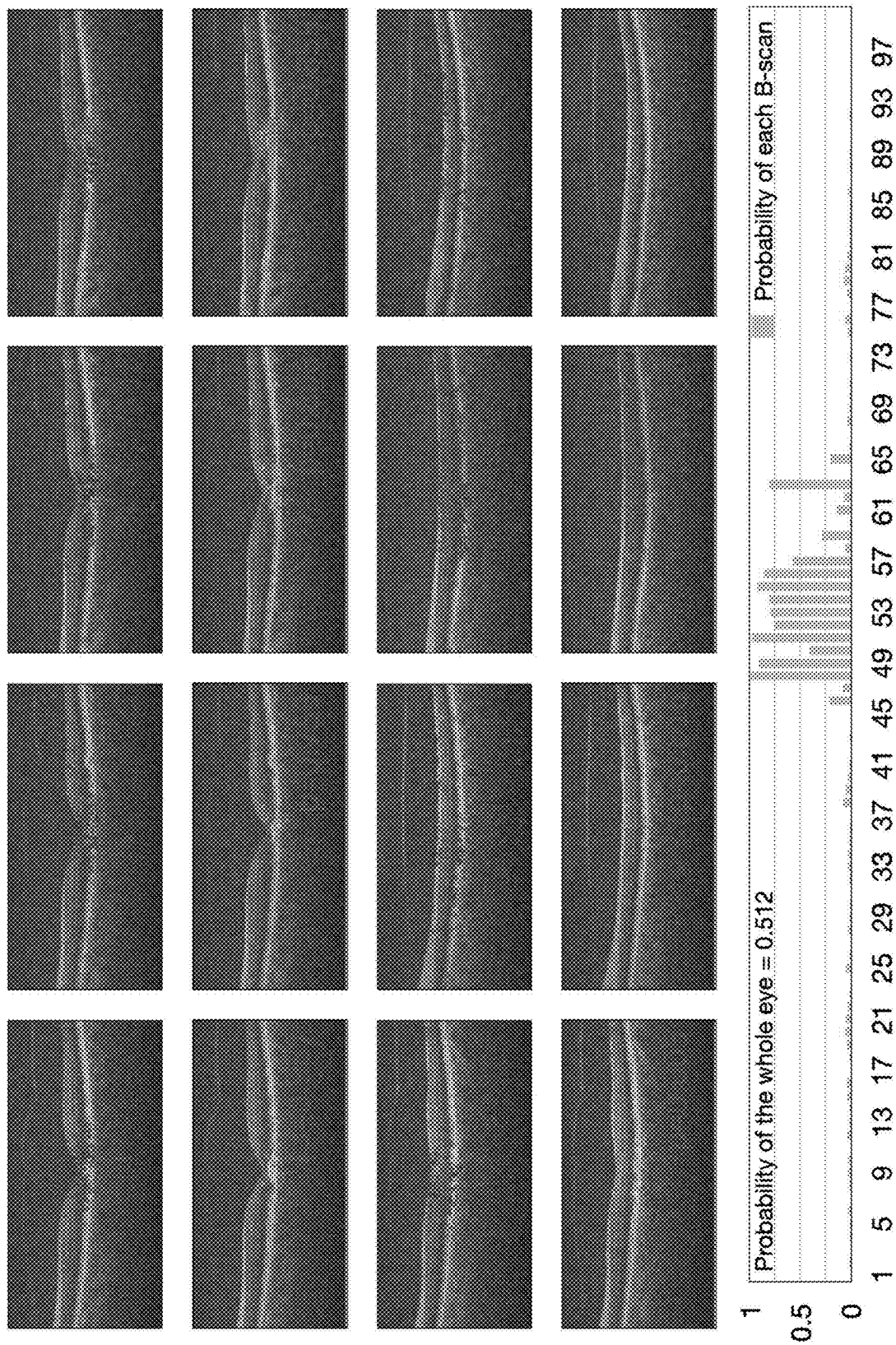
FIG. 6 shows a case study of patient of intermediate AMD that will convert to GA in 1 year. Images in rows 2 and 4 are various OCT scans from the same volume. Images in rows 1 and 3 are their corresponding attention maps. The probability of GA development in 1 year scan is denoted as p. The histogram of p values for all 100 scans can be found in the bottom of the FIG. 6.

A representative example of GA is presented in FIG. 5. While the central scans have a high predictive value or probability (p) and are characterized by red dots concentrated in the lesional and perilesional areas, the peripheral retinal scans have very low p values and diffusely distributed red dots in the attention maps. In eyes with intermediate AMD that will convert to GA in one year, the red dots are mainly concentrated in large drusen or drusenoid PEDs and underlying choriocapillaris and choroid, hyperreflective foci, and areas of nascent GA or incomplete RPE and outer retinal atrophy (iRORA). To a lesser extent, the attention maps also mark the neurosensory retina overlying drusen (FIG. 4B). A representative case example of intermediate AMD that preceded GA by one year can be found in FIG. 5. In eyes with intermediate AMD that will not progress to GA, the attention maps are composed of red dots diffusely present in a large area of drusen and neurosensory retina overlying them; the probability value p is low (FIG. 4C).

Discussion and overall findings. Since the A2A dataset is relatively small for DL analyses, we made use of an additional OCT dataset from a recent Cell publication by Kermany D S, et al (with different endpoints) to help train the feature extractor. By using both datasets with pooling, we obtained an AUC for GA prediction of 0.945 For current year, and 0.937 for the following year. We observed that scans in different positions across the OCT volume contribute differently to the identification of GA, suggesting that the model pays most attention to perifoveal areas, similar to a clinician.

For intermediate AMD patients that did not convert to GA during the time period studied, the red dots are usually decentralized, suggesting that the model does not find an area which can be classified as GA or pre-GA with high probability. Compare/contrast with other prior DL work: none previous on 3D OCTs to predict progression to GA. Review DL work on CFP in AMD diagnosis, DL on OCTs for other applications.

A deep learning (DL) method holds promise as the unsupervised algorithm is not biased by our prior medical knowledge or gaps, therefore it has the potential to uncover valuable new information about GA progression. This method also does not require the very expensive and labor intensive human gradings, therefore the algorithms created can be used in other large datasets. The value of DL analyses in GA is the ability to populate a clinical trial with a concentrated high-risk phenotype of individuals such that a therapeutic intervention can be tested in a reasonable, shorter timeframe (1-2 years). Secondly, when an effective but high risk treatment becomes available in clinics, this DL algorithm would help physicians decide which GA pts would most benefit. Thirdly, AI can help identify candidate drug targets for clinical trials if predictive features can be identified and liked to mechanism of action.

A number of manuscripts used AI methods for automated detection of AMD on color fundus photos (differentiating between AMD and no AMD) (Burlina P, et al. (2011) Annu Int Conf IEEE Eng Med Biol Soc. 2011:3962-3966; Zheng Y, et al. (2012) Invest Ophthalmol Vis Sci. 53(13):8310-8318; Saha S, et al. (2019) Sci Rep. 9(1):10990), some aimed to classify AMD severity according to AREDS or in-house grading criteria (Burlina P M, et al. (2017) JAMA Ophthalmol. 135(11):1170-1176; Grassmann F, et al. (2018) Ophthalmology. 125(9):1410-1420; van Grinsven M J, et al. (2013) Invest Ophthalmol Vis Sci. 54(4):3019-3027; Phan T V, et al. (2016) J Ophthalmol. 2016:5893601; Kankanahalli S, et al. (2013) Invest Ophthalmol Vis Sci. 54(3):1789-1796) and some differentiated between nonexudative and exudative AMD vs no disease. (Mookiah M R, et al. (2014) Comput Biol Med. 53:55-64; Mookiah M R, et al. (2014) Med Biol Eng Comput. 52(9):781-796). In regards of the DL architecture employed, the authors used a variety of convolutional neural networks—AlexNet, GoogleNet, VGG, Inception-V3, ResNet and Inception-ResNet-V2—to train different models. (Ting D S W, et al. (2019) Br J Ophthalmol. 103(2):167-175).

DL models developed by Keenan and colleagues (Keenan T D, et al. (2019) Ophthalmology. 126(11):1533-1540) were trained to predict presence of GA and central GA on color fundus photographs from a population of eyes ranging from normal to advanced AMD, and to detect central GA among the eyes with GA. A total of 59,812 color fundus photographs from longitudinal follow-up of 4582 participants in the Age-Related Eye Disease Study (AREDS) dataset were employed. The DL models had AUCs ranging from 0.827 to 0.976, noninferior to grading by retinal specialists, and high accuracy for automated detection of GA. (Keenan T D, et al. (2019) Ophthalmology. 126(11):1533-1540).

Trader et al have employed fundus autofluorescence imaging to automatically discern and classify areas of geographic atrophy. (Treder M, et al. (2018) Graefes Arch Clin Exp Ophthalmol. 256(11):2053-2060). In this work, autofluoroscence images of patients with GA, other retinal diseases and healthy patients were used to train a multi-layer deep convolutional neural network to detect GA and to differentiate in GA between a diffuse-trickling pattern and other GA patterns. The developed classifiers had excellent performance. For the GA classifiers, the achieved training accuracy was 99/98%, the validation accuracy 96/91%, and for the diffuse trickling pattern classifier, the training accuracy was 99%, and the validation accuracy 77%. (Treder M, et al. (2018) Graefes Arch Clin Exp Ophthalmol. 256(11): 2053-2060). With further refinements this model holds promise as a tool to predict individual GA progression risk.

The definition of GA has been recently updated to be based by spectral-domain optical coherence tomography (SD OCT) criteria instead of color photography. (Wu Z, et al. (2014) Ophthalmology. 121(12):2415-2422; Sadda S R, et al. (2016) Retina. 36(10):1806-1822; Holz F G, et al. (2017) Ophthalmology. 124(4):464-478). A machine learning algorithm developed by Schmidt-Erfurth and coworkers based on human gradings predicted which eyes with intermediate AMD from the HARBOR clinical trial were most likely to progress to advanced disease (neovascular AMD or GA) based on OCT findings in combination with demographic and genetic factors. (Holz F G, et al. (2017) Ophthalmology. 124(4):464-478). The algorithm had relatively high accuracy, with a performance of 0.68 and 0.80 for CNV and GA, respectively. The features associated with disease progression displayed pathognomonic patterns that were distinctly different for neovascular AMD (drusen-centric) and GA (neurosensory retina and age). (Holz F G, et al. (2017) Ophthalmology. 124(4):464-478). Predictive models such as this may facilitate personalized prediction of AMD progression to inform standard of care treatments and clinical trial enrollment. There is a need for development of high performance classifiers based on DL algorithms predicting progression of GA independent of human graders based on longitudinal SD OCT datasets. Ideally, the DL model should help identify the specific SD-OCT features or biomarkers that can collectively increase the probability of new progression from intermediate AMD to the severe stage of nonexudative AMD, essentially opening the "black box" associated with such artificial intelligence algorithms.

The next undertaken step was to identify the individuals that would progress to loss of vision based on OCT alone. Here, the most comprehensive iAMD dataset with dense OCT scans are used.

The A2A dataset used in this study is challenging, namely: 1) high dimensional inputs: the OCT volumes are 3D images with super high resolution (512*1000*100), which are difficult to feed directly into most standard deep learning models; 2) scarcity of training examples: we only count with 872 OCT images from 256 eyes in 5 years, which compared with typical datasets used for training deep learning models is rather small (e.g., ImageNet has 1,461,406 images and MNIST 60,000 images); 3) localized signal: features of GA do not span the entire OCT volume but are localized, however, such localization needs to be automatically identified by the model, without relying on compression or cropping that may lead to signal loss.

Given challenges inherent to GA prediction using the A2A dataset, 1) we proposed a position-aware 3D medical image classification network, which is motivated by the key observation that different spatial locations have complementary information for our tasks, and leads to significant performance gains; 2) we trained the model in a novel interpretable computer vision framework PPI that combines saliency mapping, causal reasoning, synthetic intervention and contrastive learning, to help the model perform robustly even on a small dataset with only 872 samples; 3) we leveraged the architecture-agnostic saliency mapping scheme called Weight Back Propagation (WBP), which faithfully captures the causally-relevant pixels/features for model prediction, to communicate model insights and facilitate causal-informed reasoning. Empirical evidence confirms that our model yields encouraging results for high dimensional volume medical images with a small training dataset.

Limitations. Despite the promising results, our study has several limitations. First, the overall size of the dataset is relatively small for deep learning. In particular, although the AUC for GA events and GA predictions were encouraging, the standard deviations for 5-fold cross validations were understandably large. Though difficult in practice, a much larger dataset or a population with more GA events may enable more accurate deep-learning models to be trained and evaluated with high confidence. Another limitation is that some important features to GA were not used in the current model. In particular, we found features worked well for GA prediction in our other manuscript. It is possible that combine these features in our deep learning model may enable more accurate results. However, we focused on exploring the predictive power of OCT images without additional processing, feature engineering or expert annotation.

TABLE 3

Performance Characteristics of the Proposed Model (In Bold) For Prediction of GA in the Current Year.

| Model | AUC (SD) |
| --- | --- |
| Multi-scan position-aware model trained with PPI | 0.945 (0.018) |
| Multi-scan position-aware model (without PPI learning) | 0.892 (0.045) |
| Multi-scan model only using scans in the middle range (35-75) | 0.900 (0.041) |
| Multi-scan model with mean pooling | 0.870 (0.056) |
| Single-scan model trained on both A2A and [8] | 0.850 (0.035) |
| Single-scan model trained only on data from [8] | 0.801 (0.027) |
| Single-scan model trained on ImageNet | 0.670 (0.025) |
| Decision tree on quantitative measurements | |

Single view trained on ImageNet: use one scan of the OCT volume as model input. The CNN part of the model (Inception\_v3) is trained on ImageNet. Then the classification layer is fine-tuned on the A2A dataset. Single view trained on [8]: use one scan of the OCT volume as model input. The CNN part of the model (Inception_v3) is pre-trained on dataset from [8]. Then the model is fine-tuned on the A2A dataset. Single view jointly trained on A2A and [8]: use a single scan from OCT volume as model input. We train the model on the A2A dataset and [8] jointly. Multi-view with mean pooling: use all scans of the OCT volume as model input and combine them with mean pooling. Multi-view with mean pooling (35-75 slices): use scans from position 35-75 of the OCT volume as model input and combine them with mean pooling. Multi-view with position-aware pooling: use all scans of the OCT volume as model input and combine them with position-aware pooling.

Deep neural networks have shown significant promise in comprehending complex visual signals, delivering performance on par or even superior to that of human experts. However, these models often lack a mechanism for interpreting their predictions, and in some cases, particularly when the sample size is small, existing deep learning solutions tend to capture spurious correlations that compromise model generalizability on unseen inputs. In this work, we propose a contrastive causal representation learning strategy that leverages proactive interventions to identify causally-relevant image features, called Proactive Pseudo-Intervention (PPI). This approach is complemented with a causal salience map visualization module, i.e., Weight Back Propagation (WBP), that identifies important pixels in the raw input image, which greatly facilitates the interpretability of predictions. To validate its utility, our model is benchmarked extensively on both standard natural images and challenging medical image datasets. We show this new contrastive causal representation learning model consistently improves model performance relative to competing solutions, particularly for out-of-domain predictions or when dealing with data integration from heterogeneous sources. Further, our causal saliency maps are more succinct and meaningful relative to their non-causal counterparts.

Deep neural networks hold great promise in applications requiring the analysis and comprehension of complex imagery. Recent advances in hardware, network architectures, and model optimization, along with the increasing availability of large-scale annotated (Deng J, et al. (2009) 2009 IEEE Conference on Computer Vision and Pattern Recognition, pp. 248 255. IEEE; Deng L. (2012) IEEE Signal Processing Magazine, 29(6):141-142; Krizhevsky A, et al. (2009) Master's thesis, University of Tront), have enabled these models to match and sometimes outperform human experts on a number of tasks, including natural image classification (Krizhevsky A, et al. (2017) Communications of the ACM. 60(6):84-90), objection recognition (Girshick R, et al. (2014) Proceedings of the IEEE Conference on Computer Vision and Pattern Recognition, pp. 580-587), disease diagnosis (Sajda P. (2006) Annu. Rev. Biomed. Eng., 8:537-565), and autonomous driving (Chen C, et al. (2015) Proceedings of the IEEE International Conference on Computer Vision, pp. 2722-2730), among others.

Deep learning solutions have been positively recognized for their ability to learn black-box models in a purely data driven manner. However, their very nature makes them less credible for their inability to communicate their reasoning for making predictions in a way that is comprehensible to humans. This suggests that in order to stimulate widespread use of deep learning models, a means of interpreting predictions is necessary, particularly in applications where predictions are consequential, e.g., in healthcare. Moreover, naive interpretation of model predictions is especially concerning because deep learning models tend to assimilate spurious correlations that do not necessarily capture the casual relationship between the input (image) and output (label) of the model. This issue is particularly notable in small-sample-size (low supervision) scenarios or when the sources of non-informative variation are overwhelming, thus likely to cause severe overfitting. As a result, lack of interpretability or a poor implementation of a model with interpretable predictions can often lead to catastrophic failures on deployment (Fukui H, et al. (2019) Proceedings of the IEEE Conference on Computer Vision and Pattern Recognition, pp. 10705-10714; Wang L, et al. (2019) Proceedings of the IEEE International Conference on Computer Vision, pp. 512-521).

A growing recognition of the issues associated with the lack of interpretable predictions is well documented (Adebayo J, et al. (2018) Advances in Neural Information Processing Systems, pp. 9505-9515; Hooker S, et al. (2019) Advances in Neural Information Processing Systems, pp. 9737-9748; Rebuffi S, et al. (2020) Proceedings of the IEEE/CVF Conference on Computer Vision and Pattern Recognition, pp. 8839-8848). Such phenomenon has energized researchers to actively seek creative solutions. Among these, two streams of work, namely saliency mapping (SM) (Zhao Y, et al. (2018) International Conference on Medical Image Computing and Computer-Assisted Intervention, Springer, pp. 109-118; Simonyan K, et al. (2013) arXiv preprint arXiv:1312.6034; Dabkowski P, et al. (2017) Advances in Neural Information Processing Systems, pp. 6967-6976) and causal representation learning (CRL) (Johansson F, et al. (2016) International conference on machine learning, pp. 3020-3029; Wang T, et al. (2020) Proceedings of the IEEE/CVF Conference on Computer Vision and Pattern Recognition Workshops, pp. 378-379; Arjovsky M, et al. (2019) arXiv preprint arXiv:1907.02893), stand out as some of the most promising directions. Specifically, SM encompasses techniques for post hoc visualizations on the input (image) space to facilitate interpretation of model predictions. This is done by projecting the key features used in prediction back to the input space, resulting in the commonly known saliency maps. These techniques typically rely on the notion of sensitivity of the input to changes in the model output, to derive a map of image regions that are important for prediction. Importantly, these maps do not directly contribute to model learning. Alternatively, CRL solutions are built on the principles of establishing invariances from the data, which require the identification of sources of variation that are spuriously associated with the model output (labels). CRL models, while emphasizing the differences between causation and correlation, are not subject to the rigor of causal inference approaches, because their goal is not to obtain accurate causal effect estimates but rather to produce robust models with better generalization ability relative to their naively learned counterparts (Arjovsky M, et al. (2019) arXiv preprint arXiv:1907.02893).

In this work, we present a solution that accounts for the needs of causal representation identification and visual verification. Our key insight is the derivation of causally-informed saliency maps, which facilitate visual verification of model predictions and enable learning that is robust to nuisance (non-causal) invariances. While true causation can only be established through experimental interventions, we leverage tools from contrastive representation learning to generate pseudo-interventions from observational data, which are motivated by the following causal argument: the target label will be changed only if causally-relevant features are perturbed.

Figure 8:
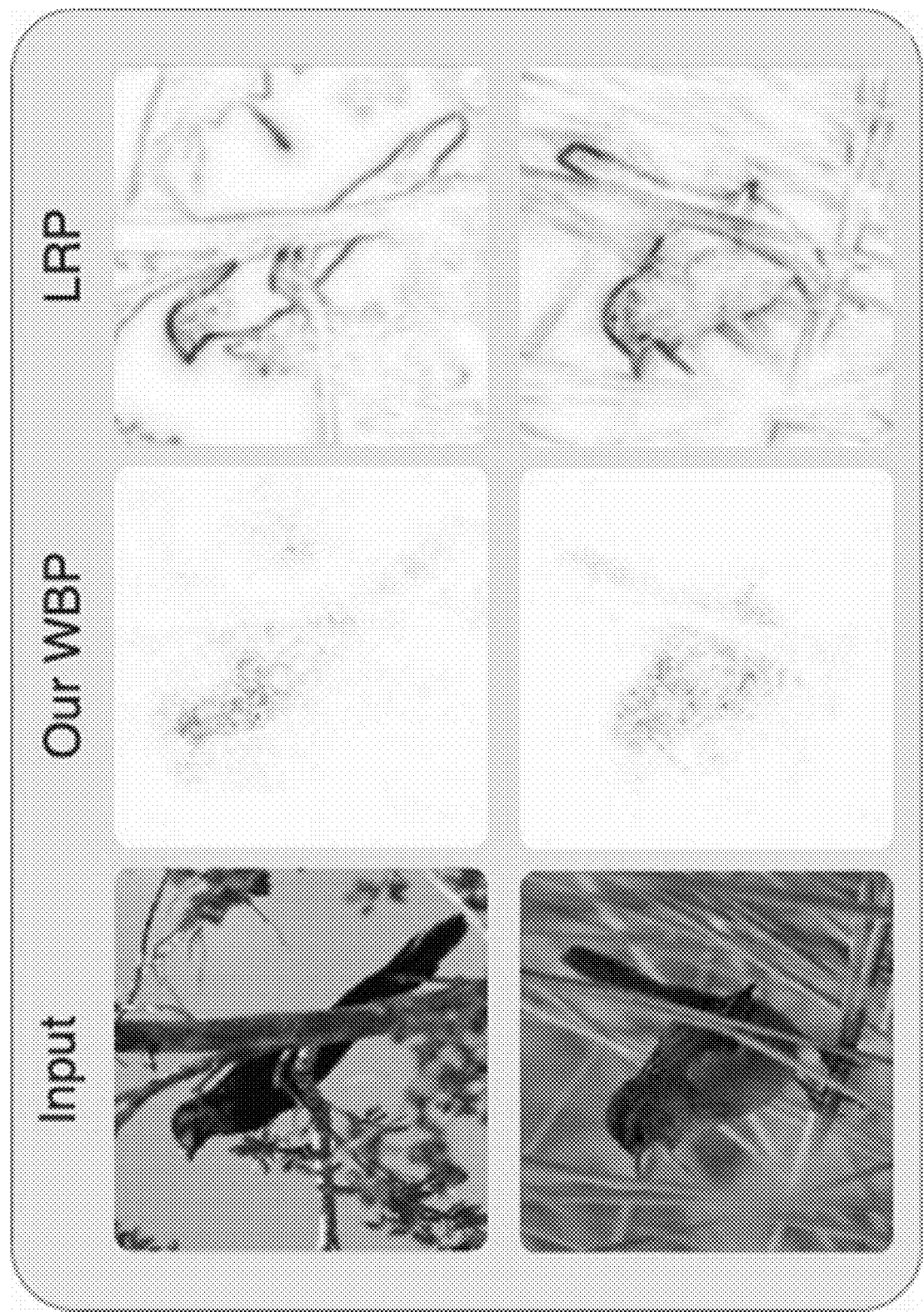
FIG. 8 shows saliency maps generated by the state-of-the art layer-wise relevance propagation (LRP) and the proposed Weight Back Propagation (WBP). LRP emphasizes the background (habitat, e.g., tree, ground) that are spuriously correlated with the bird species, while the causally informed WBP mostly focuses on the bird anatomy.
Figure 9:
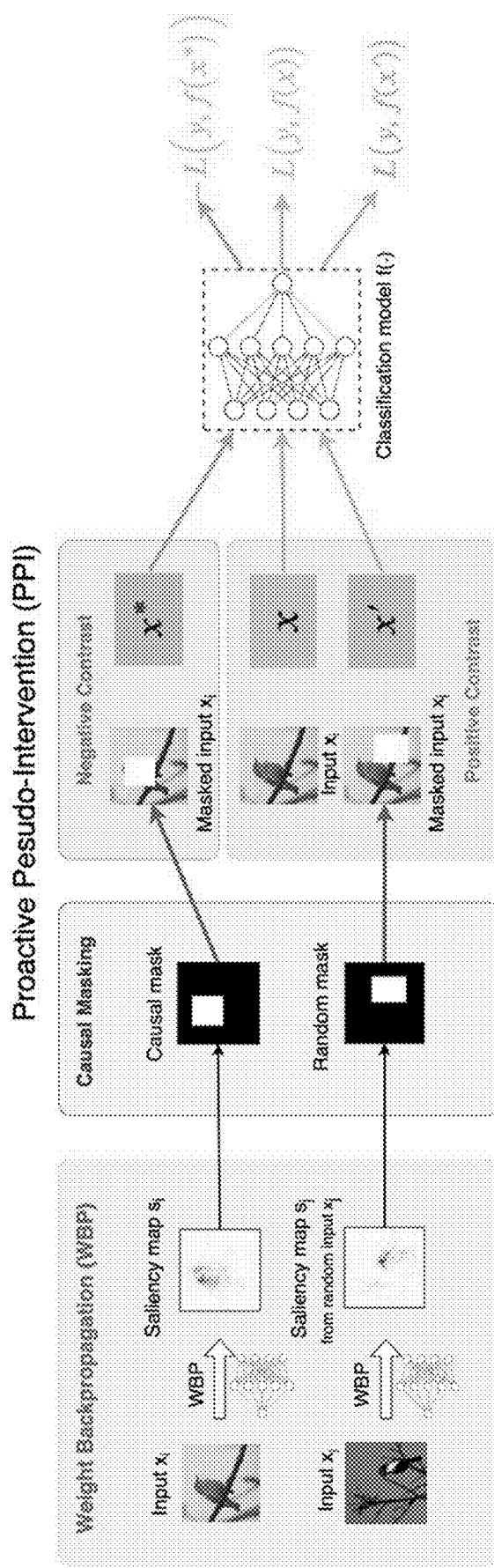
FIG. 9 shows illustration of the Proactive Pseudo-Intervention (PPI) learning strategy. Saliency maps are obtained via WBP (Left), contrastive interventions are created from masked inputs (Middle), and predictions are obtained from a classification model (Right).

In FIG. 8 we present an example of saliency maps to illustrate the benefits of producing causally-informed saliency maps. In this scenario, the task is to classify two bird species (A and B) from natural images. Due to the differences in their natural habitats, A-birds are mostly seen resting on trees, while B-birds are more commonly found among bulrushes. A deep model, trained naively, will tend to associate the background characteristics with the labels, knowing these strongly correlate with the bird species (la-bels) in the training set. As a result, state-of-the-art layer-wise relevance propagation (LRP) saliency maps (Bach S, et al. (2015) PloS One. 10(7):e0130140) from this model tend to emphasize background features as op-posed to (more subtle) differences in bird anatomy. Further, if we were provided with an image of a bird in an environment foreign to the images in the training set, the model will be unable to make a reliable prediction (or if different types of animals were in the same environments, they could be confused with bird A or B). This generalization issue, which worsens with small sample sizes, is evidence of the lack of robustness of the model. Alternatively, a causally-informed module of our PPI, like the proposed Weight Back Propagation (WBP), will successfully focus on the bird anatomy, and thus will be robust to environmental changes captured in the input images.

This paper presents an easy-to-implement strategy called Proactive Pseudo-Intervention (PPI) that addresses causally-informed reasoning, robust learning, and interpretation of model predictions in a unified framework. Importantly, PPI seamlessly combines saliency mapping and contrastive interventions to guide model learning. The contributions of this paper are summarized as follows: (1) an end-to-end contrastive causal representation learning strategy that employs proactive interventions to identify causally relevant features; (2) a fast and architecture-agnostic saliency mapping module called Weight Back Propagation (WBP), that delivers accurate and faithful interpretation of predictions; and (3) experiments demonstrating significant performance gains of PPI relative to competing solutions, especially on model visualization, out-of-domain predictions, and data integration with heterogeneous sources.

Visual Explanations. Saliency mapping collectively refers to a family of techniques to understand and interpret black-box image classification models, such as deep neural networks (Adebayo J, et al. (2018) Advances in Neural Information Processing Systems, pp. 9505-9515; Hooker S, et al. (2019) Advances in Neural Information Processing Systems, pp. 9737-9748; Rebuffi S, et al. (2020) Proceedings of the IEEE/CVF Conference on Computer Vision and Pattern Recognition, pp. 8839-8848). These methods project the model understanding of the targets, i.e., labels, and their predictions back to the input space, which allows for the visual inspection of automated reasoning and for the communication of predictive visual cues to the user or human expert, thus establishing a visual relationship between images and predictions aimed to build trust in deep-learning-based systems.

In this study, we focus on post hoc saliency mapping strategies, where saliency maps are constructed given an arbitrary (trained) prediction model, as opposed to relying on customized model architectures for interpretable predictions (Fukui H, et al. (2019) Proceedings of the IEEE Conference on Computer Vision and Pattern Recognition, pp. 10705-10714; Wang L, et al. (2019) Proceedings of the IEEE International Conference on Computer Vision, pp. 512-521), or to train a separate module to explicitly produce model explanations (Fukui H, et al. (2019) Proceedings of the IEEE Conference on Computer Vision and Pattern Recognition, pp. 10705-10714; Goyal Y, et al. (2019) ICML, pp. 2376-2384; Chang C H, et al. (2018) arXiv preprint arXiv:1807.08024; Fong R, et al. (2017) Proceedings of the IEEE International Conference on Computer Vision, pp. 3429-3437; Shrikumar A, et al. (2017) International Conference on Machine Learning, pp. 3145-3153). Popular solutions under this category include activation mapping (Zhou B, et al. (2016) Proceedings of the IEEE Conference on Computer Vision and Pattern Recognition, pp. 2921-2929; Selvaraju R, et al. (2017) Proceedings of the IEEE International Conference on Computer Vision, pp. 618-626), relevance propagation (Bach S, et al. (2015) PloS One. 10(7):e0130140) and input sensitivity analysis (Shrikumar A, et al. (2017) International Conference on Machine Learning, pp. 3145-3153). As we will show in our experiments, these approaches fail to yield causal explanations of the outcome, and are therefore unable to satisfactorily address the challenges discussed above.

Our work is in a similar spirit to (Fong R, et al. (2017) Proceedings of the IEEE International Conference on Computer Vision, pp. 3429-3437; Dabkowski P, et al. (2017) Advances in Neural Information Processing Systems, pp. 69676976; Chang C, et al. (2018) arXiv preprint arXiv:1807.08024; Wagner J, et al. (2019) Proceedings of the IEEE Conference on Computer Vision and Pattern Recognition, pp. 9097-9107), where meaningful perturbations have been applied to the image during model training, to improve prediction and facilitate interpretation. Such perturbations are usually computed by solving an optimization for each image, and consequently they are costly in practice and also do not address the challenges from spurious features. Very recently, exploratory effort has been made to leverage the tools from counterfactual reasoning (Goyal Y, et al. (2019) ICML, pp. 2376-2384) and causal analysis (O'Shaughnessy M, et al. (2020) Advances in Neural Information Processing Systems. 33) to derive visual explanations, but do not lend insights back to model training. Our work represents a fast, principled solution that overcomes the above limitations.

Contrastive Learning. There has been growing interest in exploiting contrastive learning (CL) techniques for representations learning (van den Oord A, et al. (2018) arXiv preprint arXiv:1807.03748; Chen T, et al. (2020) arXiv preprint arXiv:2002.05709; He K, et al. (2020) Proceedings of the IEEE/CVF Conference on Computer Vision and Pattern Recognition, pp. 9729-9738; Khosla P, et al. (2020) arXiv preprint arXiv:2004.11362; Tian Y, et al. (2019) arXiv preprint arXiv:1906.05849). Originally devised for density estimation (Gutmann M, et al. (2010) Proceedings of the Thirteenth International Conference on Artificial Intelligence and Statistics, pp. 297-304), CL exploits the idea of learning by comparison to capture the subtle features of data, i.e., positive examples, by contrasting them with negative examples drawn from a carefully crafted noise distribution. From the perspective of representation learning, these techniques aim to avoid representation collapse, or to promote representation consistency, for downstream tasks. Recent developments, both empirical and theoretical, have connected CL to information-theoretic foundations (Tian Y, et al. (2019) arXiv preprint arXiv:1906.05849; Grill J, et al. (2020) Advances in Neural Information Processing Systems. 33:21271-21284), thus establishing them as a suite of defacto solutions for unsupervised representation learning. (Chen T, et al. (2020) arXiv preprint arXiv:2002.05709; He K, et al. (2020) Proceedings of the IEEE/CVF Conference on Computer Vision and Pattern Recognition, pp. 9729-9738).

The basic form of CL is essentially a binary classification task specified to discriminate positive and negative examples. In such a scenario, the binary classifier is known as the critic function. Maximizing the discriminative power wrt the critic and the representation sharpens the feature encoder. Critical to the success of CL is the choice of appropriate noise distribution, where the challenging negatives, i.e., those negatives that are more similar to positive examples, are often considered more effective contrasts in terms of learning efficiency, as the model will work harder to mine and refine the representation. In its more generalized form, CL can naturally repurpose the predictor and loss functions without introducing a new critic (Tian Y, et al. (2019) arXiv preprint arXiv:1906.05849). Notably, current CL methods are not immune to spurious associations, a point we wish to improve in this work.

Causality and Interventions. While many powerful computer vision models excel at comprehending complex scenes for predictive purposes, their success often entails the over-exploitation of visual cues. Perturbations to external factors, e.g., background, lighting, viewing angles, may drastically alter their predictions, while human recognition is less susceptible to such variations. This happens because standard machine learning models base their decision on correlations, as opposed to performing causal reasoning. From a causality perspective, observational data are in general affected by (unknown) confounding factors, and consequently are unable to inform the structural dependencies for causal decisions. Formally, such difference is best explained with the do-notation (Pearl J. (2009) Cambridge University Press): $\mathbb{P}(Y|do(x))=\Sigma_z \mathbb{P}(Y|X=x, z)\mathbb{P}(z)$, where we identify x as the features, e.g., an object in the image, and z as the confounders, e.g., background in the example above. In the causality literature, z is commonly referred to as the treatment (Arjovsky M, et al. (2019) arXiv preprint arXiv:1907.02893; Ghassami A, et al. (2017) Advances in Neural Information Processing Systems, pp. 3011-3021). We note that $\mathbb{P}(Y|do(x))$ is fundamentally different from the association reasoning rule $\mathbb{P}(Y|X=x)=\Sigma_z \mathbb{P}(Y|X=x, z)\mathbb{P}(z|X=x)$.

To acquire causal knowledge, the learning procedure requires experimental interventions to intentionally block the causal links between the features x and confounders z. This action is typically implemented by explicitly intervening the experiments by fixing x, and then observing how it affects the outcome y. Unfortunately, carrying out real interventional studies, i.e., randomized control trials, is oftentimes not a feasible option for practical considerations, e.g., cost and ethics. Fortunately, in the computer vision scenario, we can apply synthetic interventions to the observational data to uncover the underlying causal features. Specifically, we proactively edit x and its corresponding label y in a data-driven fashion to encourage the model to only respond to causal associations.

In recent years, the significance of establishing causality in machine learning models has received growing appreciation (Schölkopf B. (2019) arXiv preprint arXiv:1911.10500). Via promoting invariance (Arjovsky M, et al. (2019) arXiv preprint arXiv:1907.02893), such causally inspired solutions boast superior robustness to superficial features that do not generalize (Wang H, et al. (2019) arXiv preprint arXiv:1903.06256). In particular, Suter R, et al. (2019) and Zhang C, et al. (2020) demonstrated the importance and effectiveness of accounting for interventional perspectives. Our work brings these causal views to construct a simple solution that explicitly optimizes visual interpretation and model robustness.

Proactive Pseudo-Intervention. Below we describe the construction of proactive pseudo-intervention (PPI), a causally-informed contrastive learning scheme that seeks to simultaneously improve the accuracy, robustness, generalization and interpretability of deep-learning-based computer vision models.

The PPI model, schematically summarized in FIG. 2, consists of three main components: (i) a saliency mapping module that highlights causally relevant features; (ii) an intervention module that synthesizes contrastive samples; and (iii) the prediction module, which is standard in recent vision models, e.g., VGG (Simonyan K, et al. (2014) arXiv preprint arXiv:1409.1556), ResNet (He K, et al. (2016) Proceedings of the IEEE Conference on Computer Vision and Pattern Recognition, pp. 770-778), and Inception Net (Szegedy C, et al. (2016) Proceedings of the IEEE conference on Computer Vision and Pattern Recognition, pp. 2818-2826). Motivated by the discussion from the introduction, PPI establishes a feedback loop between the saliency map module and the prediction module, which is interfaced by the synthesized contrastive examples from the intervention module. Under this configuration, the prediction module is encouraged to modify its predictions only when provided with causally-relevant synthetic interventions. Note that components (i) and (ii) do not involve any additional parameters or neural network modules, which makes our strategy readily applicable to the training of virtually any vision task without major customization. Details of these building blocks are given below.

Synthetic causal contrastive interventions. Key to our formulation is the design of a synthetic intervention strategy that generates contrastive examples to reinforce causal relevance. Given a causal saliency map $s_m(x)$ for an input x wrt label y=m, where m=1, ..., M, and M is the number of classes, the synthetic intervention consists of removing (replacing with zero) the causal information from x contained in $s_m(x)$, and then using it as the contrastive learning signal.

For now, let us assume the causal salience map $s_m(x)$ is known; the procedure to obtain the saliency map will be addressed in the next section. For notational clarity, we use subscript i to denote entities associated with the i-th training sample, and omit the dependency on learnable parameters. To remove causal information from $x_i$ and obtain a negative contrast $x_i^*$ we apply the following soft-masking transformation $$x_i^* = x_i - T(s_m(x_i)) \odot x_i, \quad (1)$$

where T(·) is a differentiable masking function and ⊙ denotes element-wise (Hadamard) multiplication. Specifically, we use the thresholded sigmoid as the masking function:

$$T(s_m(x_i)) = \frac{1}{1 + \exp(-\omega(s_m(x_i) - \sigma))}, \quad (2)$$

where σ and ω>0 are the threshold and scaling parameters, respectively. We set the scaling ω so that T(·) will result in a sharp transition from 0 to 1 near σ. Using (1) we define the contrastive loss as $$L_{con}(\theta) = \sum_i \ell(x_i^*, \neg y; f_\theta), \quad (3)$$

where $f_\theta$ is the prediction model, $l(x, y; f_\theta)$ is the loss function we wish to optimize, e.g. cross entropy, and ¬ is used to denote that the original class label has been flipped.

In the binary case, ¬y=1−y, and in the multi-class case it can be interpreted accordingly, e.g., using a one vs. others cross entropy loss. In practice, we set $l(x, y; f_\theta) = -l(x, y; f_\theta)$. We will show in the experiments that this simple and intuitive causal masking strategy works well in practice (see Table 3 and Table 5, and FIG. 12). Alternatively, we also consider a hard-masking approach in which a minimal bounding box covering the thresholded saliency map is removed.

Note that we are making the implicit assumption that the saliency map is uniquely determined by the prediction model $f_\theta$. While optimizing (3) explicitly attempts to improve the fit of the prediction model $f_\theta$, it also implicitly informs the causal saliency mapping. This is sensible because if a prediction is made using non-causal features, which implies the associated saliency map $s_m(x)$ is also non-causal, then we should expect that after applying $s_m(x)$ to x using (1), we can still expect to make the correct prediction, i.e., the true label, for both positive (the original) and negative (the intervened) samples.

Saliency map regularization. Note that naively optimizing (3) can lead to degenerate solutions for which any saliency map that satisfies the causal sufficiency, i.e., encompassing all causal features, is a valid causal saliency map. For example, a trivial solution where the saliency map covers the entire image may be considered causal. To protect against such degeneracy, we propose to regularize the $L_1$-norm of the saliency map to encourage succinct (sparse) representations, i.e., $L_{reg} = \|s_m\|_1$, for m=1, ..., M.

TABLE 4

WBP Update Rules for Common Transformations.

| Transformation | G(·) |
|---|---|
| Activation Layer | $\tilde{W}^l = h \circ \tilde{W}^{l+1}$ |
| FC Layer | $\tilde{W}^l = \tilde{W}^{l+1} W^l$ |
| Convolutional Layer | $\tilde{W}^l = \tilde{W}^{l+1} \otimes [W^l]_{flip_{2,3}}^{T_{0,1}}$ |
| BN Layer | $\tilde{W}^l = \dfrac{\tilde{W}^{l+1}}{\sigma} \gamma$ |
| Pooling Layer | Relocate/Distribute $\tilde{W}^{l+1}$ |

Adversarial contrasts. Another concern with solely optimizing (3) is that models can easily overfit to the intervention, i.e., instead of learning to capture causal relevance, the model learns to predict interventional operations. For example, the model can learn to change its prediction when it detects that the input has been intervened, regardless of whether the image is missing causal features. So motivated, we introduce adversarial contrasts:

$$x'_i = x_i - T(s_m(x_j)) \odot x_i, \quad i \neq j, \quad (4)$$

where we intervene with a false saliency map, i.e., $s_m(x_j)$ is the saliency map from a different input $x_j$, while still encouraging the model to make the correct prediction via $$L_{ad}(\theta) = \sum_i \ell(x'_i, y, f_\theta), \quad (5)$$

where $x'_i$ is the adversarial contrast. The complete loss for the proposed model, $L = L_{cls} + L_{con} + L_{reg} + L_{ad}$, consists of the contrastive loss in (3), the regularization loss, $L_{reg}$, and the adversarial loss in (5).

Saliency Weight Backpropagation. In order to generate saliency maps that inform causal features in the (raw) pixel space, we propose to evaluate the individual contributions from each pixel to the final class-specific prediction. To this end, below we describe Weight Back Propagation (WBP), a computationally efficient scheme for saliency mapping applicable to arbitrary neural architectures.

To simplify our presentation, we first consider a vector input and a linear mapping. Let $x^l$ be the internal representation of the data at the l-th layer, with l=0 being the input layer, i.e., $x^0=x$ and l=L being the penultimate logit layer prior to the softmax transformation, i.e., $\mathbb{P}(y|x)$=softmax $(x^L)$. To assign the relative importance to each hidden unit in the l-th layer, we notationally collapse all transformations after 1 into an operator denoted by $\tilde{W}^l$, which we call the saliency matrix, satisfying $$x^L = \tilde{W}^l x^l, \forall l \in [0, \ldots, L], \quad (6)$$

where $x^L$ is an M-dimensional vector corresponding to the M distinct classes in y. Though presented in a matrix form in a slight abuse of notation, i.e., the instantiation of the operator $\tilde{W}^l$ effectively depends on the input x thus all non-linearities have been effectively absorbed into it. We posit that for an object associated with a given label y=m, its causal features are subsumed in the interactions between the m-th row of $\tilde{W}^0$ and input x, i.e., $$[s_m(x)]_k = [\tilde{W}^0]_{mk}[x]_k, \quad (7)$$

where $[s_m(x)]_k$ denotes the k-th element of the saliency map $s_m(x)$ and $[\tilde{W}^0]_{mk}$ is a single element of $\tilde{W}^0$. A key observation for computation of $\tilde{W}^l$ is that it can be done recursively. Specifically, let $g_l(x^l)$ be the transformation at the l-th layer, e.g., an affine transformation, convolution, activation, normalization, etc., then it holds that $$\tilde{W}^{l+1} x^{l+1} = \tilde{W}^{l+1} g_l(x^l) = \tilde{W}^l x^l. \quad (8)$$

This allows for recursive computation of $\tilde{W}^l$ via $$\tilde{W}^l = G(\tilde{W}^l, g_l), \tilde{W}^L = 1, \quad (9)$$

where $G(\cdot)$ is the update rule. We list the update rules for common transformations in deep networks in Table 4, with corresponding derivations detailed below.

Figure 10:
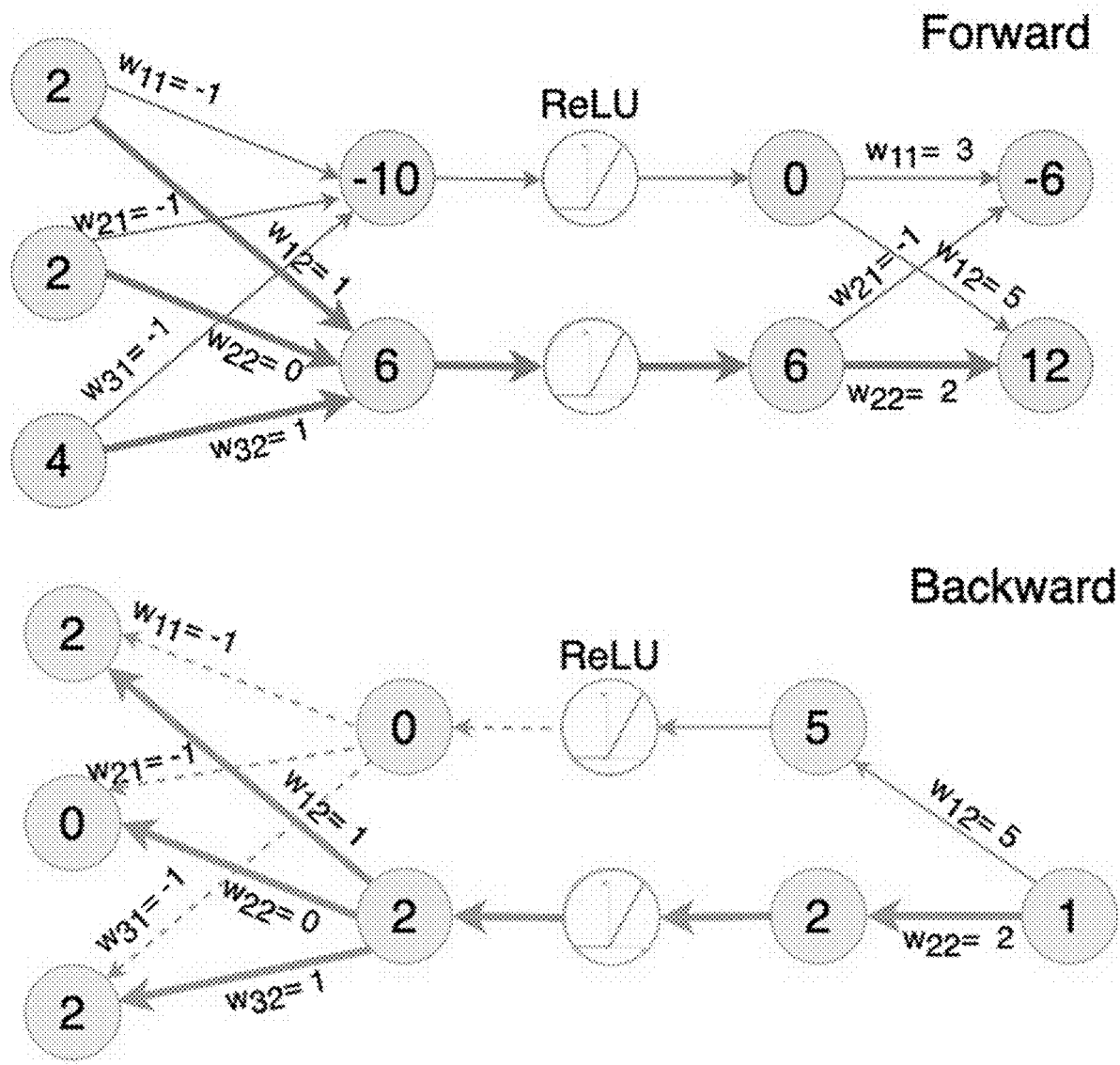
FIG. 10 shows illustration of the Weight Backpropagation (WBP) through a fully connected layer with ReLU activation layer.

Fully-connected (FC) layer. The FC transformation is the most basic operation in deep neural networks. Below we omit the bias term as it does not directly interact with the input. Assuming $g_l(x^l)=W^l x^l$ it is readily seen that $$\tilde{W}^{l+1} x^{l+1} = \tilde{W}^{l+1} g_l(x^l) = (\tilde{W}^{l+1} W^l) x^l, \quad (10)$$

so $\tilde{W}^l = \tilde{W}^{l+1} W^l$. See FIG. 10 for a graphical illustration with standard affine mapping and ReLU activation.

Nonlinear activation layer. Considering that an activation layer simply rescales the saliency weight matrices, i.e., $x^{l+1}=g_l(x^l)=h^l \circ x^l$, where $\circ$ is the composition operator, we obtain $\tilde{W}^l = h \circ \tilde{W}^{l+1}$. Using the ReLU activation as a concrete example, we have $h(x^l)=1\{x^l \geq 0\}$.

Convolutional layer. The convolution is a generalized form of linear mapping. In practice, convolutions can be expressed as tensor products of the form $$\tilde{W}^l = \tilde{W}^{l+1} \otimes [W^l] \frac{T_{0,1}}{flip_{2,3}},$$

where $W^l \in \mathbb{R}^{D_2 \times D_1 \times (2S+1) \times (2S+1)}$ is the convolution kernel, $T_{0,1}$ is the transpose in dimensions 0 and 1 and $flip_{2,3}$ is an exchange in dimensions 2 and 3.

Pooling and normalization layer. Summarization and standardization are two other essential operations for the success of deep neural networks, achieved by pooling and batch normalization (BN) techniques, respectively. They too can be considered as special instantiations of linear operations. Here we summarize the two most popular operations in Table 4.

Experiments. To validate the utility of our approach, we consider a wide range of real-world datasets, and compare it to existing state-of-the-art solutions. All experiments are implemented in PyTorch. The source code is available from https://github.com/author_name/PPI. Due to space limitations, details of the experimental setup and additional analyses are deferred to the Appendix.

Datasets. We present our findings on three representative datasets: (i) CUB (Wah C, et al. (2011) Technical Report CNS-TR-2011-001, California Institute of Technology), a natural image dataset with over 12 k photos for classification of 200 bird species in the wild, heavily confounded by the background characteristics; (ii) GA (Leuschen J, et al. (2013) Ophthalmology. 120(1):140-150), a new medical image dataset for the prediction of geographic atrophy (GA) using 3D optical coherence tomography (OCT) image volumes, characterized by small sample size (275 subjects) and highly heterogeneous (collected from 4 different facilities); and (iii) LIDC-IDRI (Langlotz C, et al. (2019) Radiology. 291(3):781-791), a public medical dataset of 1,085 lung lesion CT images annotated by 4 radiologists. Detailed specifications are described in the Appendix.

Baselines. The following set of popular saliency mapping schemes are considered as comparators for the proposed approach: (i) Gradient: standard gradient-based salience mapping; (ii) Grad-CAM (Selvaraju R, et al. (2017) Proceedings of the IEEE International Conference on Computer Vision, pp. 618-626): gradient-weighted class activation mapping; (iii) LRP (Bach S, et al. (2015) PloS One. 10(7): e0130140): layer-wise relevance propagation and its variants.

Figure 11:
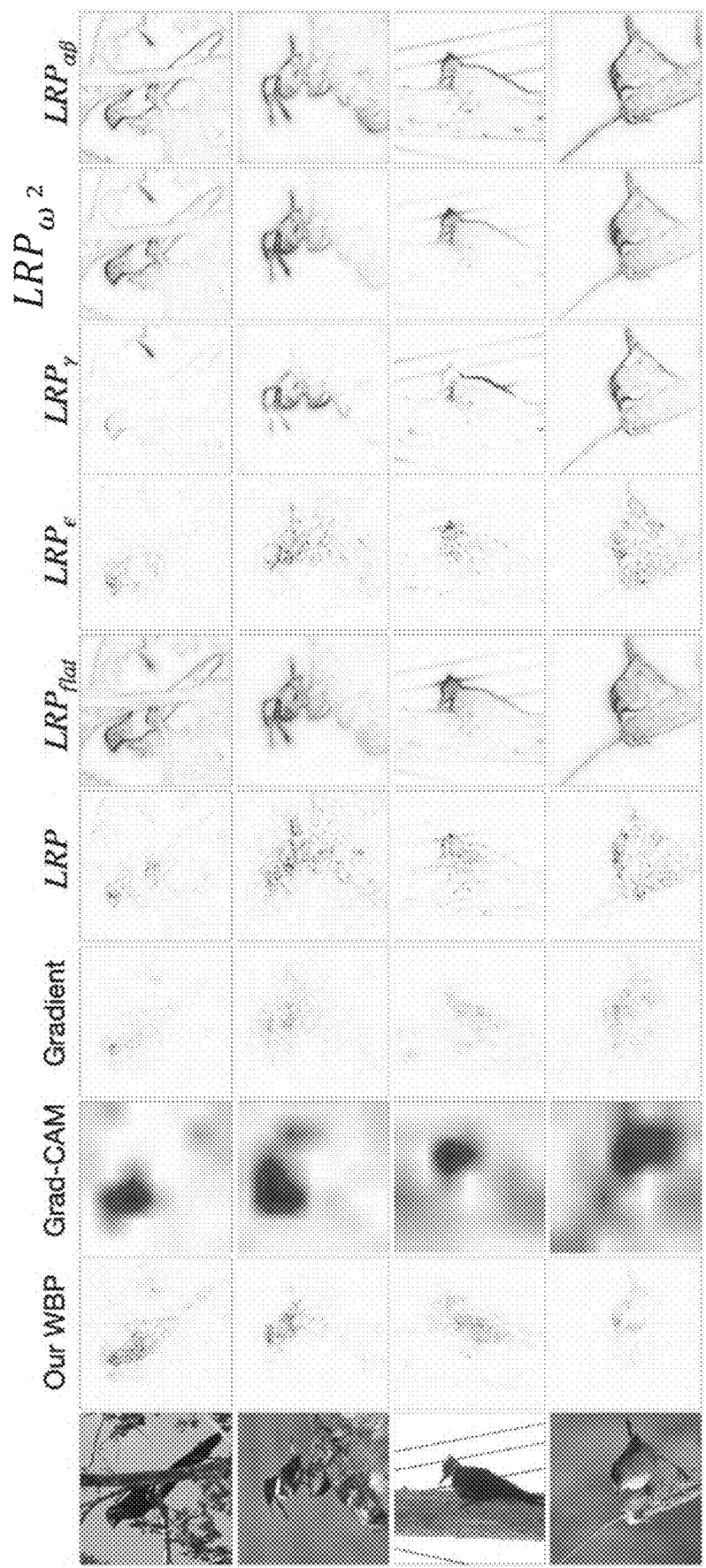
FIG. 11 shows a comparisons of saliency maps on CUB dataset.
Figure 13:
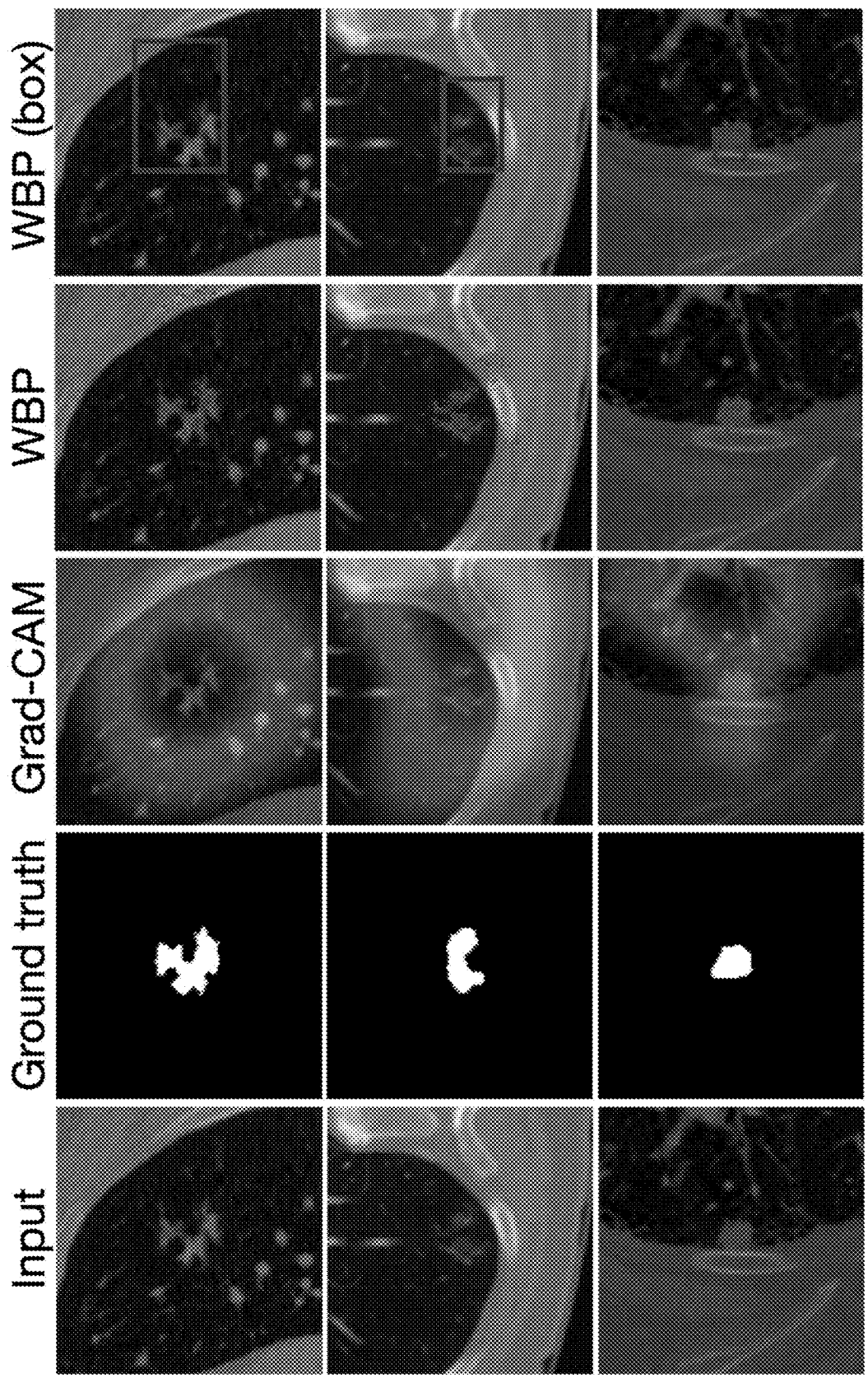
FIG. 13 shows saliency maps on LIDC-IDR.

CUB: Bird classification in the wild. In this task we want to qualitatively and quantitatively compare the causal relevance of saliency maps generated by WBP and its competitors. In FIG. 11 we show the saliency maps produced by different approaches for a VGG11 network trained on CUB (with 0.662 testing accuracy). Visually, gradient-based solutions (Grad and GradCAM) tend to yield overly dispersed maps, indicating a lack of specificity. Further, the chosen LRP models ($LRP_{flat}$, $LRP_\epsilon$, $LRP_{\omega^2}$, $LRP_\gamma$, $LRP_{\alpha\beta}$), which focus on either higher relevance points ($LRP_\epsilon$, $LRP_{\omega^2}$) or positively weighted relevance points ($LRP_\gamma$, $LRP_{\alpha\beta}$) (Samek W, et al. (2019) Springer Nature. Vol. 11700), give very sharp saliency maps. However, these maps also heavily attend to the spurious background cues that presumably help with predictions. In contrast, WBP faithfully focuses the attention to the birds themselves. To quantitatively evaluate the causal relevance of competing saliency maps, we adopt the evaluation scheme proposed in (Hooker S, et al. (2019) Advances in Neural Information Processing Systems, pp. 9737-9748), consisting of masking out the contributing saliency pixels and then calculating the reduction in prediction score. A larger reduction is considered better for accurately capturing the causal relevance. The results are summarized in Table 5, where we progressively remove the top-k saliency points, with k=100, 500, 1000, 5000, 10000 (10000≈6.6% of all pixels), from the test input images. Our WBP consistently out-performs its counterparts, with its lead being most substantial in the low-k regime. Notably, for large k, WBP removes nearly all predictive signal. This implies WBP specifically targets the causal features.

TABLE 5

Average Prediction Score Reduction After Removing the Top G Saliency Pixels.

| k | 100 | 500 | 1000 | 5000 | 10000 |
|---|---|---|---|---|---|
| LRP | −0.074 | −0.162 | −0.238 | −0.447 | −0.524 |
| $LRP_{flat}$ | −0.052 | −0.131 | −0.177 | −0.341 | −0.441 |
| $LRP_\in$ | −0.065 | −0.162 | −0.226 | −0.430 | −0.516 |
| $LRP_\gamma$ | −0.051 | −0.124 | −0.174 | −0.339 | −.0422 |
| $LRPw^2$ | −0.052 | −0.126 | −0.174 | −0.343 | −0.436 |
| $LRP_{\alpha\beta}$ | −0.059 | −0.141 | −0.192 | −0.353 | −0.467 |
| Gradient | −0.035 | −0.167 | −0.269 | −0.494 | −0.554 |
| Grad-CAM | −0.031 | −0.165 | −0.283 | −0.536 | −0.616 |
| WBP | −0.263 | −0.489 | −0.576 | −0.654 | −0.662 |

OCT-GA: Geographic Atrophy Classification. Next we seek to show how the proposed PPI handles the challenges of small sample size and heterogeneity in medical image datasets. In this experiment (with our new dataset, that we will make public), each OCT volume image consists of 100 scans, each of which being a 512×1000 pixel image (Boyer D, et al. (2017) Retina (Philadelphia, Pa.). 37(5):819). We use a multi-view CNN model (Su H, et al. (2015) Proceedings of the IEEE International Conference on Computer Vision, pp. 945-953) to process such 3D OCT inputs, and use it as our baseline solution (see the Appendix for details). We investigate how the different parings of PPI and saliency mapping schemes (i.e., Grad, GradCAM, LRP, WBP) affect performance. For WBP, we also tested the bounding box variant (see the Appendix for details). In Table 6, we see consistent performance gains in AUC score via incorporating PPI training (from 0.877 to 0.937), accompanied by the reductions in model variation evaluated by the standard deviations of AUC from the five-fold cross-validation. The gains are most significant when using our WBP for saliency mapping. We further compare the saliency maps generated by these different combinations. We see that without the additional supervision from PPI, competing solutions like Grad, GradCAM and LRP sometimes yield non-sensible saliency maps (attending to image corners). Overall, PPI encourages more concentrated and less noisy saliency maps. Also, different PPI-based saliency maps agree with each other to a larger extent. Our findings are also verified by experts (co-authors, who are ophthalmologists specializing in GA) confirming that the PPI-based saliency maps are clinically relevant by focusing on retinal layers likely to contain abnormalities or lesions. These results underscore the practical value of the proposed proactive interventions.

TABLE 6

AUC Results for GA Prediction.

| AUC | Mean | STD |
|---|---|---|
| Multi-view CNN | 0.877 | 0.040 |
| $+PPI_{GradCAM}$ | 0.908 | 0.036 |
| $+PPI_{WBP}$ | 0.925 | 0.023 |
| $+PPI_{WBP(box)}$ | 0.937 | 0.015 |

We report means and standard deviations (SDs) from 5-fold cross-validation.

Cross-domain generalization. Common to medical image applications is that training samples are usually integrated from a number of healthcare facilities (i.e., domains), and that predictions are sometimes to be made on subjects at other facilities. Despite big efforts to standardize the image collection protocols, with different imaging systems operated by technicians with varying skills, apparent domain shifts are likely to compromise the cross-domain performance of these models. We show this phenomenon on the GA dataset in Table 7, where source samples are collected from four different hospitals in different health systems (A, B, C and D, see the Appendix for details). Each cell contains the AUC of the model trained on site X (row) and tested on site Y (column), with same-site predictions made on hold-out samples. A significant performance drop is observed for cross-domain predictions (off-diagonals) compared to in-domain predictions (diagonals). With the application of PPI, the performance gaps between in-domain and cross-domain predictions are considerably reduced. The overall accuracy gains of PPI further justify the utility of causally-inspired modeling. Notably, site D manifests strong spurious correlation that help in-domain prediction but degrades out-of-site generalization, which is partly resolved by the proposed PPI.

TABLE 7

AUC Results for GA prediction With or Without PPI.

| | A | B | C | D | Mean | STD |
|---|---|---|---|---|---|---|
| +PPI | | | | | | |
| A | 1.000 | 0.906 | 0.877 | 0.865 | 0.912 | 0.061 |
| B | 0.851 | 0.975 | 0.863 | 0.910 | 0.900 | 0.056 |
| C | 0.954 | 0.875 | 0.904 | 0.931 | 0.916 | 0.034 |
| D | 0.824 | 0.846 | 0.853 | 0.904 | 0.857 | 0.034 |
| No PPI | | | | | | |
| A | 1.000 | 0.854 | 0.832 | 0.827 | 0.878 | 0.082 |
| B | 0.810 | 0.874 | 0.850 | 0.906 | 0.860 | 0.040 |
| C | 0.860 | 0.779 | 0.873 | 0.862 | 0.843 | 0.043 |
| D | 0.748 | 0.792 | 0.836 | 0.961 | 0.834 | 0.092 |

In Table 7, we transfer the model trained on one site to others. Darker color represents better performance.

LIDC-IDRI: Lung Lesions Classification. To further examine the practical advantages of the proposed PPI in real-world applications, we bench-mark its utility on LIDC-IDRI; a public lung CT scan dataset (Armato III S, et al. (2011) Medical physics. 38(2):915-931). We followed the preprocessing steps outlined in (Kohl S, et al. (2018) Advances in Neural Information Processing Systems, pp. 6965-6975) to prepare the data, and adopted the experimental setup from to predict lesions. We use Inception_v3 (Szegedy C, et al. (2016) Proceedings of the IEEE conference on Computer Vision and Pattern Recognition, pp. 2818-2826) as our base model for both standard classification and PPI-enhanced training with various saliency mapping schemes.

TABLE 8

LIDC-IDRI Classification AUC Results.

| Models | AUC |
|---|---|
| Tensor Net-X | 0.823 |
| DenseNet | 0.829 |
| LoTeNet | 0.874 |
| Inception_v3 | 0.921 |
| $+PPI_{WBP}$ | 0.935 |
| $+PPI_{WBP(box)}$ | 0.941 |

Lesion classification. We first compare PPI to other specialized SOTA network architectures. Table 8 summarizes AUC scores of Tensor Net-X (Efthymiou S, et al. (2019) arXiv preprint arXiv:1906.06329), DenseNet (Huang G, et al. (2017) Proceedings of the IEEE conference on computer vision and pattern recognition, pp. 4700-4708), LoTeNet (Selvan R. et al. (2020) Medical Imaging with Deep Learning. PMLR, pp. 721-732), Inception_v3 (Szegedy C, et al. (2016) Proceedings of the IEEE conference on Computer Vision and Pattern Recognition, pp. 2818-2826), as well as our Inception_v3 trained with and without $PPI_{WBP}$. The proposed $PPI_{WBP\ (box)}$ leads the performance chart by a considerable margin, improving Inception_v3 from 0.92 to 0.94.

Figure 12:
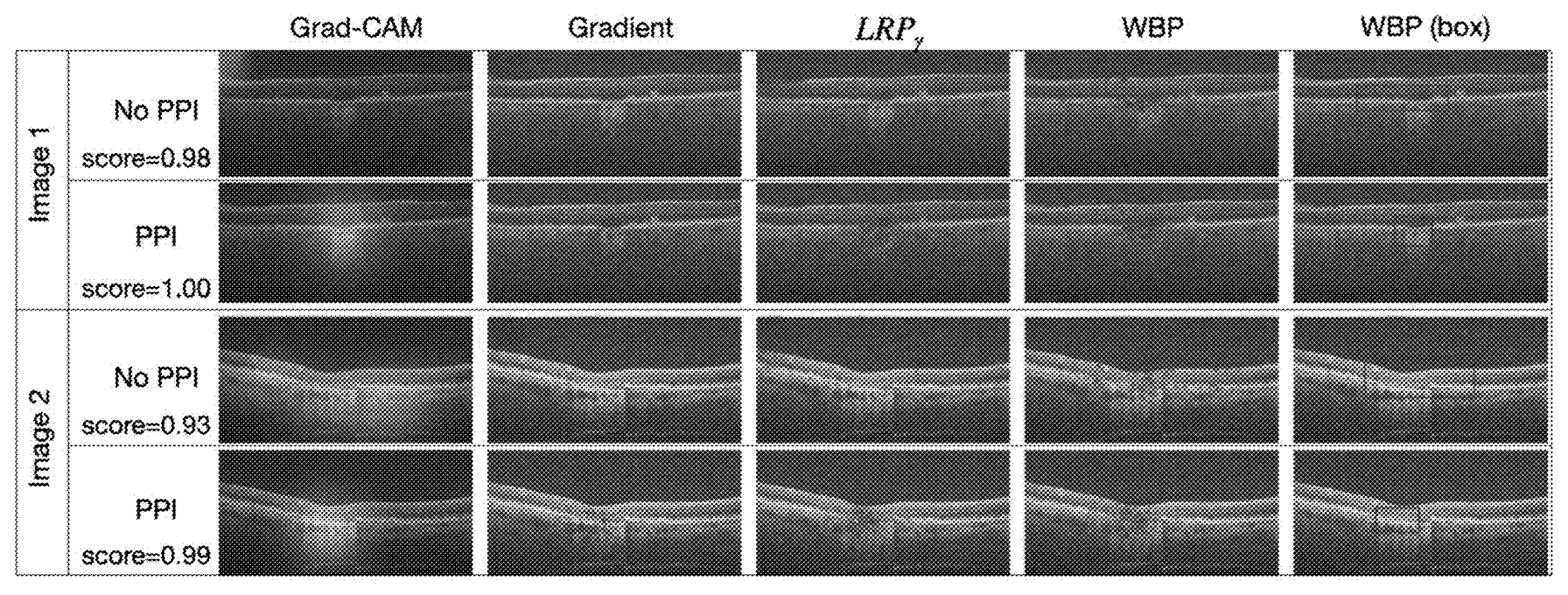

Weakly-supervised image segmentation. In FIG. 12, we compare saliency maps generated by Grad-CAM, WBP, WBP (box) to the ground truth lesion masks from expert annotations. Note that we have only supplied patch-label labels during training, not the pixel-level expert segmentation masks, which constitute a challenging task of weakly-supervised image segmentation. In line with the observations from the GA experiment, our PPI-training enhanced WBP saliency maps are mostly consistent with the expert segmentations. Together with Table 8, FIG. 5 demonstrates that the proposed PPI+WBP improves both the classification performance and model interpretability.

Here, we have presented Proactive Pseudo-Intervention (PPI), a novel interpretable computer vision framework that combines saliency mapping, causal reasoning, synthetic intervention and contrastive learning. PPI couples saliency mapping with contrastive training by creating artificially intervened negative samples absent of causal features. To communicate model insights and facilitate causal-informed reasoning, we derived an architecture-agnostic saliency mapping scheme called Weight Back Propagation (WBP), which faithfully captures the causally-relevant pixels/features for model prediction. Visual inspection of the saliency maps show that WBP, especially when coupled with PPI, is more robust to spurious features compared to competing approaches. Tested on natural image and medical image datasets, empirical results verify the combination of PPI and WBP consistently delivers performance gains across a wide range of tasks relative to competing solutions, and the gains are most significant where the application is complicated by small sample size, data heterogeneity, or confounded with spurious correlations.

Derivation of Convolutional Weight Back-propagation. Let's denote the input variable as $I \in \mathbb{R}^{H \times W}$, the convolutional filter weight as $W \in \mathbb{R}^{(2S+1) \times (2S+1)}$, the output variable as $O \in \mathbb{R}^{H \times W}$, and the weight backpropagate to O as $\hat{W} \in \mathbb{R}^{H \times W}$. We omit the bias here because it does not directly interact with the input variables. We denote $\otimes$ as the convolutional operator. We have the following equations.

$$O = I \otimes W \quad (11)$$

$$O_{i,j} = \sum_{i'=-S}^{S} \sum_{j'=-S}^{S} I_{i+i',j+j'} W_{i'+S,j'+S} \quad (12)$$

$$\sum_{i} \sum_{j} O_{i,j} \hat{W}_{i,j} = \sum_{i} \sum_{j} \sum_{i'=-S}^{S} \sum_{j'=-S}^{S} I_{i+i',j+j'} W_{i'+S,j'+S} \hat{W}_{i,j} \quad (13)$$

$$\sum_{i} \sum_{j} O_{i,j} \hat{W}_{i,j} = \sum_{i} \sum_{j} I_{i,j} \sum_{i'=-S}^{S} \sum_{j'=-S}^{S} \hat{W}_{i+i',j+j'} W_{-i'+S,-j'+S} \quad (14)$$

$$\sum_{i} \sum_{j} O_{i,j} \hat{W}_{i,j} = \sum_{i} \sum_{j} I_{i,j} \left( \hat{W} \otimes [W]_{flip_{i,j}} \right)_{i,j} \quad (15)$$

Hence the weight backpropagate through a convolutional layer is $\tilde{W}^l = \tilde{W}^{l+1} \otimes [W^l]_{flip}$. For the 3D cases, $I^l \in \mathbb{R}^{D_1 \times H \times W}$, the weight back propagates to $O^l$ is $\tilde{W}^{l+1} \in \mathbb{R}^{D_2 \times H \times W}$ and the convolutional weight is $W^l \in \mathbb{R}^{D_2 \times D_1 \times (2S+1) \times (2S+1)}$. To match the depth of $\tilde{W}^{l+1}$, the $W^l$ is transposed in the first two dimensions. So $\tilde{W}^l = \tilde{W}^{l+1} \otimes [W^l]_{flip_{2,3}}^{T_{0,1}}$. If the convolutional layer is downsizing the input variable (i.e., strides), the $\tilde{W}_{ijk}^{l+1}$ is padded with zeros around the weights (left, right, up, and down) to display the input elements that the convolutional filter strides over. The number of padding zeros is equal to the number of strides minus 1.

Details on Causal Masking. In this work, we consider three types of causal masking: (i) the point-wise soft causal masking defined by Equation (2) in the main text, (ii) hard masking, and (iii) box masking. For the hard masking, for each image, we keep points with WBP weight larger than k times of the standard deviation of WBP weights of the whole image. We test k from 1 to 7 and achieve similar results. As the model performs slightly better when k=7, we set k as 7, for all experiments. For the box masking, we use the center of mass for these kept points as the center to draw a box. The height and width of this box is defined as $center_{h/w} \pm 1.2 std_{h/w}$. In this way at least 90% of filtered points are contained in the box. For the soft masking, we set ω to 100 and σ to 0.25. We have also experimented with image-adaptive thresholds instead of a fixed σ for all inputs, i.e., set the threshold as mean value plus k times of the standard deviation of WBP weights of the whole image. The experiment comparison of these masking methods mention above is conducted on LIDC dataset. We repeat the experiments a few times and the results are consistent.

TABLE 9

| AUC on LIDC from Different Causal Masking Methods. | |
| --- | --- |
| Models | AUC |
| WBP-soft (fixed σ-) | 0.931 |
| WBP-soft (adaptive σ-) | 0.941 |
| WBP-hard | 0.935 |
| WBP-box | 0.941 |

Related Work. In this work, we propose a contrastive causal representation learning strategy, i.e., Proactive Pseudo-Intervention (PPI), that leverages proactive interventions to identify causally-relevant image features. This approach is complemented with a novel causal salience map visualization module, i.e., Weight Back Propagation (WBP), that identifies important pixels in the raw input image, which greatly facilitates interpretability of predictions.

Prior related works will be discussed in this section. Compared with alternative post-hot saliency mapping methods, WBP outperforms these methods as both a standalone causal saliency map and a trainable model for model interpretation. Compared with other trainable interpretation models, the proposed PPI+WBP improves both model performance and model interpretations.

Post-hoc Saliency Maps. We compare WBP with other post-hoc saliency mapping methods to show why WBP is able to target the causal features, and generate more succinct and reliable saliency maps.

Perturbation Based Methods. These methods make perturbations to individual inputs or neurons and monitor the impact on output neurons in the network. Zeiler M, et al. occludes different segments of an input image and visualized the change in the activations of subsequent layers (In European Conference on Computer Vision (2014), pp. 818-833). Several methods follow a similar idea, but use other importance measures or occlusion strategies (Ribeiro M, et al. (2016) Proceedings of the 22nd ACM SIGKDD international conference on knowledge discovery and data mining, pp. 1135-1144; Petsiuk V, et al. (2018) arXiv preprint arXiv:1806.07421; Seo D. et al. (2019) IEEE Access. 8:85728582). More complicated work generates an explanation by optimizing for a perturbed version of the image (Fong R, et al. (2019) Proceedings of the IEEE International Conference on Computer Vision, pp. 2950-2958; Fong R, et al. (2017) Proceedings of the IEEE International Conference on Computer Vision, pp. 3429-3437; Du M, et al. (2018) Proceedings of the 24th ACM SIGKDD International Conference on Knowledge Discovery & Data Mining, pp. 1358-1367; Dabkowski P, et al. (2017) Advances in Neural Information Processing Systems, pp. 6967-6976). Wagner J, et al. (2019) proposes a new adversarial defense technique which filters gradients during optimization to achieve fine-grained explanation (Proceedings of the IEEE Conference on Computer Vision and Pattern Recognition, pp. 9097-9107). However, such perturbation based methods are computationally intensive and involve sophisticated model designs, which make it extremely hard to be integrated with other advance learning strategies.

Backpropagation Based Methods. Backpropagation based methods (BBM) propagate an importance signal from an output neuron backwards through the layers to the input. These methods are usually fast to compute and produce fine-grained importance/relevancy maps. WBP is one of such method. The pioneer methods in this category backpropagate a gradient to the image, and branches of studies extend this work by manipulating the gradient. These methods are discussed and compared in Mahendran A, et al. (2016) and Erhan D, et al. (2009). However, these maps are generally less concentrated (Dabkowski P, et al. (2017) Advances in Neural Information Processing Systems, pp. 6967-6976; Fong R, et al. (2017) Proceedings of the IEEE International Conference on Computer Vision, pp. 3429-3437) and less interpretable. Other BBMs such as Layer-wise Relevance Propagation (Bach S, et al. (2015) PloS One. 10(7):e0130140), DeepLift (Shrikumar A, et al. (2017) International Conference on Machine Learning, pp. 3145-3153) employ top-down relevancy propagation rules. Deep-Lift is sensitive to the reference inputs, which needs more human efforts and background knowledge to produce appealing saliency maps. The nature of depending on reference inputs limits its ability on model diagnosis and coupled with learning strategies to continuously improving models' performance. LRP decomposes the relevance, R, from a neuron, k, in the upper layer to every connected neurons, j, in the lower layer. The decomposition is distributed through gradients under the suggested implementation (Montavon G, et al. (2019) Springer, pp. 193-209). Our experiments on GA and CUB datasets show that vanilla LRP performs similar to gradient based methods, which is also demonstrated in (Montavon G, et al. (2019) Springer, pp. 253-265). The variants of LRP use complex rules to prioritize positive or large relevance, making the saliency map visually appealing to human. However, our experiments demonstrate the unfaithfulness of LRP and its variants as they highlight spuriously correlated features (boarderlines and backgrounds).

By contrast, our WBP backpropagates the the weights of through layers to compute the contributions of each input pixel, which is truly faithful to the model, and WBP tends to highlight the target objects themselves rather than the background. At the same time, the simplicity and efficiency makes WBP easily work with other advanced learning strategies for both model diagnosis and improvements during training.

TABLE 10

A List of Commonly Used LRP Rules.
(Montavon G, et al. (2019) Springer, pp. 193-209).

| Rules | Formula |
| --- | --- |
| LRP | $R_j = \sum_k \dfrac{a_j w_{jk}}{\sum_{0,j} a_j w_{jk}} R_k$ |
| $LRP_\epsilon$ | $R_j = \sum_k \dfrac{a_j w_{jk}}{\epsilon + \sum_{0,j} a_j w_{jk}} R_k$ |
| $LRP_\gamma$ | $R_j = \sum_k \dfrac{a_j(w_{jk} + \gamma w_{jk}^+)}{\sum_{0,j} a_j(w_{jk} + \gamma w_{jk}^+)} R_k$ |
| $LRP_{\alpha\beta}$ | $R_j = \sum_k \left( \alpha \dfrac{(a_j w_{jk})^+}{\sum_{0,j}(a_j w_{jk})^+} - \beta \dfrac{(a_j w_{jk})^-}{\sum_{0,j}(a_j w_{jk})^-} \right) R_k$ |
| $LRP_{flat}$ | $R_j = \sum_k \dfrac{1}{\sum_j 1} R_k$ |
| $LRP_{w^2}$ | $R_j = \sum_j \dfrac{w_{ij}^2}{\sum_i w_{ij}^2} R_k$ |
| $LRP_{z^\beta}$ | $R_j = \sum_j \dfrac{x_i w_{ij} - l_i w_{ij}^+ - h_i w^- ij}{\sum_i x_i w_{ij} - l_i w_{ij}^+ - h_i w^- ij} R_j$ |

Activation Based Methods. Methods under this category (such as CAM, Grad-CAM, guided Grad-CAM, Grad-CAM++) use a linear combination of class activation maps from convolutional layers to derive a saliency map. The main difference between them is how the linear combination weights are computed.

The generation of saliency maps is simple and these methods can be coupled with advanced training strategies to improve training (Li K, et al. (2018) Proceedings of the IEEE Conference on Computer Vision and Pattern Recognition, pp. 9215-9223). However, they fail at visualizing fine-grained evidence, which is particularly important in explaining medical classification models. Additionally, it is not guaranteed that the resulting explanations are faithful and reflect the decision making process of the model (Du M, et al. (2018) Proceedings of the 24th ACM SIGKDD International Conference on Knowledge Discovery & Data Mining, pp. 1358-1367; Selvaraju R, et al. (2017) Proceedings of the IEEE International Conference on Computer Vision, pp. 618-626; Wagner J, et al. (2019) Proceedings of the IEEE Conference on Computer Vision and Pattern Recognition, pp. 9097-9107). Grad-CAM++(Chattopadhay A, et al.

(2018) 2018 IEEE Winter Conference on Applications of Computer Vision (WACV), pp. 839-847) proposes to introduce higher-order derivatives to capture pixel-level importance, while its high computational cost in calculating the second- and third-order derivatives makes it impractical for training purposes.

Interpretable Models. Unlike the post hoc saliency map generation described above, an alternative approach is to train a separate module to explicitly produce model explanations (Fukui H, et al. (2019) Proceedings of the IEEE Conference on Computer Vision and Pattern Recognition, pp. 10705-10714; Goyal Y, et al. (2019) ICML, pp. 2376-2384; Chang C, et al. (2018) arXiv preprint arXiv:1807.08024; Fong R, et al. (2017) Proceedings of the IEEE International Conference on Computer Vision, pp. 3429-3437; Shrikumar A, et al. (2017) International Conference on Machine Learning, pp. 3145-3153). Such post hoc causal explanations can be generated with black-box classifiers based on a learned low-dimensional representation of the data (O'Shaughnessy M, et al. (2020) Advances in Neural Information Processing Systems. 33). Related to our work is adversarial-based visual explanation method is developed in (Dhurandhar A. et al. (2018) Advances in Neural Information Processing Systems, pp. 592-603), highlighting the key features in the input image for a specific prediction. Contrastive explanations are produced in (Dhurandhar A. et al. (2018) Advances in Neural Information Processing Systems, pp. 592-603) to justify the predictions from a deep neural network.

Also in Goyal Y, et al. (2019), the authors generate counterfactual visual explanations that highlight what and how regions of an image would need to change in order for the model to predict a distractor class c' instead of the predicted class c. The main differences to our construction are two fold: (i) they rely on a separate module to be trained, and (ii) these approaches only produce explanations, but such explanations are not exploited to provide feedback for model improvement.

Striking the goal of both good explanation and good performance is more challenging. One promising direction is to inject model-dependent perturbations to the input images as strategic augmentations (Fong R, et al. (2017) Proceedings of the IEEE International Conference on Computer Vision, pp. 3429-3437; Dabkowski P, et al. (2017) Advances in Neural Information Processing Systems, pp. 6967-6976; Chang C, et al. (2018) arXiv preprint arXiv:1807.08024). In such examples, parts of the image have been masked and replaced with various references such as mean pixel values, blurred image regions, random noise, outputs of generative models, etc. However, these pixel-level perturbations are very costly and difficult to craft. Wang L, et al. (2019) propose new learning objectives for attention separability and cross-layer consistency, which result in improved attention discriminability and reduced visual confusion. However, it generates heat-map style attention maps, which fail in fine-resolution model explanations which is important in medical related tasks. In Fukui H, et al. (2019), an additional attention branch is learned to generate attention map, and then applies the attention map to the original image or feature map; they achieve compelling attention maps on natural images. However, as the attention maps are not derived directly from the classification model, there is no guarantee for their faithfulness. Further, having an additional attention network results in increased network size, which raises concerns for the risk of over-fitting, particularly on datasets with a limited sample size.

CUB Experiment Details

CUB dataset descriptions and experiment settings. CUB has 11,788 images of 200 bird spices. To train a VGG11 network, we use 8,190 training images and validate the model on 2,311 validation images, with the accuracy are reported on 1227 testing images. The network is trained for 100 epochs with a learning rate decay of 0.1 every 30 epochs. The batch size is 32. The optimizer is a SGD with initial learning rate at 0.01.

Classification performance improvement with PPI. We compare classification performances among model trained with different objections. The baseline is VGG11 classification without PPI. Three different saliency mapping methods are tested within our PPI framework: LRP, Grad-CAM, and WBP. Top 1000 points in all saliency maps are used to generate the soft mask so the comparison is fair. During training, since only a small portion of points are used to generate the mask, the contribution from $L_{con}$ is about 100 times smaller than other losses. To fix this imbalance, the $L_{con}$ is weighted 100× more after the first 20 epochs. The results are shown in Table 11.

TABLE 11

Accuracy on CUB.

| Models | Accuracy |
|---|---|
| VGG 11 | 0.662 |
| +PPI$_{LRP}$ | 0.680 |
| +PPI$_{Grad-CAM}$ | 0.683 |
| +PPI$_{WBP}$ | 0.696 |

Geographic Atrophy (GA) Experiment Details

Figure 14:
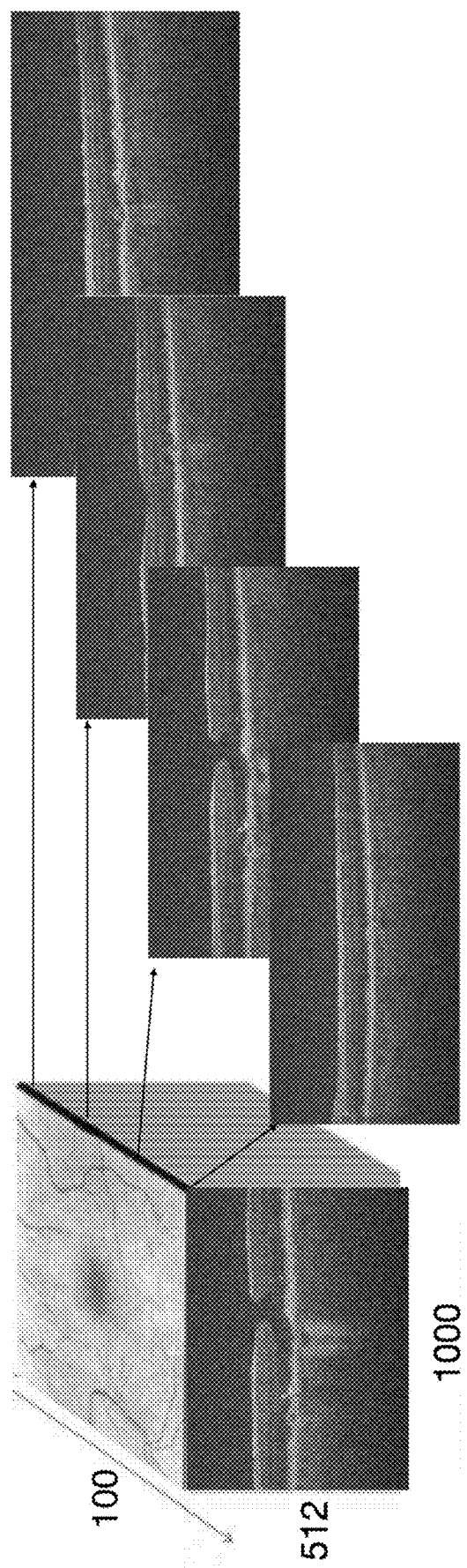
FIG. 14 is an illustration of a 3D OCT image example.

GA dataset descriptions. Our GA dataset is derived from the A2A SD-OCT Study (http://ClinicalTrials.gov identifier NCT00734487), which was an ancillary observational prospective study of a subset of eyes from the AREDS2 conducted at four sites (National Eye Institute, Duke Eye Center, Emory Eye Center, and Devers Eye Institute) (Leuschen J, et al. (2013) Ophthalmology. 120(1):140-150). In this experiment (with our new dataset, that we will make public), each OCT volume image consists of 100 scans, each of which being a 512×1000 pixel image (Boyer D, et al. (2017) Retina (Philadelphia, Pa.). 37(5):819). 1,085 OCT images are collected from 275 subjects during 5 years. An example of 3D OCT images is shown in FIG. 14.

Figure 15:
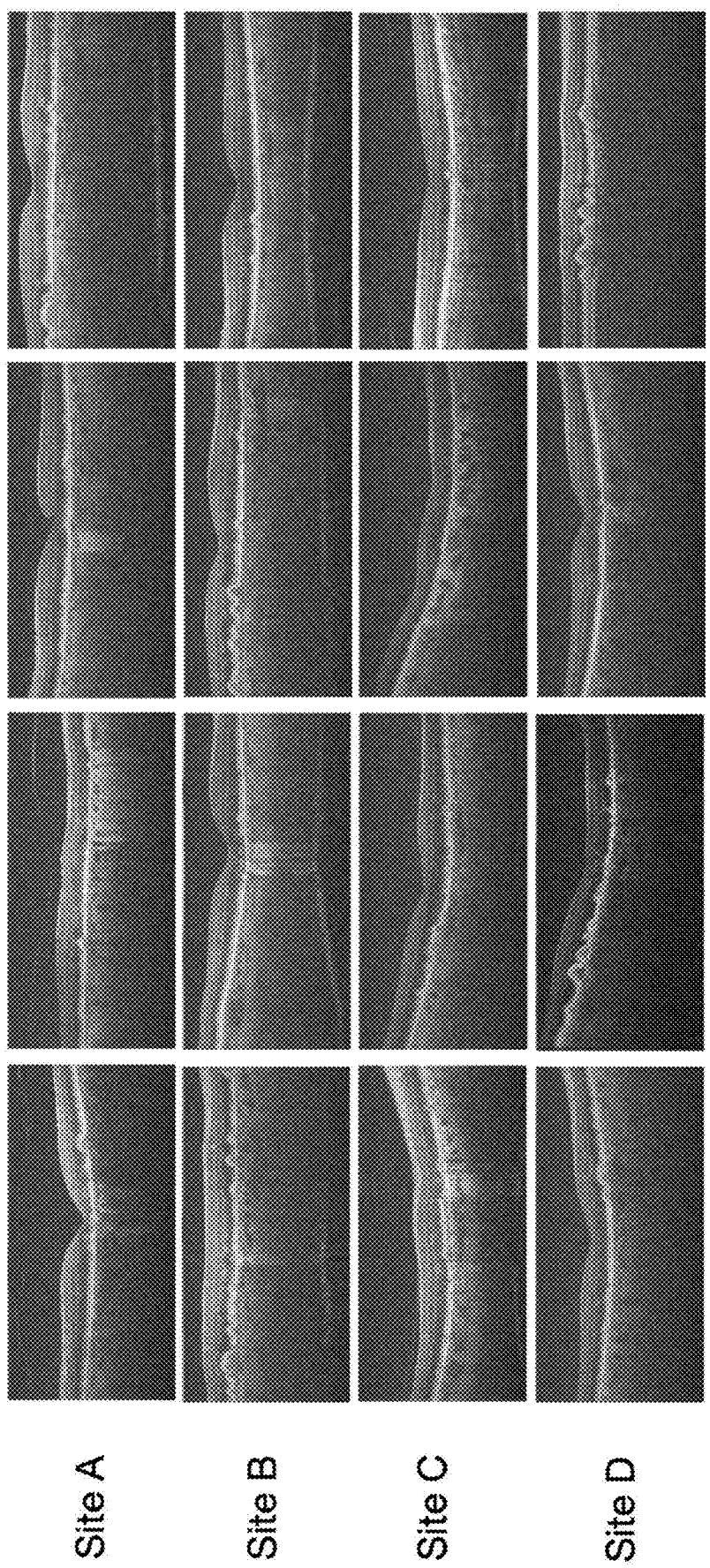
FIG. 15 is an OCT slice examples from 4 sites.

Image differences between 4 sites. Images in GA dataset are collected from 4 different sites, hereafter denoted as A, B, C, and D respectively. There are 315 images (101 positive samples) from site A, 334 images (73 positive samples) from site B, 260 images (131 positive samples) from site C, and 176 images (59 positive samples) from site D. We show typical example images from 4 sites separately in FIG. 15. As the dataset is collected during 7 years, some images in site D are of smaller image size as they are sampled with different type of machine. We paddle these images by repeating the left and right areas, as show in the right bottom example.

Figure 16:
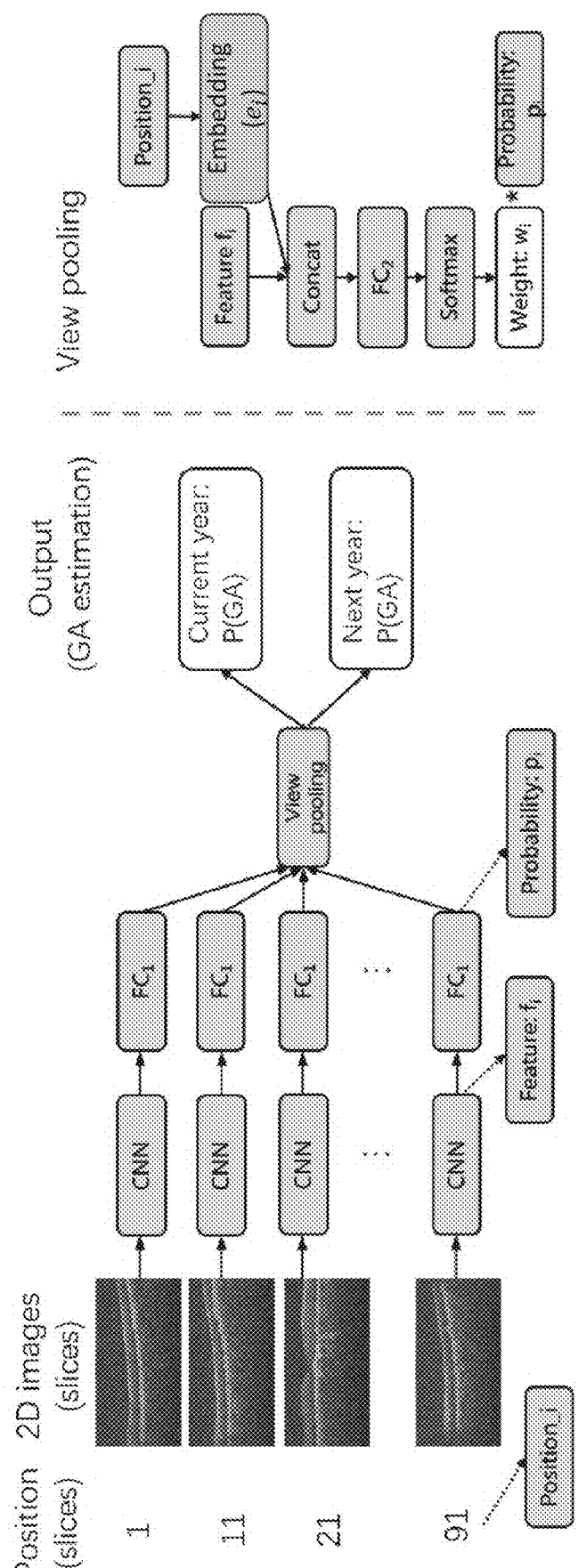
FIG. 16 is an illustration of multi-view CNN based 3D OCT image classification model

Multi-view CNN Variation. We use a variant of the multi-view CNN model (Su H, et al. (2015) Proceedings of the IEEE International Conference on Computer Vision, pp. 945-953) to process the 3D OCT inputs, and use it as our baseline solution. The architecture of this model is outlined in FIG. 16. For each slice, the model feed it into a CNN network, and get the feature $f_i$ of slice i ($f_i$=CNN($x_i$)), followed by a fully connected layer and a Sigmoid activation to get a probability score $p_i$=sigmoid(FC$_1$($f_i$)). We observe that slices in different slices contributes differently to the identification of GA, which motivates us to implement a location-aware view pooling, illustrated in the right part of FIG. 16. Each slice is assigned to a position id, ranging from 1 to 100. The model first uses an embedding layer to embed the position id to a six dimension position feature vector $e_i$. Then, we combine the feature vector f extracted from the slice image with the corresponding $e_i$ together. The combined feature vector is fed into a fully connected layer to get the logit score $a_i$.

$$a_i = FC_2([f_i, e_i]) \quad (16)$$

To reduce computational burden during training, we randomly sample 10 out of the 100 slices (with an abuse of notation, denoted by $a_1, a_2, \ldots, a_{10}$) and send them into a Softmax function to get the attention weights for the 10 sampled slices, using the following equation:

$$w_i = \frac{\exp\left((ReLU(a_i) + \delta)/\tau\right)}{\sum_{k=1}^{10} \exp\left((ReLU(a_i) + \delta)/\tau\right)} \quad (17)$$

Here $\delta$ is a trainable bias term parameter, initialized to a high value to stabilize the training, and gradually attenuated to a small number during training. $\tau$ is the temperature parameter, which is set to a small value to sharpen the attention weight, which helps us to find out the most important slices for GA diagnosis. The get final predicted probability of GA (GA score) for an image x at inference time, we compute the weighted summation of the probabilities $w_i$ of all 100 slices $GA = \Sigma_i w_i p_i$.

Experiment settings. The CNN network is an Inception_v3, which is pre-trained on ImageNet. For training all models, we use the Adam optimizer with a learning rate of $5 \times 10^{-5}$ with a learning rate decay of 0.5 every 10 epochs for the pre-trained CNN network, and the Adam optimizer with a learning rate of $5 \times 10^{-3}$ with a learning rate decay of 0.2 every 10 epochs for the other layers in the model. We train the model for 30 epochs with a batch size of 2 because of the large size of 3D OCT images. Random horizontal flips, and Gaussian noise are used for data augmentations during training.

LIDC Experiment Details

LIDC dataset description and experiment settings. We also test the proposed method on a public medical CT scan dataset LIDC-IDRI (Armato III S, et al. (2011) Medical physics. 38(2):915-931). We follow the settings in (Kohl S, et al. (2018) Advances in Neural Information Processing Systems, pp. 6965-6975; Selvan R. et al. (2020) Medical Imaging with Deep Learning. PMLR, pp. 721-732) that crops the original images into 128×128 patches centered on a lesion for which at least one radiologist has annotated. In our experiment, we focus on the classification task of predicting the presence of a lesions, which is consistent with the setup of (Selvan R. et al. (2020) Medical Imaging with Deep Learning. PMLR, pp. 721-732). There are four radiologists annotates each patch with both lesion label and lesion mask. A patch in the dataset is labeled as positive if more than two (i.e., ≥3) radiologists have annotated presence of a lesion, otherwise negative. The ground-truth mask is the pixel-level union set of the four masks. We use Inception-v3 (Szegedy C, et al. (2016) Proceedings of the IEEE Conference on Computer Vision and Pattern Recognition, pp. 2818-2826) as our base model for both standard classification and PPI-enhanced training with various saliency mapping schemes. To match the receptive field of an Inception-v3 model, we resize the input patches to 299×299. For training all models, we use the Adam optimizer with a learning rate of $10^{-4}$ with a learning rate decay of 0.3 every 10 epochs after epoch 50, and a batch size of 64. Random horizontal flips, vertical flips and rotations within 20 degrees are used for data augmentations during training. As all patches are centered on a lesion, we randomly shift masks used in the positive contrast to reduce overlaps between masks of positive and negative contrasts.

Potential Application Discussion. Both quantitative and qualitative results show that PPI+WBP can not only improve the model performance, but also earn trusts from doctors, which is essential to accelerate clinical deployments of deep learning methods.

It is very time consuming and easy to miss small focuses for radiologists to review volume CT scans. The fine-grained saliency maps generated by PPI+WBP can potentially assistant radiologist to diagnosis scan images by highlighting disease casual related areas.

When the classification model outperforms human experts, fine-grained casual saliency maps generated by PPI+WBP can potentially inspire doctors to discover disease related bio-markers, which in turn improves performance of human experts.

Figure 17:
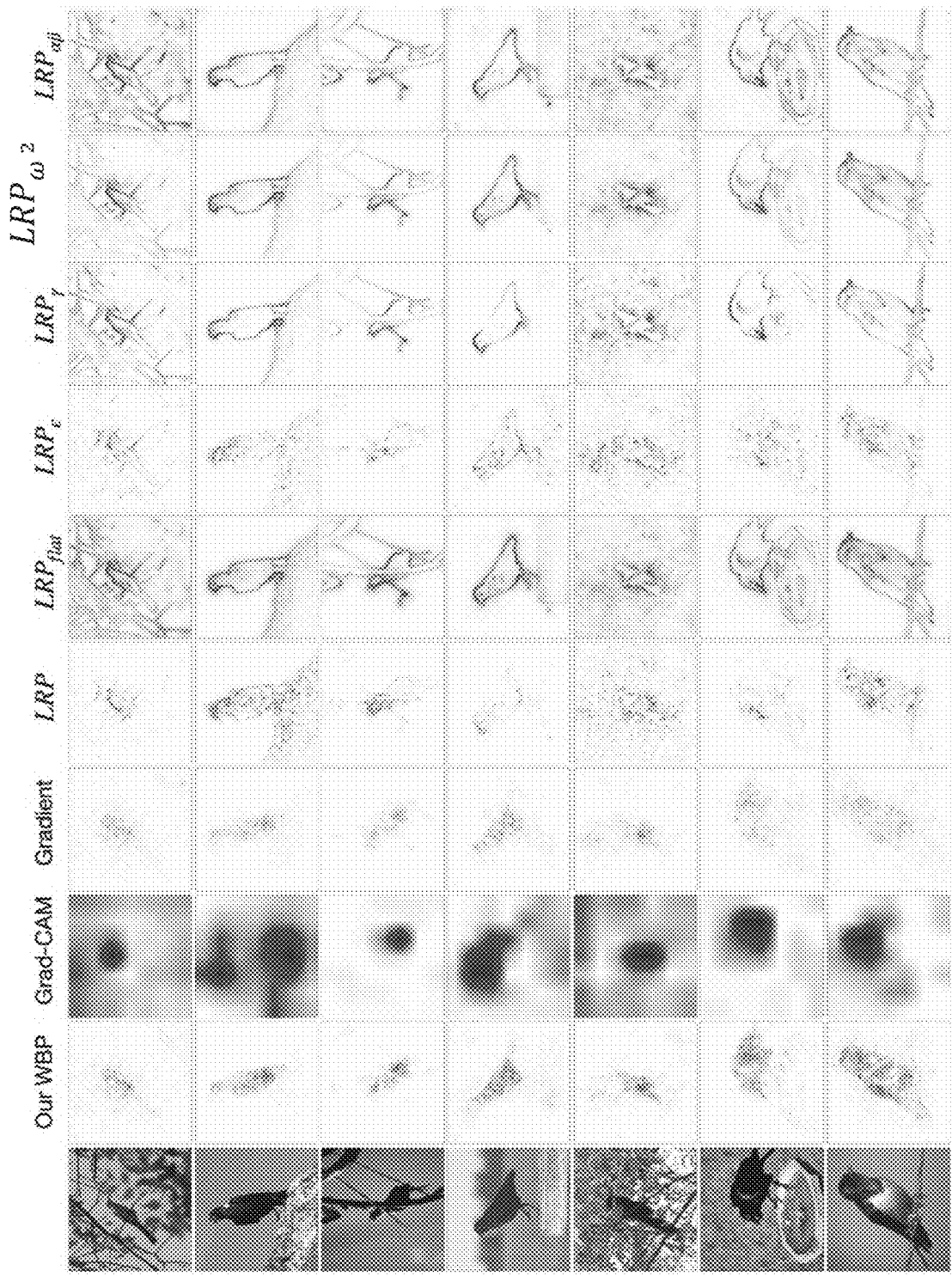
FIG. 17 shows more comparisons of saliency maps on CUB dataset.
Figure 17:
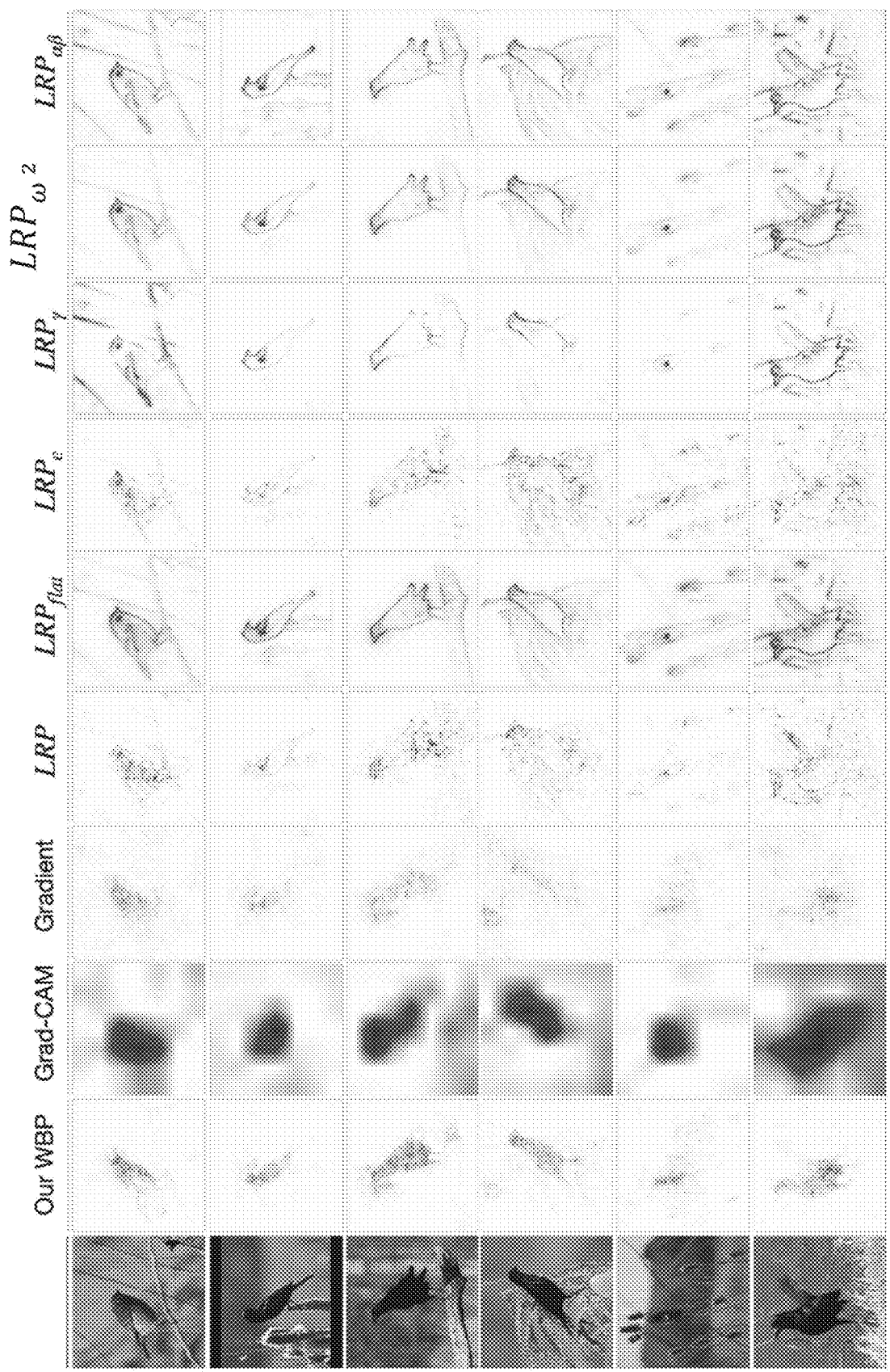
Figure 18:
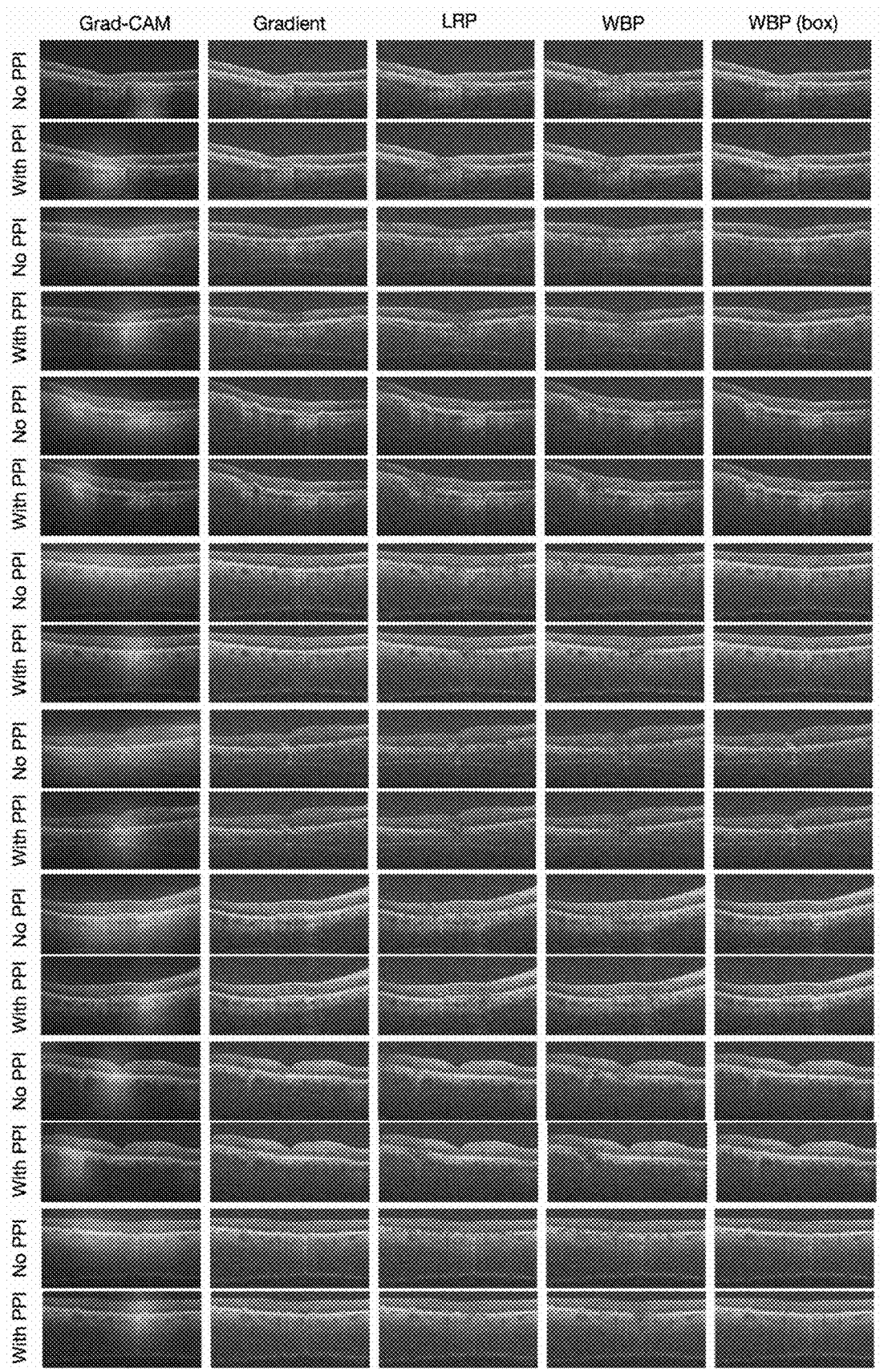
FIG. 18 shows comparison examples of saliency maps on GA dataset based on model trained with and without PPI. PPI encourages more concentrated and less noisy saliency maps.
Figure 19:
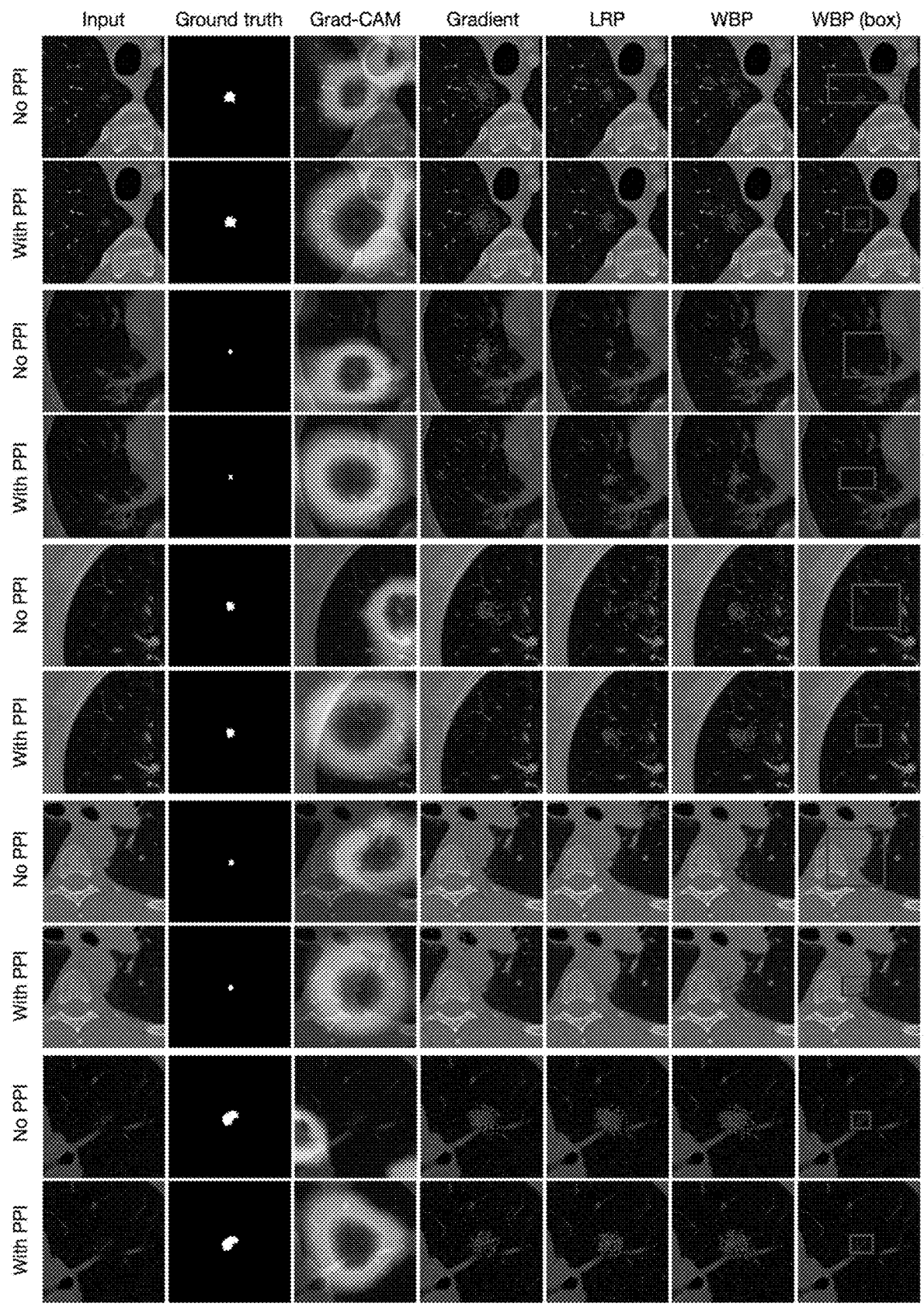
FIG. 19 shows comparison examples of saliency maps on LIDC dataset based on model trained with and without PPI. PPI saliency maps to focus on lesions.

Additional Saliency Map Comparisons. Extra saliency map comparisons on CUB, GA, and LIDC are shown in FIG. 17, FIG. 18, and FIG. 19. In FIG. 18 and FIG. 19, we observe that without the additional supervision from PPI, competing solutions like Grad, LRP sometimes yield non-sensible saliency maps (attending to image corners), and GradCAM yields saliency maps in coarse-grained. Overall, PPI encourages more concentrated and less noisy saliency maps. Also, different PPI-based saliency maps agree with each other to a larger extent.

What is claimed:

1. A system using machine learning in detecting geographic atrophy (GA), the system comprising:
    at least one processor;
    a memory; and
    a computing platform including the at least one processor and the memory, wherein the computing platform is configured for:
        receiving, as input, volumetric scan images;
        determining a position of each of the volumetric scan images;
        assigning a weight to each of the volumetric scan images based on the position;
        generating, using a trained detection algorithm, a probabilistic likelihood that each scan is informative of GA or neovascular age-related macular degeneration;
        including high-probability scans in a dataset, the high-probability scans determined based on the probabilistic likelihood and the weight;
        determining, using the included scans in the dataset, whether GA or neovascular age-related macular degeneration is present or likely to occur; and
        outputting, by the detection algorithm, information indicating whether or not GA or neovascular age-related macular degeneration is present or likely to occur.

2. The system of claim 1, wherein the volumetric scan images comprise a plurality of optical coherence tomography (OCT) volume scan images.

3. The system of claim 2, wherein the OCT volume scan images are high resolution spectral-domain optical coherence tomography (SD-OCT) volume scan images.

4. The system of claim 3, wherein the SD-OCT volume scan images comprise one or more features including reticular pseudodrusen, hyperreflective foci, quantitative measurements of RPE drusen complex volumes, RPE and outer retinal atrophy, and/or drusen area.

5. The system of claim 1, wherein the detection algorithm includes at least one machine learning algorithm and is trained using one or more data sets associated with related GA events.

6. The system of claim 1, wherein the information comprises a prediction of a presence or future development of geographic atrophy or neovascular age-related macular degeneration within two years.

7. A system using machine learning in detecting geographic atrophy, the system comprising:
at least one processor;
a memory; and
a computing platform including the at least one processor and the memory, wherein the computing platform is configured to:
receive, as an input, a plurality of volumetric scan images;
analyze the plurality of volumetric scan images to determine a position of each volumetric scan image of the plurality of volumetric scan images;
identify features associated with geographic atrophy or neovascular age-related macular degeneration in each volumetric scan image;
generate, via a trained detection algorithm, a probabilistic likelihood that each volumetric scan image is informative of geographic atrophy or neovascular age-related macular degeneration based on the features;
assign a weight to each volumetric scan image of the plurality of volumetric scan images based on the position; and
determine, based on the probabilistic likelihood and weight of each volumetric scan, a prediction of a presence or future development of geographical atrophy or neovascular age-related macular degeneration within two years.

8. The system of claim 7, wherein the features include one or more of reticular pseudodrusen, hyperreflective foci, quantitative measurements of RPE drusen complex volumes, RPE and outer retinal atrophy, and drusen area.

9. The system of claim 7, wherein the position includes a position identifier and a positional feature vector.

10. The system of claim 7, wherein the position, the features, the probabilistic likelihood, and the weight are determined by at least one machine learning algorithm.

11. The system of claim 10, wherein the at least one machine learning algorithm is trained using one or more data sets associated with geographic atrophy.

12. The system of claim 11, wherein the at least one machine learning algorithm is trained using proactive pseudo intervention learning.

13. The system of claim 7, wherein the computing platform is further configured to output the prediction.

14. A system using machine learning in detecting geographic atrophy, the system comprising:
at least one processor;
a memory; and
a computing platform including the at least one processor and the memory, wherein the computing platform is configured to:
receive, as an input, a plurality of volumetric scan images;
analyze the plurality of volumetric scan images to determine a position of each volumetric scan image of the plurality of volumetric scan images;
assign a weight to each of the plurality of volumetric scan images based on the position of each volumetric scan image of the plurality of volumetric scan images;
identify features associated with geographic atrophy or neovascular age-related macular degeneration in each volumetric scan image;
generate, via a trained detection algorithm, a probabilistic likelihood that each volumetric scan is informative of geographic atrophy or neovascular age-related macular degeneration based on the features; and
determine, based on the probabilistic likelihood and the weight of each volumetric scan, a prediction of a presence or future development of geographical atrophy or neovascular age-related macular degeneration.

15. The system of claim 14, wherein the features include one or more of reticular pseudodrusen, hyperreflective foci, quantitative measurements of RPE drusen complex volumes, RPE and outer retinal atrophy, and drusen area.

16. The system of claim 14, wherein the position includes a position identifier and a positional feature vector.

17. The system of claim 14, wherein the position, the features, and the probabilistic likelihood are determined by at least one machine learning algorithm.

18. The system of claim 17, wherein the at least one machine learning algorithm is trained using one or more data sets associated with geographic atrophy.

* * * * *